(12) United States Patent
Logunov et al.

(10) Patent No.: US 10,858,283 B2
(45) Date of Patent: Dec. 8, 2020

(54) LASER WELDED GLASS PACKAGES

(71) Applicant: CORNING INCORPORATED, Corning, NY (US)

(72) Inventors: Stephan Lvovich Logunov, Corning, NY (US); Yousef Kayed Qaroush, Painted Post, NY (US); Mark Alejandro Quesada, Horseheads, NY (US); Alexander Mikhailovich Streltsov, Corning, NY (US); Leo Young Zheng, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 28 days.

(21) Appl. No.: 16/179,377

(22) Filed: Nov. 2, 2018

(65) Prior Publication Data

US 2019/0218142 A1 Jul. 18, 2019

Related U.S. Application Data

(63) Continuation-in-part of application No. 15/522,198, filed as application No. PCT/US2015/057924 on Oct. 29, 2015, now Pat. No. 10,457,595.
(Continued)

(51) Int. Cl.
*C03C 23/00* (2006.01)
*B32B 7/04* (2019.01)
(Continued)

(52) U.S. Cl.
CPC .......... *C03C 23/0025* (2013.01); *C01G 19/02* (2013.01); *C03C 3/14* (2013.01);
(Continued)

(58) Field of Classification Search
CPC ..... C03C 23/0025; C03C 17/02; C03C 17/23; C03C 27/06; H01L 51/5246; B32B 7/04
See application file for complete search history.

(56) References Cited

U.S. PATENT DOCUMENTS 5,272,309 A 12/1993 Goruganthu et al.
5,489,321 A 2/1996 Tracy et al.
(Continued)

FOREIGN PATENT DOCUMENTS

CN 101560864 B 11/2011
JP 2009297759 A1 12/2009

OTHER PUBLICATIONS

Ponader et al; "Origin of the Refractive-Index Increase in Laser-Written Waveguides in Glasses"; Journal of Applied Physics, 103, 063516 (2008); pp. 063516-1-063516-5.
(Continued)

*Primary Examiner* — Joanna Pleszczynska

(57) ABSTRACT

An apparatus including a first substrate, a second substrate, an inorganic film provided between the first substrate and the second substrate and in contact with both the first substrate and the second substrate, a laser welded zone formed between the first and second substrate by the inorganic film, where the laser welded zone has a heat affected zone (HAZ), where the HAZ is defined as a region in which $\sigma_{HAZ}$ is at least 1 MPa higher than average stress in the first substrate and the second substrate, wherein $\sigma_{HAZ}$ is compressive stress in the HAZ, and wherein the laser welded zone is characterized by its $\sigma_{interface\ laser\ weld} > \sigma_{HAZ}$, wherein $\sigma_{interface\ laser\ weld}$ is peak value of compressive stress in the laser welded zone.

17 Claims, 45 Drawing Sheets

Related U.S. Application Data

(60) Provisional application No. 62/073,550, filed on Oct. 31, 2014.

(51) Int. Cl.

| | |
|---|---|
| C03C 17/02 | (2006.01) |
| C03C 17/23 | (2006.01) |
| C03C 27/06 | (2006.01) |
| H01L 51/52 | (2006.01) |
| C03C 3/14 | (2006.01) |
| C03C 3/247 | (2006.01) |
| C03C 17/06 | (2006.01) |
| C03C 27/04 | (2006.01) |
| C03C 27/10 | (2006.01) |
| C01G 19/02 | (2006.01) |
| C03C 3/16 | (2006.01) |
| C03C 3/23 | (2006.01) |
| C03C 15/00 | (2006.01) |

(52) U.S. Cl.
CPC ............... *C03C 3/16* (2013.01); *C03C 3/23* (2013.01); *C03C 3/247* (2013.01); *C03C 15/00* (2013.01); *C03C 17/02* (2013.01); *C03C 17/06* (2013.01); *C03C 17/23* (2013.01); *C03C 27/044* (2013.01); *C03C 27/06* (2013.01); *C03C 27/10* (2013.01); *H01L 51/5246* (2013.01)

(56) References Cited

U.S. PATENT DOCUMENTS

| | | |
|---|---|---|
| 6,423,613 B1 | 7/2002 | Geusic |
| 6,501,044 B1 | 12/2002 | Klockhaus et al. |
| 6,555,025 B1 | 4/2003 | Krupetsky et al. |
| 6,717,100 B2 | 4/2004 | Ruben |
| 6,762,072 B2 | 7/2004 | Lutz |
| 6,818,530 B2 | 11/2004 | Shimoda et al. |
| 6,831,029 B2 | 12/2004 | Chacon et al. |
| 7,344,901 B2 | 3/2008 | Hawtof et al. |
| 7,361,573 B2 | 4/2008 | Takayama et al. |
| 7,449,773 B2 | 11/2008 | Tarn |
| 7,615,506 B2 | 11/2009 | Aitken et al. |
| 7,626,138 B2 | 12/2009 | Bovatsek et al. |
| 7,722,929 B2 | 5/2010 | Aitken et al. |
| 7,732,730 B2 | 6/2010 | Fukuyo et al. |
| 7,829,147 B2 | 11/2010 | Aitken et al. |
| 7,872,338 B2 | 1/2011 | Tarn |
| 8,125,146 B2 | 2/2012 | Park |
| 8,134,293 B2 | 3/2012 | Logunov et al. |
| 8,148,179 B2 | 4/2012 | Aitken et al. |
| 8,314,359 B2 | 11/2012 | Bovatsek et al. |
| 8,343,412 B2 | 1/2013 | Klein et al. |
| 8,367,440 B2 | 2/2013 | Takayama et al. |
| 8,375,744 B2 | 2/2013 | Becken et al. |
| 8,389,891 B2 | 3/2013 | Bovatsek et al. |
| 8,490,434 B2 | 7/2013 | Watanabe et al. |
| 8,530,786 B2 | 9/2013 | Bovatsek et al. |
| 8,697,242 B2 | 4/2014 | Kawanami et al. |
| 8,778,121 B2 | 7/2014 | Tuennermann et al. |
| 8,778,469 B2 | 7/2014 | Kawanami et al. |
| 8,796,109 B2 | 8/2014 | Ruben et al. |
| 8,955,358 B2 | 2/2015 | Grzybowski et al. |
| 8,975,159 B2 | 3/2015 | Akiyama |
| 9,021,836 B2 | 5/2015 | Matsumoto |
| 9,093,668 B2 | 7/2015 | Han |
| 9,120,287 B2 | 9/2015 | Ruben et al. |
| 9,171,721 B2 | 10/2015 | Danzl et al. |
| 9,180,612 B2 | 11/2015 | Kerbiguet et al. |
| 9,515,286 B2 | 12/2016 | Dabich, II et al. |
| 2002/0128141 A1 | 9/2002 | Buhrmaster et al. |
| 2004/0056006 A1 | 3/2004 | Jones et al. |
| 2004/0082145 A1 | 4/2004 | Reichenbach et al. |
| 2004/0206953 A1 | 10/2004 | Morena et al. |
| 2004/0207314 A1 | 10/2004 | Aitken et al. |
| 2005/0116245 A1 | 6/2005 | Aitken et al. |
| 2005/0151151 A1 | 7/2005 | Hawtof et al. |
| 2005/0174042 A1 | 8/2005 | Nishikawa et al. |
| 2005/0196710 A1 | 9/2005 | Shiroguchi |
| 2005/0199599 A1 | 9/2005 | Li et al. |
| 2007/0170839 A1 | 7/2007 | Choi et al. |
| 2010/0190051 A1 | 7/2010 | Aitken et al. |
| 2011/0209813 A1 | 9/2011 | Shibuya et al. |
| 2011/0223371 A1 | 9/2011 | Kawanami |
| 2012/0222450 A1 | 9/2012 | Lamberson et al. |
| 2012/0240632 A1 | 9/2012 | Matsumoto |
| 2013/0095260 A1 | 4/2013 | Bovatsek et al. |
| 2013/0112650 A1 | 5/2013 | Karam et al. |
| 2013/0125516 A1 | 5/2013 | Bayne et al. |
| 2013/0183474 A1 | 7/2013 | Bovatsek et al. |
| 2013/0213561 A1 | 8/2013 | Utsumi et al. |
| 2014/0004318 A1 | 1/2014 | Bovatsek et al. |
| 2014/0087099 A1 | 3/2014 | Veerasamy et al. |
| 2014/0151742 A1 | 6/2014 | Logunov et al. |
| 2014/0242306 A1 | 8/2014 | Koval et al. |
| 2015/0027168 A1 | 1/2015 | Dabich, II et al. |
| 2015/0266772 A1 | 9/2015 | Mitsui et al. |

OTHER PUBLICATIONS

Corning "Corning EAGLE2000 AMLCD Glass Substrates Material Information"; 3 Pages; 2005.
Global Dossier Translation of JP2017523432 Office Action dated Aug. 5, 2020; 4 Pages; Japanese Patent Office.

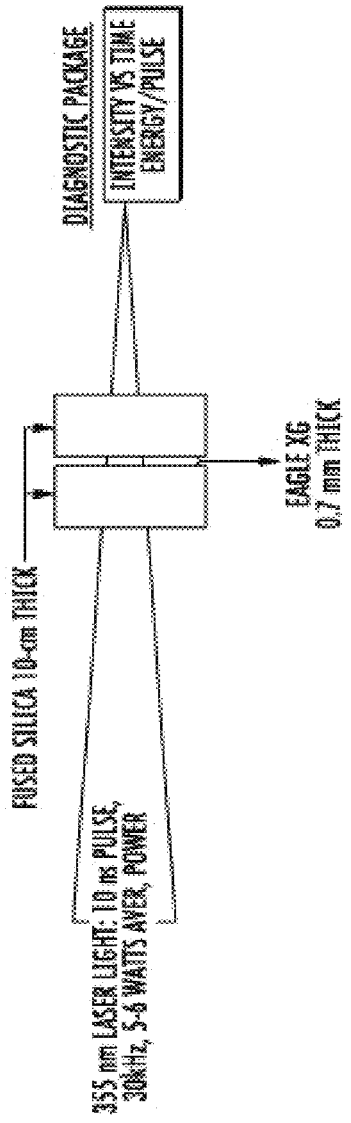

Weld Bond Energy of UV Absorbing Films

| Film | Weld Bond Energy (milliJoules/m²) |
|---|---|
| MMG 1.0 um | 1060 |
| LMG 0.2 um | 420 |
| ZnO 0.2 um | 240 |
| TiO2 | 150 |

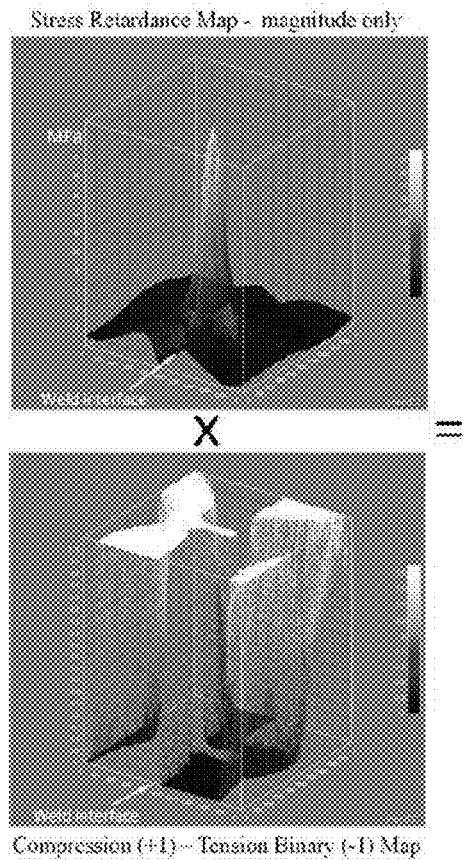 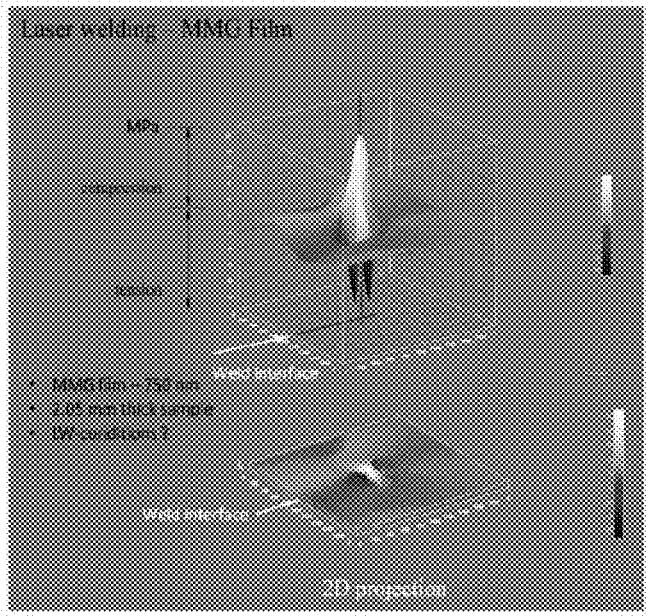
FIG. 45

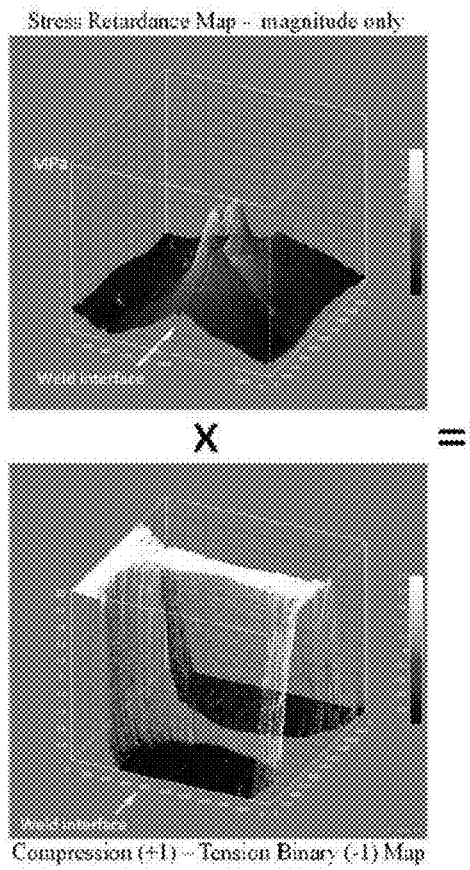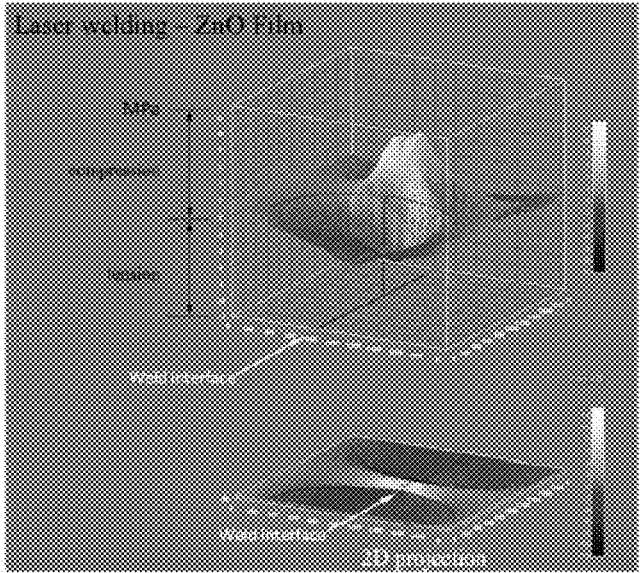
FIG. 48

LASER WELDED GLASS PACKAGES

CROSS REFERENCES

This application is a continuation-in-part of U.S. patent application Ser. No. 15/522,198, filed Apr. 26, 2017, which is a U.S. national phase application under 35 U.S.C. § 371(c) of PCT/US15/57924, filed Oct. 29, 2015, which claims the benefit of priority to U.S. Provisional Application No. 62/073,550 filed on Oct. 31, 2014 the content of which is incorporated herein by reference in its entirety.

BACKGROUND

Many modern devices require hermetic environments to operate and many amongst these are "active" devices which require electrical biasing. Displays such as organic light emitting diodes (OLED) that require light transparency and biasing are demanding applications due to their need for absolute hermeticity as a result of the use of electron-injection materials. These materials would generally decompose at atmosphere within seconds otherwise, so the respective device should maintain vacuum or inert atmospheres for long periods of time. Furthermore, the hermetic sealing should be performed near ambient temperatures due to high temperature sensitivity of the organic material to be encapsulated Frit-based sealants, for instance, include glass materials ground to a particle size ranging typically from about 2 to 150 microns. For frit-sealing applications, the glass frit material is typically mixed with a negative CTE material having a similar particle size, and the resulting mixture is blended into a paste using an organic solvent or binder. Exemplary negative CTE inorganic fillers include cordierite particles (e.g. $Mg2Al_3$ [$AlSi_5O_{18}$]), barium silicates, β-eucryptite, zirconium vanadate ($ZrV_2O_7$), or zirconium tungstate, ($ZrW_2O_8$) and are added to the glass frit, forming a paste, to lower the mismatch of thermal expansion coefficients between substrates and the glass frit. The solvents are used to adjust the rheological viscosity of the combined powders and organic binder paste and must be suitable for controlled dispensing purposes. To join two substrates, a glass frit layer can be applied to sealing surfaces on one or both of the substrates by spin-coating or screen printing. The frit-coated substrate(s) are initially subjected to an organic burn-out step at relatively low temperature (e.g., 250° C. for 30 minutes) to remove the organic vehicle. Two substrates to be joined are then assembled/mated along respective sealing surfaces and the pair is placed in a wafer bonder. A thermo-compressive cycle is executed under well-defined temperature and pressure whereby the glass frit is melted to form a compact glass seal. Glass frit materials, with the exception of certain lead-containing compositions, typically have a glass transition temperature greater than 450° C. and thus require processing at elevated temperatures to form the barrier layer. Such a high-temperature sealing process can be detrimental to temperature-sensitive workpieces. Further, the negative CTE inorganic fillers, which are used in order to lower the thermal expansion coefficient mismatch between typical substrates and the glass frit, will be incorporated into the bonding joint and result in a frit-based barrier layer that is substantially opaque. Based on the foregoing, it would be desirable to form glass-to-glass, glass-to-metal, glass-to-ceramic, and other seals at low temperatures that are transparent and hermetic.

While conventional laser welding of glass substrates can employ ultra-high laser power devices, this operation at near laser ablation often times damages the glass substrates and achieves a poor quality hermetic seal. Again, such conventional methods increase the opacity of the resulting device and also provide a low quality seal.

SUMMARY

Embodiments of the present disclosure are generally directed to hermetic barrier layers, and more particularly to methods and compositions used to seal solid structures using absorbing films. Embodiments of the present disclosure provide a laser welding or sealing process of a glass sheet with other material sheets using a thin film with absorptive properties during sealing process as an interfacial initiator. Exemplary laser-welding conditions according to embodiments can be suitable for welding over interfacial conductive films with negligible reduction in the conductivity. Such embodiments may thus be employed to form hermetic packages of active devices such as OLEDs or other devices and enable widespread, large-volume fabrication of suitable glass or semiconductor packages. It should be noted that the terms sealing, joining, bonding, and welding can be and are used interchangeably in the instant disclosure. Such use should not limit the scope of the claims appended herewith. It should also be noted that the terms "glass" and "inorganic" as they relate to the modification of the noun "film" can be used interchangeably in this instant disclosure, and such use should not limit the scope of the claims appended herewith.

Embodiments of the present disclosure provide a laser sealing process, e.g., laser welding, diffusion welding, etc., that can provide an absorptive film at the interface between two glasses. The absorption in steady-state may be greater than or as high as about 70% or may be less than or as low as about 10%. The latter relies upon color center formation within the glass substrates due to extrinsic color centers, e.g., impurities or dopants, or intrinsic color centers in the glass, at an incident laser wavelength, combined with exemplary laser absorbing films some non-limiting examples of films include $SnO2$, $ZnO$, $TiO2$, ITO, UV absorbing glass films with Tg<600° C., and low melting glass (LMG), or low liquidus temperature (LLT) films (for materials without a glass transition temperature) which can be employed at the interface of the glass substrates. LLT materials may include, but are not limited to, ceramic, glass-ceramic, and glass materials to name a few. LLT glass, for example, can include tin-fluorophosphate glass, tungsten-doped tin fluorophosphate glass, chalcogenide glass, tellurite glass, borate glass and phosphate glass. In another non-limiting embodiment, the sealing material can be a $Sn^{2+}$ containing inorganic oxide material such as, for example, SnO, $SnO+P_2O_5$ and $SnO+BPO_4$. Additional non-limiting examples may include near infrared (NIR) absorbing glass films with absorption peaks at wavelength >800 nm. Welds using these materials can provide visible transmission with sufficient UV or NIR absorption to initiate steady state gentle diffusion welding. These materials can also provide transparent laser welds having localized sealing temperatures suitable for diffusion welding. Such diffusion welding results in low power and temperature laser welding of the respective glass substrates and can produce superior transparent welds with efficient and fast welding speeds. Exemplary laser welding processes according to embodiments of the present disclosure can also rely upon photo-induced absorption properties of glass beyond color center formation to include temperature induced absorption.

The phenomenon of welding transparent glass sheets together with a laser using an interfacial thin film of low melting inorganic (LMG) material or ultraviolet absorbing (UVA) or infrared absorbing (IRA) material to initiate sealing is described herein. In exemplary embodiments, three criteria are described for realizing strong bond formation: (1) exemplary LMG or UVA or IRA films can absorb at an incident wavelength outside of window of transparency (from about 420 nm to about 750 nm) sufficient to propagate sufficient heat into the glass substrate, and the glass substrate can thus exhibit (2) temperature-induced-absorption and (3) transient color-center formation at the incident wavelength. Measurements suggest that a thermo-compressive or a cohesive diffusion welding mechanism is formed, qualitatively resulting in a very strong bond formation. The unfolding of temperature events related to the welding process and clear prevalence of color center formation processes in laser welding are also described herein. CTE-mismatch irrelevance between the LMG or UVA material and Eagle XG@ materials and post-weld strength enhancement after thermal cycling to 600° C. are also discussed. Embodiments are also discussed regarding the welding of glass sheets together that have different thicknesses by using thermally conductive plates. Embodiments described herein can thus provide an ability to form hermetic packages, with both passive and active devices, that can include laser sealing attributes associated with using LMG or UVA interfacial materials. Exemplary attributes include, but are not limited to, transparent, strong, thin, high transmission in the visible spectrum, "green" composition, CTE-mismatch irrelevance between LMG or UVA films and glass substrates, and low melting temperatures.

Additional embodiments of the present disclosure provide a laser sealing process having a low temperature bond formation and "direct glass sealing" where the transparent glass can be sealed to absorbing glass at the incident wavelength resulting in an opaque seal at visible wavelengths 400-700 nm. With exemplary embodiments, both glasses are transparent or almost transparent at incident laser wavelengths, and in the visible wavelength range. The resulting seal is also transparent in the visible wavelength range making it attractive for lighting applications as no light is absorbed at the seal location, and thus, no heat build-up is associated with the seal. In addition, since the film can be applied over the entire cover glass, there is no need to precision dispense sealing frit paste for the sealing operation thereby providing device manufacturers large degrees of freedom for changing their sealing pattern without need for special patterning and processing of the sealing area. In other embodiments, sealing can also be performed on certain spots of the glass area to form non-hermetic bonding for mechanical stability. Furthermore, such sealing can be performed on curved conformal surfaces.

Embodiments of the present disclosure provide low melting temperature materials which may be used to laser-weld glass sheet together that involve welding any glass without regard to the differing CTEs of the glass. Additional embodiments can provide symmetric welding (i.e., thick-to-thick) of glass substrates, e.g., Eagle-to-Eagle, Lotus-to-Lotus, etc. Some embodiments can provide asymmetric welding (i.e., thin-to-thick) of glass substrates, e.g., Willow-to-Eagle XG®, Eagle-to-Lotus (i.e., thin-to-thin), Eagle-to-Fused Silica, Willow-to-Willow, fused silica-fused silica, etc. using thermally conductive plates. Further embodiments can provide disparate substrate welding (glass to ceramic, glass to metal, etc.) and can provide transparent and/or translucent weld lines. Some embodiments can provide welding for thin, impermeable, "green", materials and can provide strong welds between two substrates or materials having large differences in CTEs.

Embodiments also provide materials used to laser weld glass packages together thereby enabling long lived hermetic operation of passive and active devices sensitive to degradation by attack of oxygen and moisture. Exemplary LMG or other thin absorbing film seals can be thermally activated after assembly of the bonding surfaces using laser absorption and can enjoy higher manufacturing efficiency since the rate of sealing each working device is determined by thermal activation and bond formation rather than the rate one encapsulates a device by inline thin film deposition in a vacuum or inert gas assembly line. Exemplary LMG, LLT and other thin absorbing films in UV or NIR-IR seals can also enable large sheet multiple device sealing with subsequent scoring or dicing into individual devices (singulation), and due to high mechanical integrity, the yield from singulation can be high.

In some embodiments an apparatus is provided comprising a first substrate having a first surface, a second substrate adjacent the first substrate, and a weld formed between an interface of the first substrate and the adjacent second substrate. The weld can be characterized by $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface.

In other embodiments an apparatus is provided comprising a first substrate having a first surface, a second substrate adjacent the first substrate, and a weld formed between an interface of the first substrate and the adjacent second substrate. The weld can be characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface.

In additional embodiments, a method of forming a vacuum insulated glass window is provided comprising the steps of providing a first glass substrate having a first surface and a first edge, providing a first plurality of spacers on the first surface, providing a second plurality of shims along a the first edge of the first glass substrate, bringing a second glass substrate having a second surface and a second edge in contact with the first plurality of spacers and the second plurality of shims so that the first and second glass substrates are spaced apart by a first distance between the first and second surfaces, laser sealing the first glass substrate to the second glass substrate along the first and second edges to define an interior region between the first and second glass substrates, and forming a vacuum pressure of less than one atmosphere in the interior region.

In further embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface.

In additional embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface.

According to an aspect of the present disclosure, an apparatus is disclosed that comprises a first substrate, a second substrate, an inorganic film provided between the first substrate and the second substrate and in contact with both the first substrate and the second substrate. The apparatus further comprises a laser welded zone formed between the first and second substrate by the inorganic film, where the laser welded zone is surrounded by a heat affected zone (HAZ). The HAZ is defined as a region in which $\sigma_{HAZ}$ is at least 1 MPa higher than the average stress in the first substrate and the second substrate, where $\sigma_{HAZ}$ is compressive stress in the HAZ, and where the laser welded zone is characterized by its $\sigma_{interface\ laser\ weld} > \sigma_{HAZ}$, where $\sigma_{interface\ laser\ weld}$ is the peak value of compressive stress in the laser welded zone.

According to some other embodiments, an electronic package incorporating the laser welded zone structure in forming a hermetic seal in an electronic packaging device is disclosed. Such electronic package comprises a first substrate, a second substrate, where one or both of the substrates comprise a recessed portion that forms an interior space for accommodating an active electronic device once the two substrates are bonded together. Examples of the active electronic device are OLEDs, micro-processors, and other semiconductor devices.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

These figures are provided for the purposes of illustration, it being understood that the embodiments disclosed and discussed herein are not limited to the arrangements and instrumentalities shown.

FIG. 7 is another modeling scheme according to embodiments of the present disclosure.

FIG. 8 is a diagram of an experimental arrangement for a 355 nm laser transmission (% T) through Eagle 0.7 mm glass substrate for % T versus time measurements.

FIG. 45 shows 2D stress fields of MMG film laser welded samples in which two surface plots of the retardance and processed-fast-axis Exicor Microimager images are shown on the left side. A stress magnitude surface plot with full quantitative compression and tension segmentation is shown on the right side. All plots are shown in grayscale.

FIG. 48 shows 2D stress fields of ZnO film laser welded samples in which two surface plots of the retardance and processed-fast-axis Exicor Microimager images are shown on the left side. A stress magnitude surface plot with full quantitative compression and tension segmentation is shown on the right side.

While this description can include specifics, these should not be construed as limitations on the scope, but rather as descriptions of features that can be specific to particular embodiments.

DETAILED DESCRIPTION

Various embodiments for luminescent coatings and devices are described with reference to the figures, where like elements have been given like numerical designations to facilitate an understanding.

It also is understood that, unless otherwise specified, terms such as "top," "bottom," "outward," "inward," and the like are words of convenience and are not to be construed as limiting terms. In addition, whenever a group is described as comprising at least one of a group of elements and combinations thereof, the group can comprise, consist essentially of, or consist of any number of those elements recited, either individually or in combination with each other.

Similarly, whenever a group is described as consisting of at least one of a group of elements or combinations thereof, the group can consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified Those skilled in the art will recognize that many changes can be made to the embodiments described while still obtaining the beneficial results of the invention. It also will be apparent that some of the desired benefits of the present disclosure can be obtained by selecting some of the described features without using other features. Accordingly, those of ordinary skill in the art will recognize that many modifications and adaptations are possible and can even be desirable in certain circumstances and are part of the invention. Thus, the following description is provided as illustrative of the principles of the present disclosure and not in limitation thereof.

Those skilled in the art will appreciate that many modifications to the exemplary embodiments described herein are possible without departing from the spirit and scope of the invention. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

Figure 1:
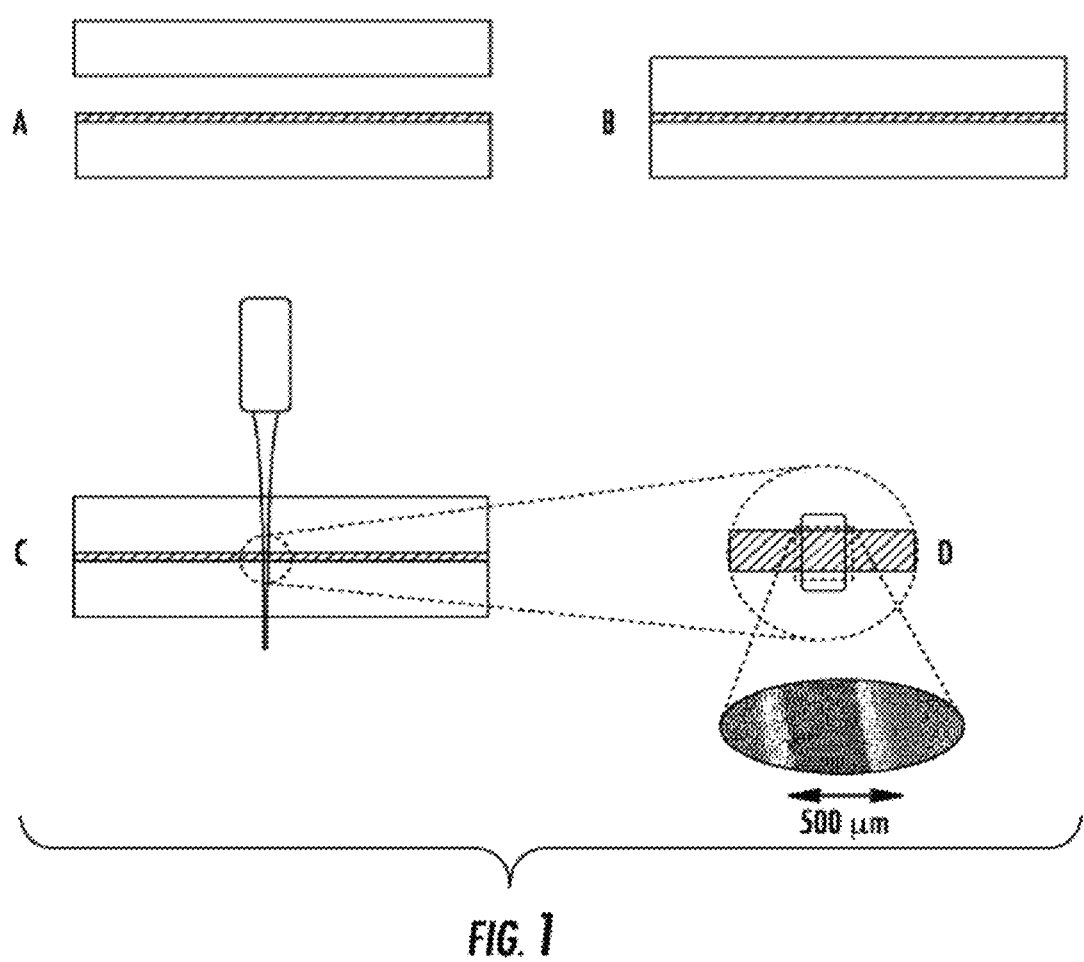
FIG. 1 is a schematic diagram of an exemplary procedure for laser welding according to an embodiment of the present disclosure.

FIG. 1 is a diagram of an exemplary procedure for laser welding according to some embodiments of the present disclosure. With reference to FIG. 1, a procedure is provided for laser welding of two Eagle XG® (EXG) glass sheets or substrates together using a suitable UV laser. While two EXG glass sheets are illustrated and described, the claims appended herewith should not be so limited as any type and composition of glass substrates can laser welded using embodiments of the present disclosure. That is, methods as described herein are applicable to soda lime glasses, strengthened and unstrengthened glasses, aluminosilicate glasses, etc. With continued reference to FIG. 1, a sequence of exemplary steps in laser-welding two glass substrates together is provided whereby one substrate can be coated with a low melting glass (LMG) or ultraviolet absorbing (UVA) film material or NIR absorbing (IRA) film material. In steps A to B, a top glass substrate can be pressed onto another substrate coated with an exemplary UVA, IRA or LMG film. It should be noted that many experiments and examples described herein may refer to a particular type of inorganic film (e.g., LMG, UVA, etc.). This, however, should not limit the scope of the claims appended herewith as many types of inorganic films are suitable for the welding processes described. In step C, a laser can be directed at an interface of the two glass sheets with suitably chosen parameters to initiate a welding process as illustrated in step D. The weld dimension was found to be slightly less than the dimensions of the incident beam (approximately 500 μm).

Figure 2:
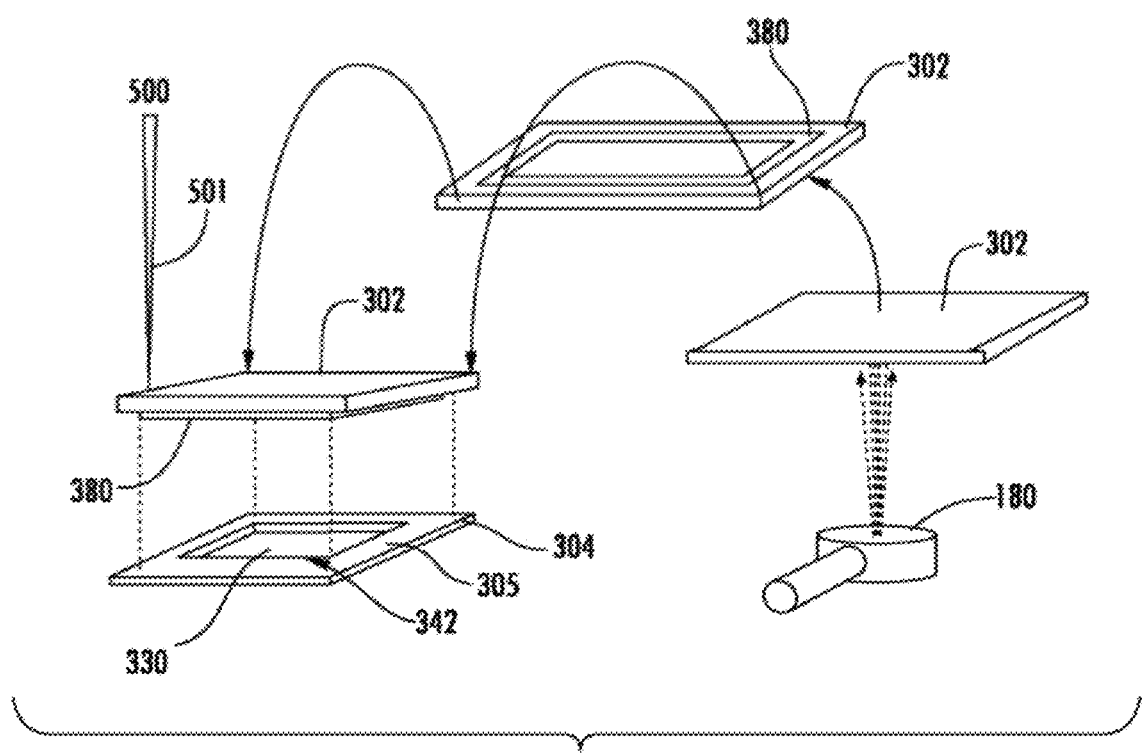
FIG. 2 is a schematic diagram illustrating the formation of a hermetically-sealed device via laser-sealing according to one embodiment.

FIG. 2 is a schematic diagram illustrating the formation of a hermetically-sealed device via laser-sealing according to one embodiment. With reference to FIG. 2, in an initial step, a patterned glass layer 380 comprising a low melting temperature (e.g., low Tg) glass can be formed along a sealing surface of a first planar glass substrate 302. The glass layer 380 can be deposited via physical vapor deposition, for example, by sputtering from a sputtering target 180. In one embodiment, the glass layer can be formed along a peripheral sealing surface adapted to engage with a sealing surface of a second glass or other material substrate 304. In the illustrated embodiment, the first and second substrates, when brought into a mating configuration and laser welded, cooperate with the glass layer to define a hermetically sealed interior volume 342 that contains a workpiece 330 to be protected. In the illustrated example, which shows an exploded image of the assembly, the second substrate comprises a recessed portion within which a workpiece 330 is situated. In this illustrated example, an inorganic absorptive film is applied to the periphery region 305 on the second substrate 304 and forms the laser welded sealing region with the patterned glass layer 380 surface of the first substrate 302. Such workpiece can be an active device such as an OLED, a micro-processor chip, or other semiconductor devices.

A focused laser beam 501 from a laser 500 can be used to locally melt the low melting temperature glass and adjacent glass substrate material to form a sealed interface. In one approach, the laser can be focused through the first substrate 302 and then translated (scanned) across the sealing surface to locally heat the glass sealing material. To affect local melting of the glass layer, the glass layer can preferably be absorbing at the laser processing wavelength. The glass substrates can be initially transparent (e.g., at least 50%, 70%, 80% or 90% transparent) at the laser processing wavelength.

In an alternate embodiment, in lieu of forming a patterned glass layer, a blanket layer of sealing (low melting temperature) glass can be formed over substantially all of a surface of a first substrate. An assembled structure comprising the first substrate/sealing glass layer/second substrate can be assembled as above, and a laser can be used to locally-define the sealing interface between the two substrates.

The laser 500 can have any suitable output to affect sealing. An exemplary laser can be a UV laser such as, but not limited to, a 355 nm laser, which lies in the range of transparency for common display glasses. A suitable laser power can range from about 1 W to about 10 W. The width of the sealed region, which can be proportional to the laser spot size, can be about 0.06 to 2 mm, e.g., 0.06, 0.1, 0.2, 0.5, 1, 1.5 or 2 mm. A translation rate of the laser (i.e., sealing rate) can range from about 1 mm/sec to 400 mm/sec or even to 1 m/sec or greater, such as 1, 2, 5, 10, 20, 50, 100, 200, or 400 mm/sec, 600 mm/sec, 800 mm/sec, 1 m/sec. The laser spot size (diameter) can be about 0.02 to 2 mm.

Suitable glass substrates exhibit significant induced absorption during sealing. In some embodiments, the first substrate 302 can be a transparent glass plate like those manufactured and marketed by Corning Incorporated under the brand names of Eagle 2000° or other glass. Alternatively, the first substrate 302 can be any transparent glass plate such as those manufactured and marketed by Asahi Glass Co. (e.g., AN100 glass), Nippon Electric Glass Co., (e.g., OA-10 glass or OA-21 glass), or Corning Precision Materials. The second substrate 304 can be the same glass material as the first glass substrate, or second substrate 304 can be a non-transparent substrate such as, but not limited to, a ceramic substrate or a metal substrate. Exemplary glass substrates can have a coefficient of thermal expansion of less than about $150\times10^{-7}/°$ C., e.g., less than $50\times10^{-7}$, $20\times10^{-7}$ or $10\times10^{-7}/°$ C. Of course, in other embodiments the first substrate 302 can be a ceramic, ITO, metal or other material substrate, patterned or continuous.

Figure 3:
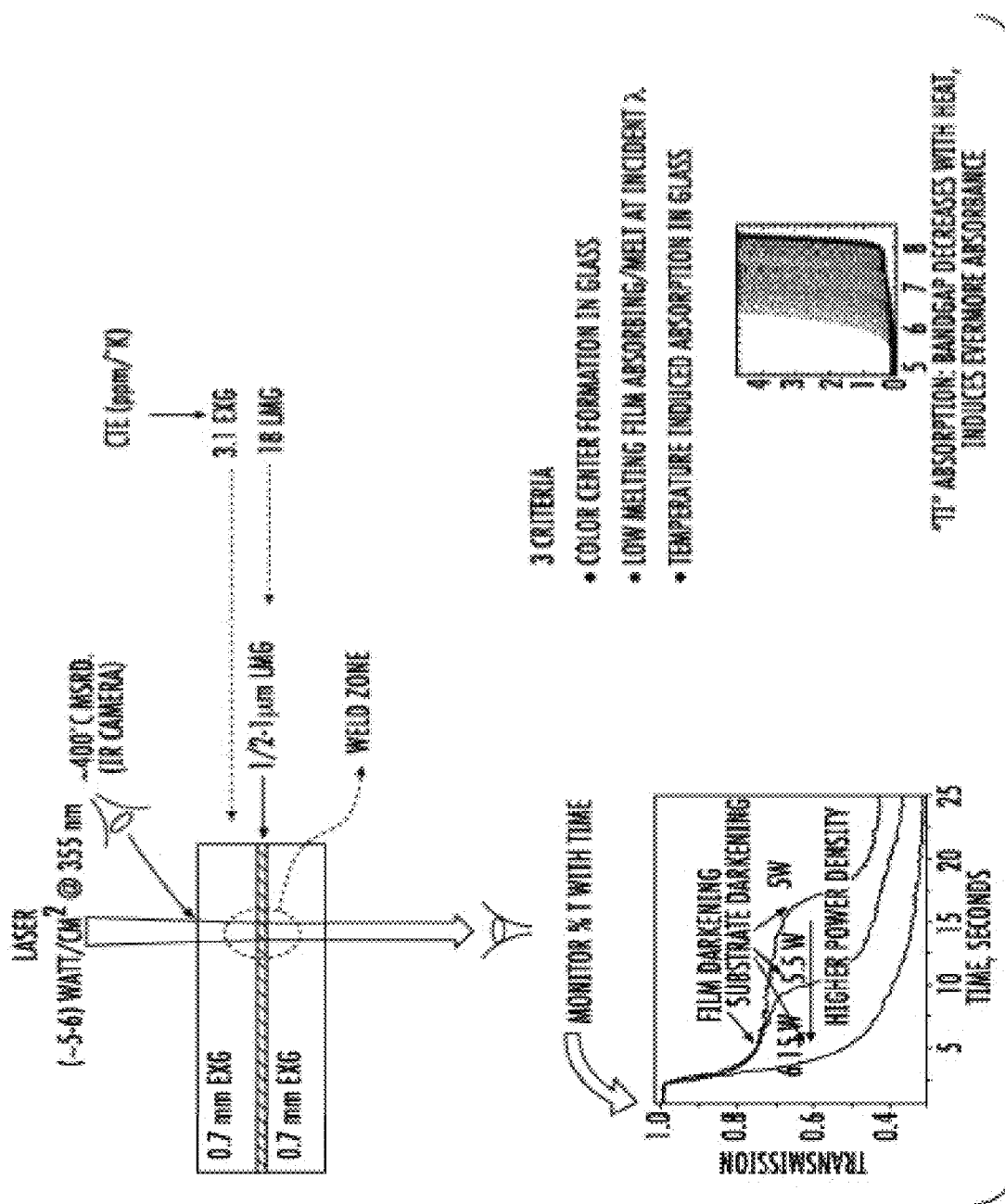
FIG. 3 is a diagram of another embodiment of the present subject matter.

FIG. 3 is a diagram of another embodiment of the present subject matter. With reference to FIG. 3, the upper left diagram illustrates some exemplary parameters that can be employed to laser weld two Eagle XG® (EXG) glass substrates. The transmission, % T, can be monitored over time and is illustrated in the lower left graph for three different laser powers. The onset of melting of the LMG, IRA or UVA film can be readily observed in the lower laser power curves (rightmost curves) as a "knee" like inflection followed by rapid absorption and heating of the glass substrate, due to high local glass temperatures exceeding Eagle XG®'s strain point. The inflection can be removed at higher laser powers (leftmost curve) and can induce a seamless transition from LMG, IRA or UVA absorption to glass fusion. Exemplary laser welding can include sweeping this zone along the interfacial boundaries to be bonded. Three criteria are described in the list shown in the lower right corner and in greater detail below, e.g., low melting film absorbs/melts at an incident wavelength, color center formation in the glass, and/or temperature induced absorption in the glass in some embodiments. The absorption of the film may be sufficient alone without effect of color center formation or even temperature absorption effect. It should be noted that the order of events identified in FIG. 3 should not limit the scope of the claims appended herewith or be indicative of relative importance to the other listed events.

In some embodiments, the initiating event can be the UV laser absorption by the low melting glass (e.g., LMG or UVA) film. This can be based upon the larger absorbance of the thin film compared to Eagle XG® at 355 nm and the melting curves depicted in FIG. 3. Considering the experimental arrangement illustrated in the top left portion of FIG. 3, the laser was a Spectra Physics HIPPO 355 nm, generating 8-10 ns pulses at 30 kHz, up to 6.5 Watts of average power. The laser beam was focused to a 500 micron diameter beam waist, and the transmitted beam was monitored and sampled, yielding plots of the transmission percentage (% T) with time for different laser powers (5.0 W, 5.5 W, 6.0 W). These plots are shown in the lower left part of FIG. 3. The onset of melting of the UVA, IRA or LMG film can be readily observed in FIG. 3 at lower laser power (bottom and middle curves) as the knee like inflection followed by rapid absorption and heating of the glass substrate, due to high local glass temperatures, which exceed Eagle XG®'s strain point. The glass parts being welded may not be melted but are rather only softened so they become pliant when held in intimate contact with a modest applied force. This behavior can be similar to solid state diffusion bonding, particularly in the ability to form strong bonds at between 50-80% of the substrate's melting temperature. An optical cross sectional image of the solid-state bond's birefringence illustrates a distinct interface line between the two parts being welded (see, e.g., FIG. 4).

Another embodiment includes welding with a 355-nm pulsed laser, producing a train of 1 ns pulses at 1 MHz, 2 MHz or 5 MHz repetition rates. When focusing the beam on the inorganic film into a spot between 0.02 mm and 0.15 mm diameter and welding with speeds ranging from 50 mm/s to 400 mm/s, defect-free bonding lines of approximately 60 µm to approximately 200 µm were produced. Required laser powers can range from approximately 1 W to approximately 10 W.

Figure 4:
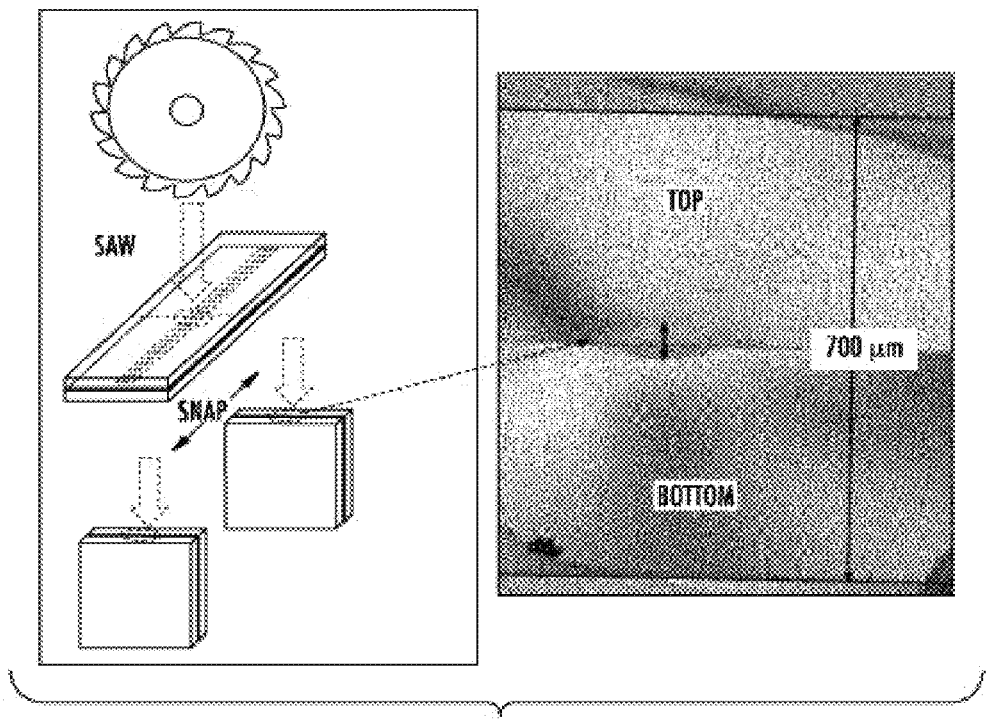
FIG. 4 is an illustration of an experimental arrangement used to estimate physical extent of a laser welding bonding zone.

With reference to FIG. 4, an experimental arrangement is illustrated which was used to estimate physical extent of laser welding bonding zone. With continued reference to FIG. 4, two Eagle XG® slides were laser welded as previously described, mounted in a glass sandwich and cut with a diamond saw. This is illustrated in the left panel of FIG. 4. The resulting cross section was mounted in a polarimeter to measure the optical birefringence resulting from local stress regions. This is shown in the right panel of FIG. 4. The lighter regions in this right panel indicate more stress. As illustrated in the right panel of FIG. 4, a bonded region appeared having a physical extent on the order 50 microns. Further, there does not appear to be any base or substrate glass melting, however, the bond formed between the two glass substrates was very strong. For example, the image in the center of the birefringence image cross section depicts a solid-state bond region extending deep (50 microns) into the Eagle XG® substrate which illustrates a high seal strength. Laser welding would include sweeping this zone along the interfacial boundaries to be bonded.

Figure 5:
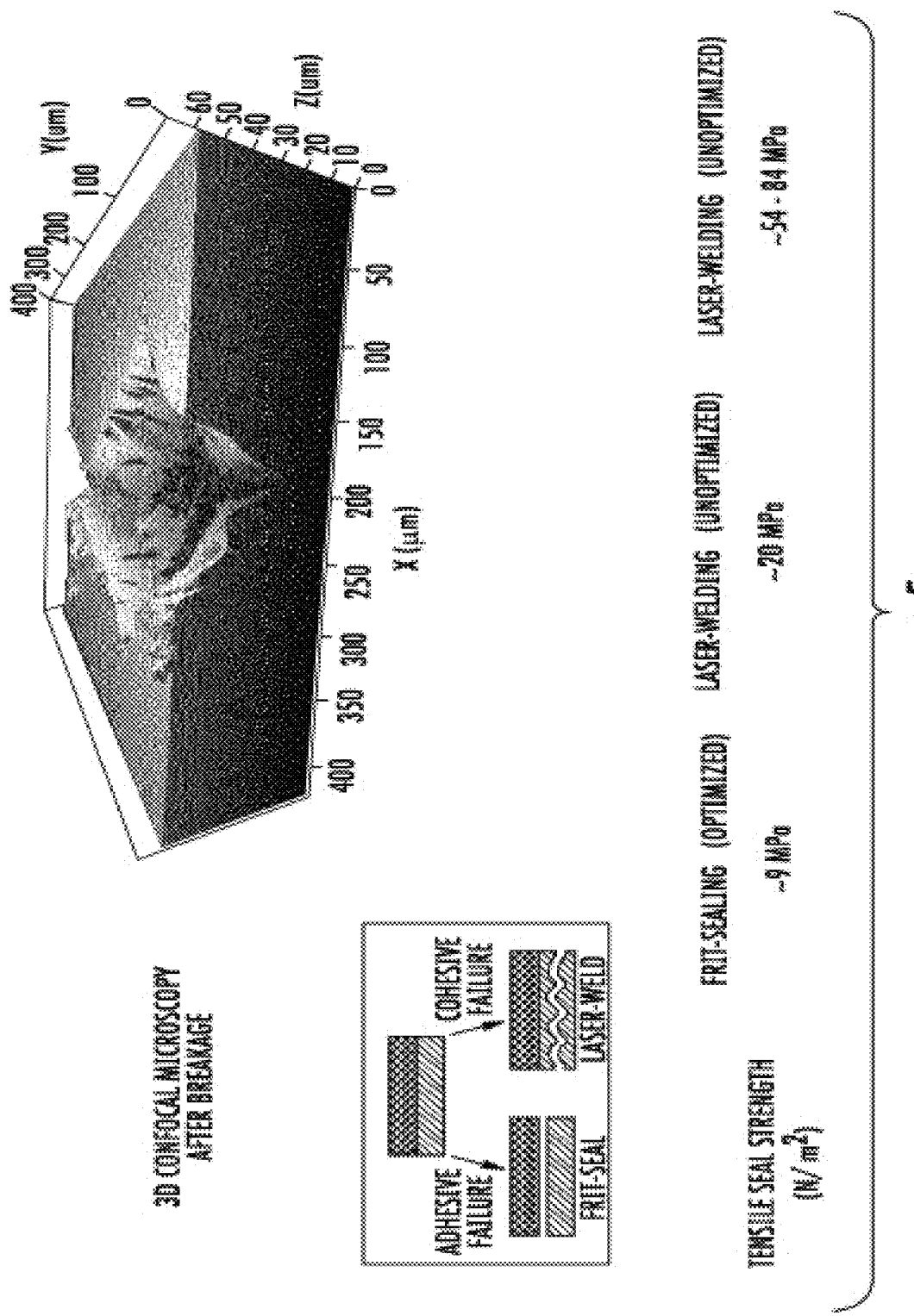
FIG. 5 is a microscopic image of fractured samples.

FIG. 5 is a microscopic image of a fractured sample. With reference to FIG. 5, the illustrated three dimensional confocal microscopic images of a fractured sample illustrate that the seal strength of embodiments of the present disclosure can be sufficiently strong such that failure occurs by ripping out the underlying substrate (e.g., Eagle XG® substrate) material as deep as 44 µm (i.e., a cohesive failure). No annealing was performed on the samples. FIG. 5 further illustrates a fractured sample of a non-annealed laser welded embodiment subjected to a razor blade crack opening technique. A series of three dimensional confocal measurements were made, and a representative example is shown on the right side of FIG. 5. One feature of these confocal images shows a cohesive failure mode nature of an exemplary cohesive diffusion weld according to some embodiments and its associated tensile strength. As described herein, a cohesive-diffusive weld is a strong interfacial bond (weld) formed at temperatures less than the melting point of the joining substrates under applied pressure (diffusion welding). Such welds exhibit a cohesive failure, where breakage, at elevated stress, occurs at interior substrate locations. Temperatures significantly lower than the substrate melting temperature have been observed (for example, near strain point substrate temperatures, or softening point substrate temperature) to provide strong interfacial seal strength under suitable contact pressure conditions. Tensile stress σ as referred to herein is generally the maximum stress that a material, weld, or substrate interior can withstand while being stretched or pulled before failing or breaking. Tensile strength measurements were performed and the difference between cohesive and adhesive failure in frit, and welded glass sheet, was observed (see FIG. 5). It should be noted that the terms tensile stress, tensile strength, and/or tensile seal strength are used interchangeably herein and such use should not limit the scope of the claims appended herewith. As shown in the illustration, the interfacial seal strength can be sufficiently strong so that failure occurs within the bulk of the substrate material, e.g., as deep as 44 µm away from the interface in this instance and in other experiments as deep as approximately 200 µm. In additional experiments, polarimetry measurements showed a residual stress occurring in the nascent laser weld (the same condition studied in FIG. 5) that was annealed at 600° C. for one hour, resulting in a tenacious bond exhibiting no measurable stress via polarimetry. Attempts at breaking such a bond resulted in breakage everywhere else except the seal line of the welded substrates. In comparison to adhesive failures that occur with frit seals, lower tensile seal strength measurements made of frit (adhesive) seals (<9 MPa) versus laser welds (cohesive) (between 20-84+ MPa) were found under similar package geometries illustrating strong laser weld tensile strength.

As noted in FIG. 3, strong, hermetic, transparent bonds can be achieved using embodiments of the present disclosure by an exemplary low melting film or another film that absorbs/melts at an incident wavelength, color center formation in the film and glass, and temperature induced absorption in the film and glass. With regard to the first criterion, e.g., the low melting glass absorption event, laser illumination of the glass-LMG/UVA-glass structure with sufficiently high power per unit area can initiate absorption in the sputtered thin film LMG/UVA interface, inducing melting. This can be readily observed in the bottom curve of FIG. 3 in the lower left corner. The first downward slope of the bottom curve tracks the LMG/UVA melting process out to about 15 seconds, at which point another process occurs, this one being a glass-laser interaction (i.e., color center formation) in the respective substrate. The large curvature of this middle downward curve, after about 17 seconds would indicate a large absorption resulting from color centers forming in the glass. These color centers can generally be a function of the elemental impurity content in the substrate, e.g., As, Fe, Ga, K, Mn, Na, P, Sb, Ti, Zn, Sn to name a few. The more curvature in the transmission curve, the more color centers form. This is the second criterion noted in FIG. 3. The melting point of the LMG/UVA film can be, but is not limited to, about 450° C., but the interfacial temperature can likely be above 660° C. based upon observations of a laser illumination experiment with a surrogate aluminum-coated EXG glass substrate under similar laser welding conditions. In this experiment, the aluminum melted (melting temperature: 660° C.), and the surface temperature was measured with a calibrated thermal imaging camera (FLIR camera) to be about 250° C. using laser welding conditions.

Figure 6:
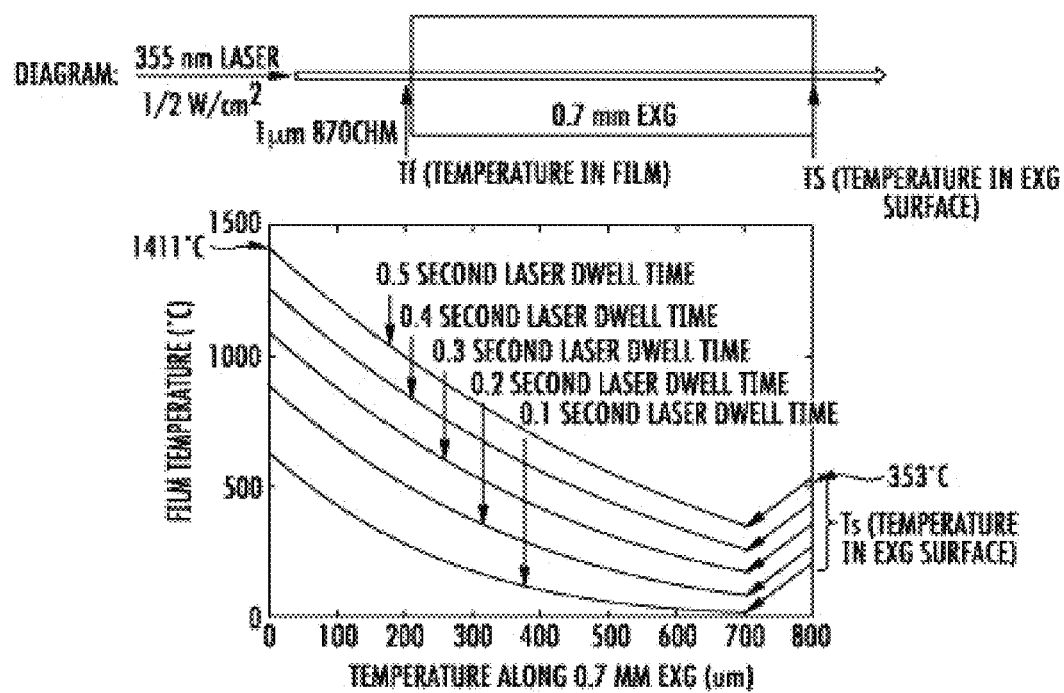
FIG. 6 is an illustration of a modeling scheme according to some embodiments of the present disclosure.

FIG. 6 is an illustration of a modeling scheme according to some embodiments of the present disclosure. With reference to FIG. 6, LMG/UVA and EXG material thermal transport properties were used to model a 355 nm laser hitting a two-layer stack comprising 1 µm thin inorganic film+700 µm EXG, at 0.8-3 kW/cm². No phase change in the thin inorganic film (e.g., LMG, IRA, UVA film, etc.) was accounted for in the model. With continued reference to FIG. 6, estimates of the instantaneous thermal distribution were made suggesting interfacial temperatures greater than 660° C. can be achieved. Regardless of the exact interfacial temperatures above 660° C. that are achieved, the presence of the hot melted LMG/UVA interfacial film increases absorption in the glass substrate by shifting energy band gap to a lower energy. These band gap shifts are generally understood to arise from the thermal expansion of the substrate lattice, related to the change of the electron energies, and the direct renormalization of band energies due to electron-photon interactions. A plot of this behavior in fused silica is shown in the lower right corner of FIG. 3. The net effect is that the hot LMG/UVA film drives more absorption in the EXG substrate near the interface by lowering the band gap which in turn generates more heat from an internal conversion processes, lowering the band gap even further. This process can be collectively referred to as thermally induced absorption which represents the third criterion identified in FIG. 3. Of course, other inorganic films can be used in such embodiments and such examples should not limit the scope of the claims appended herewith.

As noted above, color center formation plays a role in the formation of laser welds according to embodiments of the present disclosure. Modeling the basic color center formation processes under non-multiphoton conditions to derive a fitting function based on a three level diagram is illustrated in FIG. 7 using an experimental arrangement depicted in FIG. 8. FIG. 7 is another modeling scheme according to embodiments of the present disclosure. In the left panel of FIG. 7, three electronic glass band states absorb 355 nm photons, building up, or depleting population in the ground state $n_{cc}[t]$, the conduction band $n_e[t]$, and color centers $n_{cc}[t]$. It should be noted that single-headed arrows represent laser absorption, and double-headed arrows represent both stimulated absorption and emission. In the right panel of FIG. 7, rate equations are provided which predict the smooth monotonic build up and depletion of electronic level populations while the coherently driven parts of the system exhibit rapid oscillations of the same populations ($n_g \leftrightarrow n_e$). The initial conditions of the three levels are provided in the bottom row of the right panel of FIG. 7. FIG. 8 is a diagram of an experimental arrangement for a 355 nm laser transmission (% T) through an Eagle 0.7 mm glass substrate for % T versus time measurements. With reference to FIG. 8, diagnostic packaging can measure integrated energy and temporal waveform of UV pulses after passing through a fused silica window and Eagle XG® glass sheet with approximately 5 to 6 W being the average power.

Figure 9:
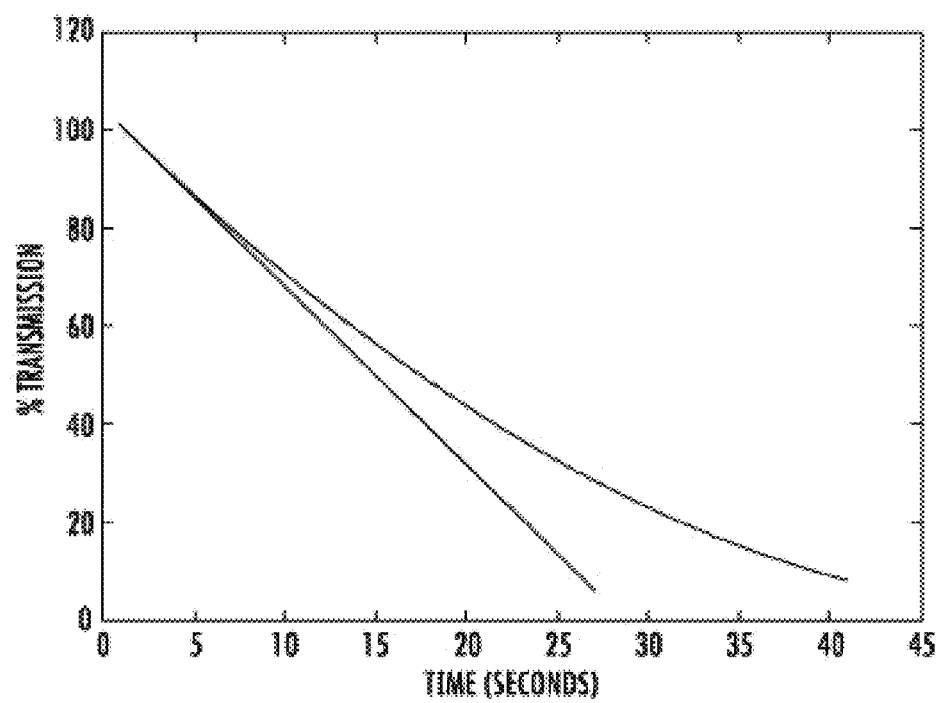
FIG. 9 is a plot according to an embodiment of the present disclosure.

Equation (1) below describes an experimental observable absorbance (Abs) versus time, e.g., related to transmission (trans) versus time data: (1.apprxeq.Abs+Trans). The solution can be a sum of rising and decaying exponents, but can be simplified to following expression:

$$\text{Abs.} \cong -\alpha + \alpha I(\sigma_g - \sigma_{esa}) \cdot t + \frac{\alpha i \sigma_g}{2}[k_{ec}(\sigma_{esa} - \sigma_{cc}) - k_f(\sigma_{esa} - \sigma_g) + I(\sigma_{esa}^2 + 2\sigma_{esa}\sigma_g - 2\sigma_g^2)] \cdot t^2 \quad (1)$$

where α represents the linear absorption coefficient (cm⁻¹), I represents the laser flux (photons/cm² sec), $\sigma_g$ represents the ground state absorption cross section (cm²), $\sigma_{esa}$, represents excited state absorption cross section (cm²), $\sigma_{cc}$ represents the color-center absorption cross section (cm²), $k_{ec}$ represents the transient color center rate, and $k_f$ represents the fluorescence decay rate. With reference to Equation (1) and FIG. 8, the role color center formation has in embodiments of the present disclosure can be observed. FIG. 9 is a plot according to an embodiment of the present disclosure. With reference to FIG. 9, a plot of Equation (1) is provided in the presence of color center formation (the illustrated arc), and in the absence of color center formation (the illustrated line) for certain, non-limiting, laser-glass interaction parameters: α=0.01 cm⁻¹, I=4.6·10⁻²¹ photons/cm²·sec, $\sigma_g$=1.20·10⁻¹⁷ cm², $\sigma_{esa}$=1.21 10⁻¹⁷ cm², $\sigma_{cc}$=2.20 10⁻¹³ cm², $k_{ec} \approx k_f \approx 1.0$ 10⁷ sec⁻¹. Setting $\sigma_{cc}$=0, a linear dependence could be made. % Transmission was then formed by the relation that % Transmission=100−% Absorbance. As FIG. 9 illustrates, it follows that simply zeroing the color center formation term (i.e., setting $\sigma_{cc}$=0) transformed the arc to a line using reasonably selected parameter values. Experimentally laser-welded glass substrates generally exhibited this curvature, including without limitation, Eagle XG®, Lotus XT®, Willow, and combinations Willow-to-Willow, Willow-to-Lotus, and Willow-to-Eagle.

Figure 22:
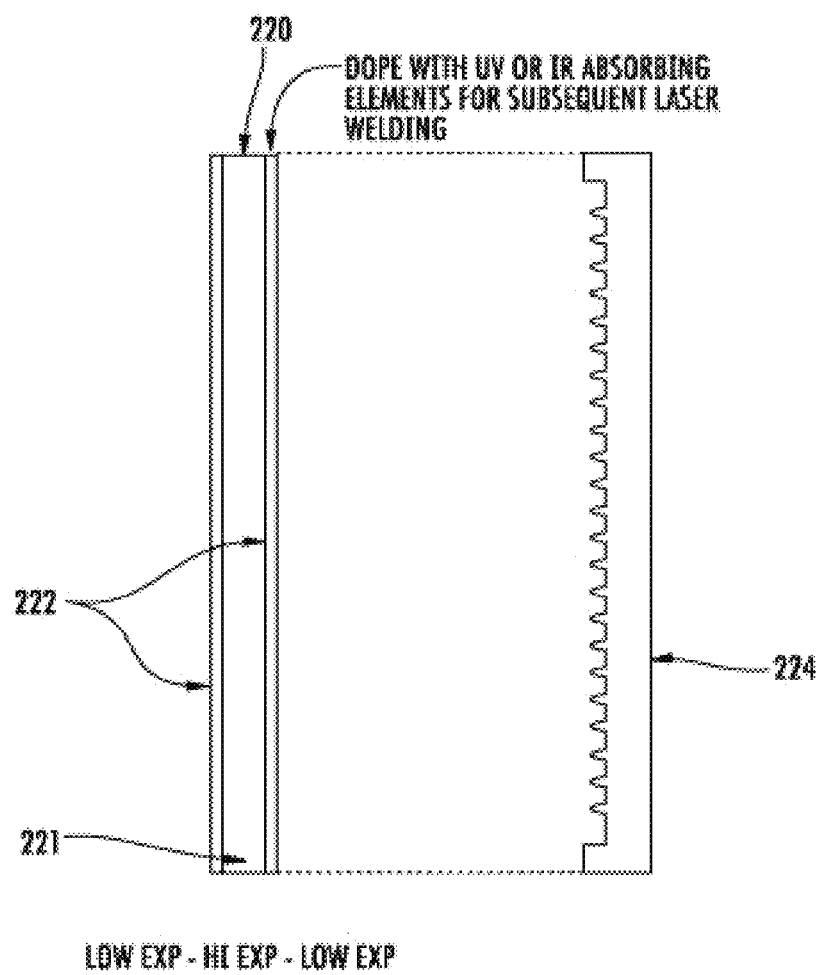
FIG. 22 is a simplified illustration of some embodiments of the present disclosure.

While embodiments have been described using glass substrates having the same or different compositions fused together (one or both containing the appropriate absorption properties with respect to the incident laser wavelength), other embodiments can include a three layer, or more, structure as well, as long as the outer layer is UV or appropriately absorbing with respect to the incident laser wavelength such that another glass substrate can make sufficient contact and weld. Thickness of the absorbing layer can be as large as 100 um. In additional embodiments a glass-glass laminate structure can be substituted for one or both of the glass substrates. In such an embodiment, the outer clad of the glass-glass laminate structure could serve as the UV absorbing layer for subsequent laser welding (see, e.g., FIG. 22). FIG. 22 illustrates another embodiment of the present disclosure having a glass-glass laminate on a first side having an inner core 221 intermediate two outer dads 222. In this embodiment, one clad 222 can be doped with a UV or IR absorbing element for subsequent laser welding to another substrate 224, in this non-limiting example, a 3D-formed substrate. In such embodiments, doping the clad can avoid high cost, such as sputtering deposition, ion exchange, etc.

Figure 10:
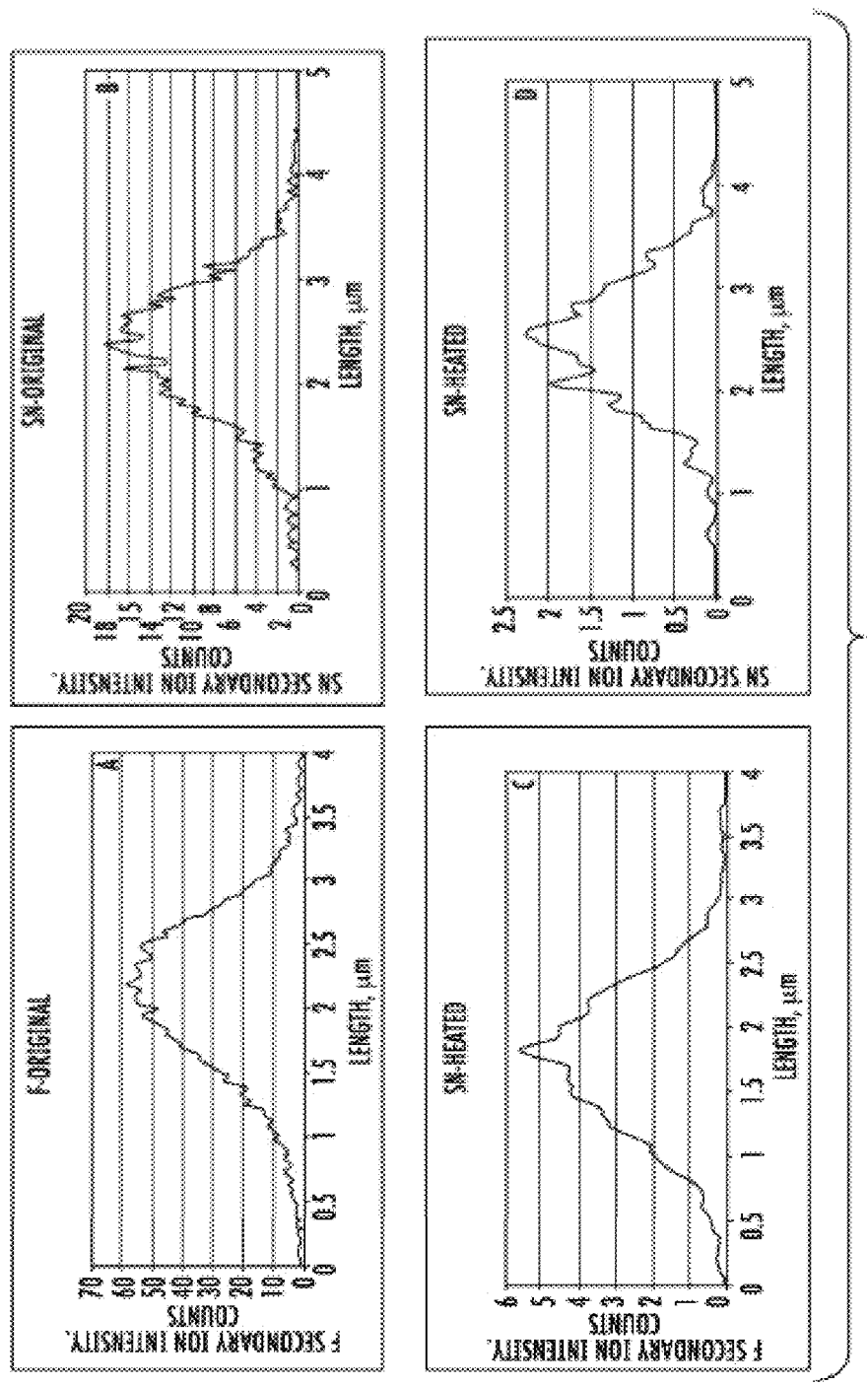
FIG. 10 is a series of plots analyzing diffusion into an Eagle XG® glass substrate from an LMG film layer at the glass interface.

FIG. 10 provides plots analyzing diffusion into an Eagle XG® glass substrate from an exemplary LMG film layer at the glass interface. With reference to FIG. 10, TOF-SIMS was applied to analyze possible diffusion into an Eagle XG® glass substrate from an LMG film layer at the glass interface having an exemplary non-limiting composition (38% SnO, 40% SnF₂, 20% P₂O₅, 2% Nb₂O₅) and with a thickness of about 0.8 µm under suitable laser-welding conditions. F and Sn line scans over the original interface (a, b) and over the interface subjected to laser welding (c, d) indicate the extent of diffusion away from the interface is small while fluorine migrated approximately half a micron away from the interface and, on average, the tin did not significantly move. Thus, FIG. 10 provides evidence illustrating the lack of significant LMG-material diffusion into an exemplary substrate. Similar findings are also observed with other exemplary inorganic thin films (UVA, IRA, etc.). While one might expect significantly more diffusion of mobile atomic species utilized in embodiments of the present disclosure on the basis of the apparent large CTE mismatch between the interfacial materials, $CTE_{870CHM}=18$ ppm/° C. versus $CTE_{EXG}=3.1$ ppm/° C., no delamination was observed. Rather, repeated cycling of temperatures as high as 600° C. appeared to remove any residual stress, resulting in a stronger bond. The resulting inorganic thin film was sufficiently thin that the delamination forces due to CTE mismatch in the respective glass substrates were much less than the bonding forces. This corresponds to the knowledge that a laminate structure's composite stress from an adhered film's deposition-stress scales with the cube of the film thickness.

Figure 11:
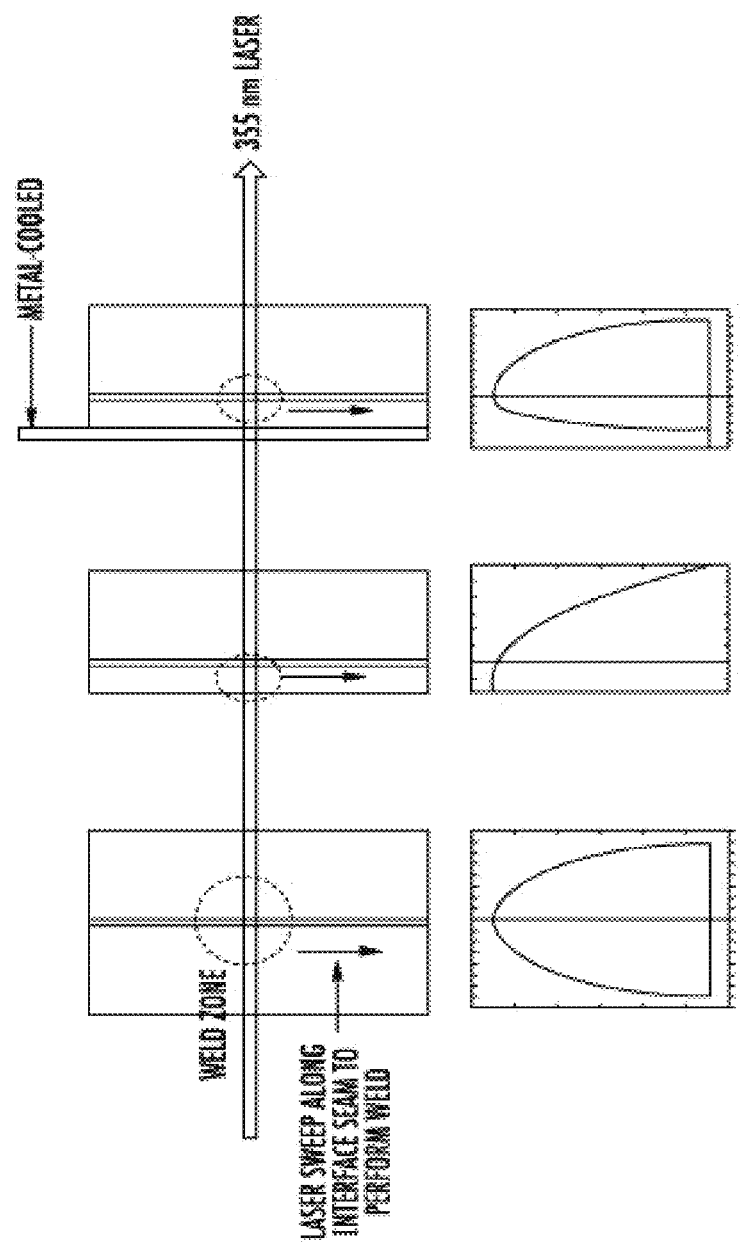
FIG. 11 is a schematic illustration of the performance of laser welding between different thickness glass sheets.

FIG. 11 is a schematic illustration of the performance of laser welding between different thickness glass sheets. With reference to FIG. 11, it was discovered that welding ultra-thin Willow glass (0.1 mm) to Eagle XG® glass (0.7 mm), i.e., an "asymmetric" case, a poor weld can result. In a "symmetric" Eagle-to-Eagle case (left side of FIG. 11), a thermally hot zone was swept along the glass interface to perform a superior weld. A respective temperature distribution is illustrated below each depiction. When using dissimilarly thick glass sheets, an asymmetric thermal zone, however, occurs that can result in a poor weld in some cases, e.g., when welding Willow-to-Eagle (middle diagram of FIG. 11). Exemplary embodiments, however, can provide a solution to this asymmetric welding problem which is illustrated on the right side of FIG. 11 with use of a thermally conductive plate that can dissipate any heat and cool the thin glass sheet to effectively restore the thermal hot zone resulting in the formation of a strong welded bond. Thus, some embodiments herein described can employ the use of thermally conductive plates to laser weld glass sheets having different thicknesses.

While the description heretofore has described laser welding of glass to glass substrates (of similar or different dimensions, geometries, and/or thicknesses), this should not limit the scope of the claims appended herewith as embodiments are equally applicable to substrates or sheets of non-glass materials, such as, but not limited to ceramics, glass-ceramics, metals, and the like with, or without, an interfacial conductive film. For example, exemplary laser welding methods may be used over ITO leads on a substrate, electrodes, or an ITO patterned film (to name a few) as described in co-pending and co-owned U.S. application Ser. No. 14/271,797, the entirety of which is incorporated herein by reference thereto. Thus, embodiments of the present disclosure are applicable to laser sealing of glass to glass, metal, glass-ceramic, ceramic and other substrates of equal or different dimensions, geometries and thicknesses.

Applications that may utilize embodiments described herein having efficient formation of high bond-strength, transparent, glass-to-glass welds are numerous and include, but are not limited to, solid state lighting, display, and transparent vacuum insulated technologies. Laser welding of glass, in particular, can provide efficiencies and features such as a small heat affected zone (HAZ) that many traditional welding methods, such as e-beam, arc, plasma, or torch simply cannot provide. In some embodiments, laser glass welding can generally proceed without pre- or post- heating using infrared (IR) lasers for which many glasses are opaque or ultra-short pulse lasers (USPL) for which many glasses are transparent. In some embodiments, a judicious choice of glass substrate compositions and interfacially distributed IR absorbing frit can make hermetic glass "sandwich-type" laser sealed packages possible. In some embodiments, ultra-short pulsed lasers can be focused at either surface or interior points in an exemplary glass substrate and can induce absorption by non-linear processes such as multi-photon or avalanche ionization. These processes originate from promotion of valence electrons to conduction electrons that are free to absorb further, enabling internal glass melting without generating substrate-surface damage. Significant stress fields arise under all these USPL laser welding methods reliant on non-linear absorption processes.

Heretofore, a low-power laser-welding process has been described that relies on an absorbing low melting glass interfacial film and can be attributed to diffusion welding, owing to its low temperature bond formation (as low as half the melting temperature), and requirement for contact and pressure conditions. As discussed above, several effects were notable to laser welding glass sheets together with strong bond formation, e.g., an absorbing low melting glass film at the incident laser wavelength, laser induced color centers formed in the glass substrates, and thermal induced absorption in the substrate to effectively accelerating the temperature increase.

In some embodiments, however, many films highly absorbing at an incident wavelength (e.g., 355 nm) can be sufficient to induce high bond strength laser welds. Other films, for example, ZnO or $SnO_2$, are chemically different than some exemplary low melting glass compositions described herein but share the same laser welding capability at a relatively low light flux. Thus, it was discovered that the low melting character may not be necessary in some embodiments, in light of the melting temperature of ZnO (1975° C.) as compared with some low melting glass compositions (450° C.). It was discovered, however, that a unifying characteristic of these films was that they absorb radiation substantially at 355 nm: ZnO absorbance 45% (200 nm thick film), and low melting glass about.15% (200 nm thick film). It was also determined that exemplary methods described herein could laser weld quartz, or pure fused silica substrates—i.e., substrates without color centers. Thus, it has been determined that color centers are not necessarily essential but may be needed in some embodiments when absorption of an exemplary film is low (e.g., $\approx Abs<20\%$).

Figure 15:
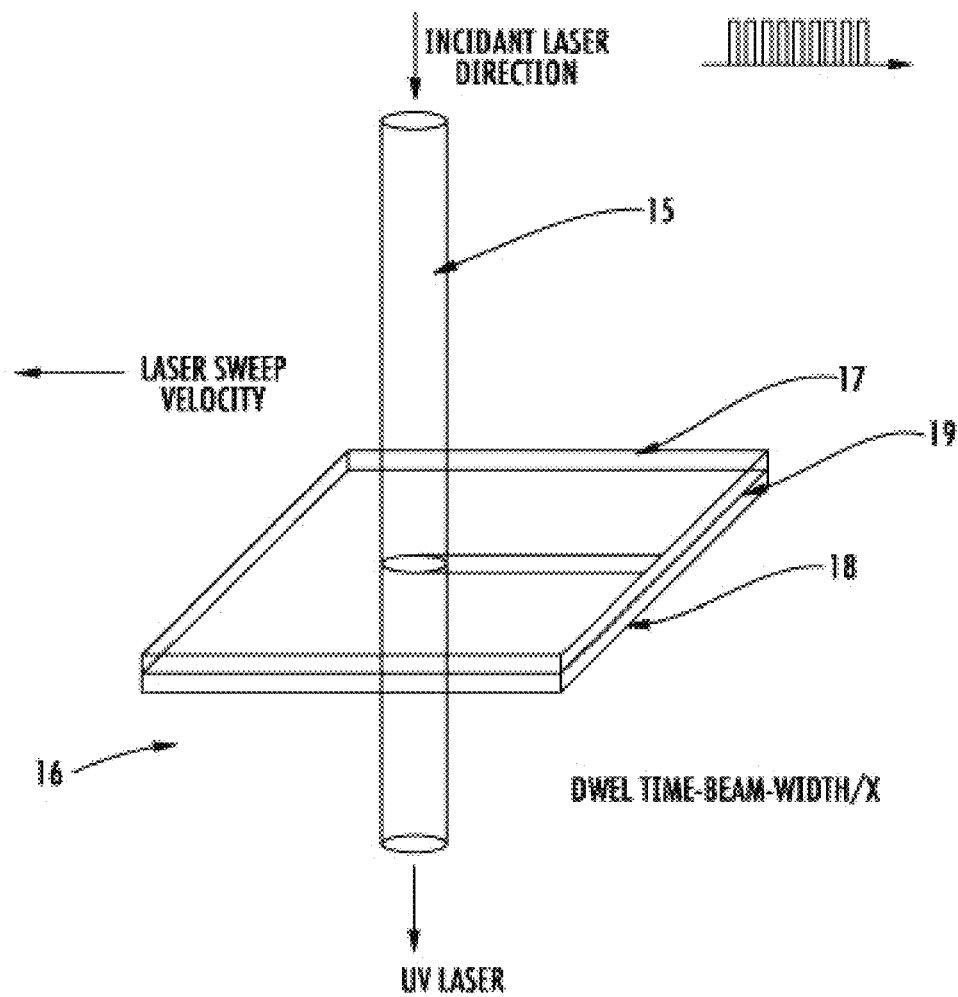
FIG. 15 is a simplified diagram of another method according to some embodiments.

FIG. 15 is a simplified diagram of another method according to some embodiments. With reference to FIG. 15, a defocused laser 15 with a defined beam width w is incident on a sandwich-type structure 16 formed from contacting two sheets of glass 17, 18, with one sheet's interior interface coated with a thin absorbing film 19. While the beam is illustrated as cylindrical, such a depiction should not limit the scope of the claims appended herewith as the beam can be conical or another suitable geometry. The film material can be selected for its absorbance at the incident laser wavelength. The laser 15 can be translated at a predetermined speed, $v_s$, and the time the translating laser beam can effectively illuminate a given spot and can be characterized by the dwell time, $w/v_s$. In some embodiments, modest pressure can be applied during the welding or bonding event, ensuring a sustained contact between the clean surfaces, while any one or several parameters are adjusted to optimize the weld. Exemplary, non-limiting parameters include laser power, speed $v_s$, repetition rate, and/or spot size w.

As noted above with reference to FIG. 3, it was discovered that optimum welding can be a function of three mechanisms, namely, absorption by an exemplary film and/or substrate of laser radiation and the heating effect based of this absorption process, increase of the film and substrate absorption due to the heating effects (band gap shift to the longer wavelength) which can be transient and depends upon the processing conditions, and defect or impurity absorption or color center absorption generated by UV radiation. Thermal distribution can be an important aspect of this process, and the discussion below can be used to assist in the understanding of temperature distribution at the interface between two substrates, assuming static absorption at the interface.

El-Adawi developed an analytical model of laser-heating a two-layer stack consisting of an absorbing film of thickness Z, on a large semi-infinite slab substrate. The heat diffusion equation in each material was solved with matched boundary conditions yielding expressions of temperature as a function of time and position with the film and substrate: $T_f(t,z)$, $T_S(t,z)$. El-Adawi's model assumed thermal properties (diffusivity, D, conductivity, k, heat capacity, $C_P$) of the film and substrate were fixed, such that absorption occurred only in the surface and no phase changes occurred. Laplace transforms were used yielding summations with exponential and error (complementary) function terms:

$$T_f(z_f, t) = \sum_{n=0}^{\infty} \frac{I_o A_f}{k_f} B^{n+1} \left[ \frac{L_f}{\sqrt{\pi}} e^{-\frac{a_n^2}{L_f^2}} - a_n \cdot \text{erfc}\left(\frac{a_n}{L_f}\right) \right] + \quad (2)$$

$$\sum_{n=0}^{\infty} \frac{I_o A_f}{k_f} B^n \left[ \frac{L_f}{\sqrt{\pi}} e^{-\frac{b_n^2}{L_f^2}} - b_n \cdot \text{erfc}\left(\frac{b_n}{L_f}\right) \right]$$

$$T_s(z_s, t) = \sum_{n=0}^{\infty} \frac{2 I_o A_f}{k_f} \frac{B^n}{(1+\varepsilon)} \left[ \frac{L_f}{\sqrt{\pi}} e^{-\frac{g_n^2}{L_f^2}} - g_n \cdot \text{erfc}\left(\frac{g_n}{L_f}\right) \right]$$

where $A_f$ represents the surface absorbance of the thin film, $I_O$ represents the laser flux (photons/cm²·sec), n represents an integer (0.1≤n≤∞), and all subscripts, f, refer to the film parameters while subscripts, s, refer to the substrate's parameters. B, and ε are related to material properties: B=1−ε/1+ε<1, ε=($k_S/k_f$) $D_f/D_S$), while $L_f$ also includes time t: $L_f^2$=4$D_f$t. The time and space range for the thin film layer can be provided as: 0≤t, 0≤$z_f$≤Z, respectively, where Z represents the film thickness. The time and space range for the substrate layer are provided as: $t_s$<t, Z≤$z_s$≤∞, respectively, where $t_s$ represents the time it takes the temperature of the film's backside to begin deviation from room temperature after initial laser-film incidence ($t_s$=$Z^2$/6$D_f$). Expansion coefficients are related to independent variables and material properties through the following expression:

$$a_n = 2Z(1+n) - z, \; b_n = 2nZ + z_f, \; g_n = (1+2n)Z + z_s \sqrt{\frac{D_f}{D_s}} \quad (3)$$

Figure 12:
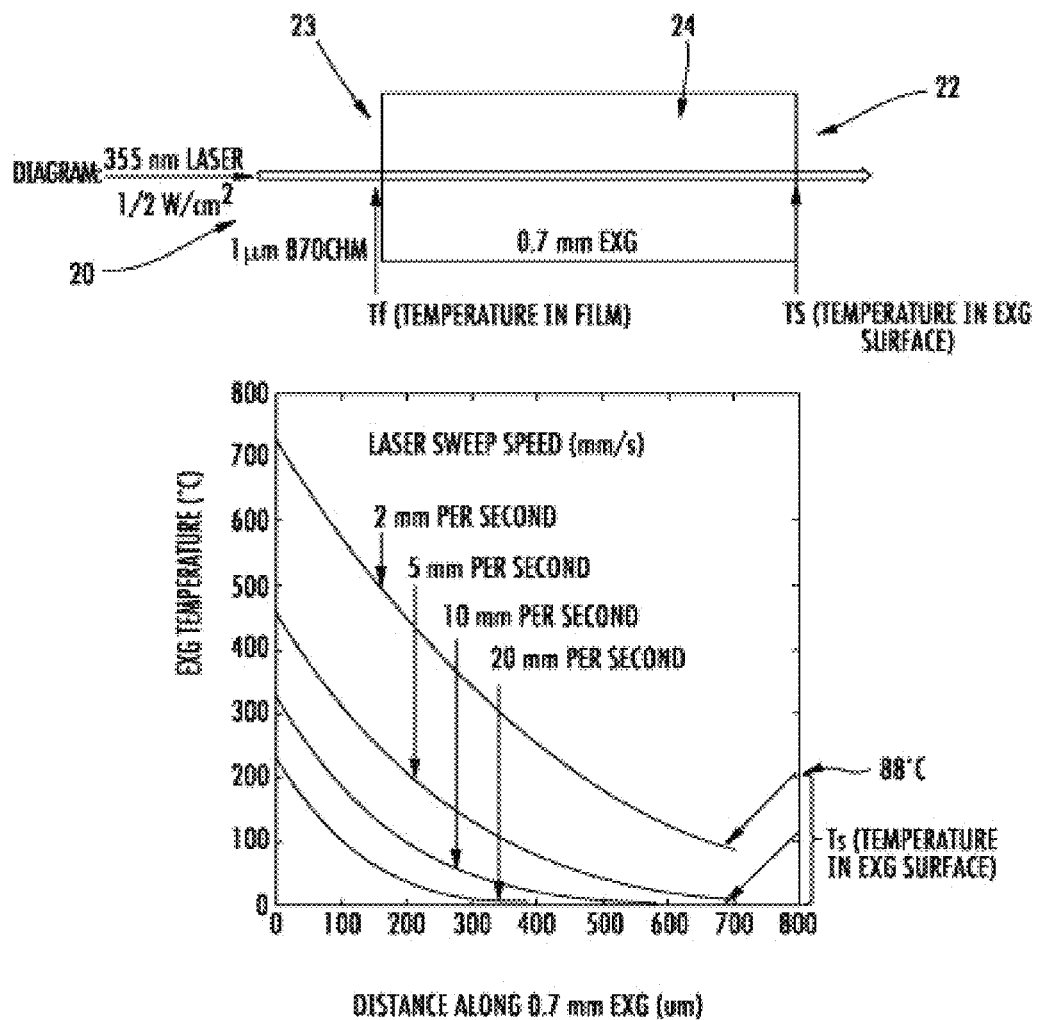
FIG. 12 is a two-layer laser heating surface absorption model for some embodiments.

FIG. 12 is a two-layer laser heating surface absorption model for some embodiments. With reference to FIG. 12, a pulsed UV (355 nm) laser 20 is illustrated striking a two-layer stack 22 having a 1 µm UV absorbing-film 23 and a 700 µm Eagle-XG substrate 24. Spatial temperature distribution away from the weld interface in the Eagle-XG stack 22 can be calculated from Equation (2) and plotted assuming a pulsed (30 kHz, 10 ns pulse width, 500 µm wide laser beam-waist diameter) 355 nm laser which delivers an average power of 6 Watts. Different laser sweep speeds (2 mm/s, 5 mm/s, 10 mm/2 and 20 mm/s) were then used. A UV film absorbance of 15% was employed for the calculation, a value typical of tin-fluorophosphate LMG materials at 355 nm with a thickness of about 200 nm. This temperature distribution in the Eagle XG® substrate or stack 22 was plotted whereby temperature distribution variations due to using different laser sweep speeds was observed as a slow moving laser beam dwells over a given laser weld site longer as compared with faster moving beams. For example, the effective time a 500 µm wide laser beam, moving at 2 mm/s dwelled over a given weld spot was 0.25 seconds while the 20 mm/s sweeping laser beam dwelled only 0.025 seconds.

Figure 13:
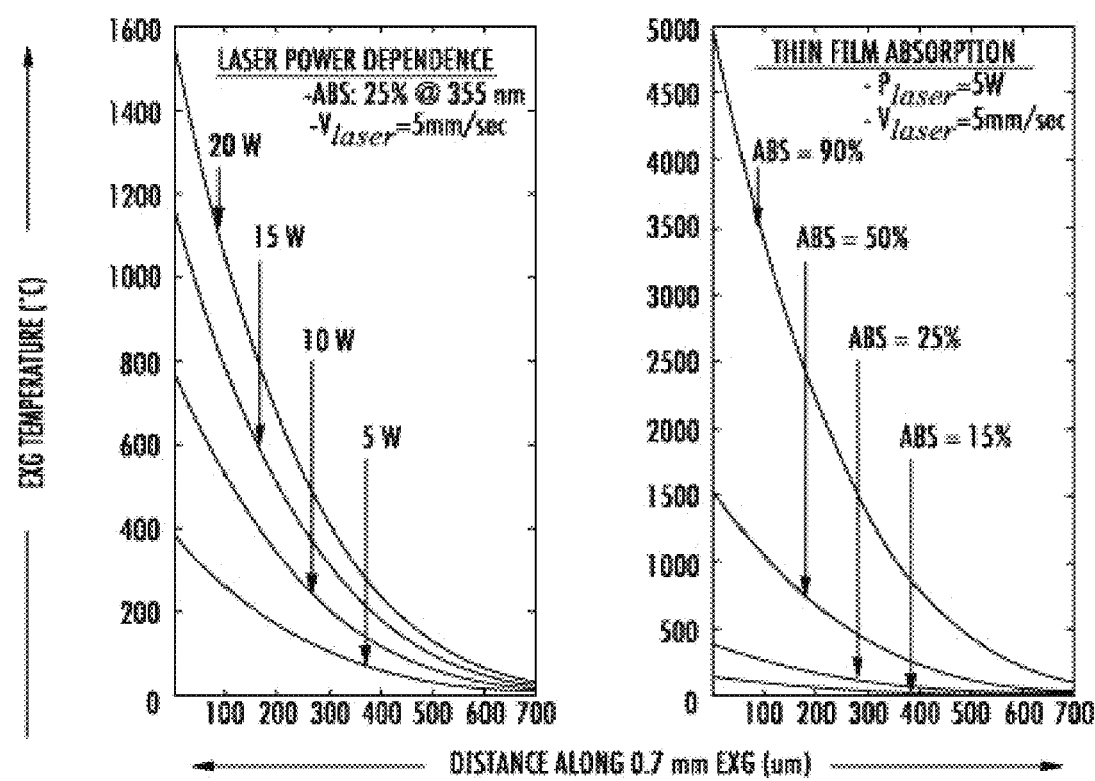
FIG. 13 is a series of temperature variation plots for some embodiments.

Temperature variations due to using different laser powers, or films with differing absorbance were also explored as illustrated in FIG. 13. FIG. 13 is a series of temperature variation plots for some embodiments. With reference to FIG. 13, glass substrate temperature distribution dependence on laser power and film absorbance was plotted using the two-layer laser-heating model (Equation (2)). The same laser parameters used in FIG. 12 were used in FIG. 13. More specifically, a pulsed UV laser with the following parameters was used: λ=355 nm, beam waist=500 µm, repetition rate=30,000 Hz, and pulse width=10 ns. As can be observed in the left panel of FIG. 13, the influence of laser power on the substrate temperature distribution appears more linear as compared with the higher order behavior of absorbance in the right panel of FIG. 13. This behavior is not obvious from Equation (2) where power, $I_O$, and absorbance, $A_f$, appear coupled. Absorbance can indirectly impact the effective film thickness, $z_f$, for which the expansion coefficients $b_n$ and $g_n$ are somewhat related. In contrast, $I_O$ is independent, with no functional relationship associated with the expansion coefficients $b_n$, and $g_n$.

Figure 14:
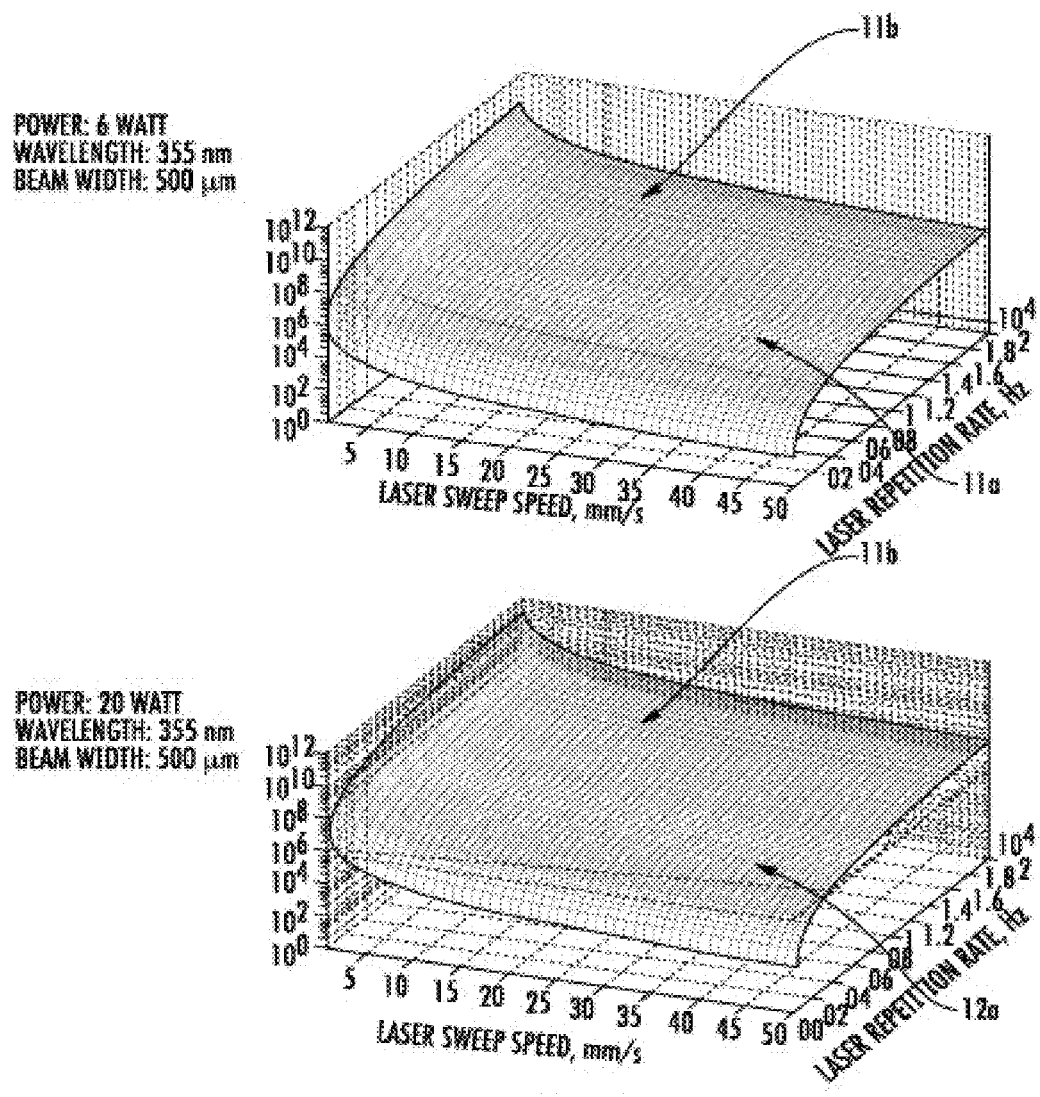
FIG. 14 is a series of plots of average energy deposited within a sweeping laser's dwell time for some embodiments.

FIG. 14 is a series of plots of average energy deposited within a sweeping laser's dwell time for some embodiments. With reference to FIG. 14, it can be observed that dwell time is dependent on both laser sweep speed and laser pulse repetition rate, whose values and units are indicated in the independent variable x-y plane. These calculations assume a film absorbance of 25%, 500 micron laser beam width, and 10 ns laser pulse width—that can result in successful laser glass welds in some embodiments. Threshold power (11a for 6 W, 12a for 20 W), that power above which successful laser welding occurs, is indicated in FIG. 14 with the depicted plane, and empirically estimated from experiments. The top and bottom plots or panels vary in the amount of laser power used: 6 Watts versus 20 Watts. Comparison of both plots in FIG. 14 suggests that slight variation in laser speed and repetition rate at low incident laser powers (e.g., 6 Watts) can incur substantially higher incident powers than is necessary to induce adequate laser welds. Even small excursions away from the initial laser-weld condition (30 kHz, 2 mm/s laser sweep velocity) in the direction of higher repetition rate would result in unnecessary incident power densities. Higher laser sweep speeds rapidly provided inadequate amounts of energy required to laser weld the glass substrates which is a consequence of the inverse dependence of laser dwell time on velocity versus the linear dependence on laser repetition rate. At higher incident laser powers (e.g., 20 Watts), a larger plateau region or process window 11b, 12b becomes available where small excursions in speed and repetition rate retain adequate laser welding conditions without excess energy being incurred. The process windows 11*b*, 12*b* for both plots can facilitate laser welding or bonding optimization.

Figure 16:
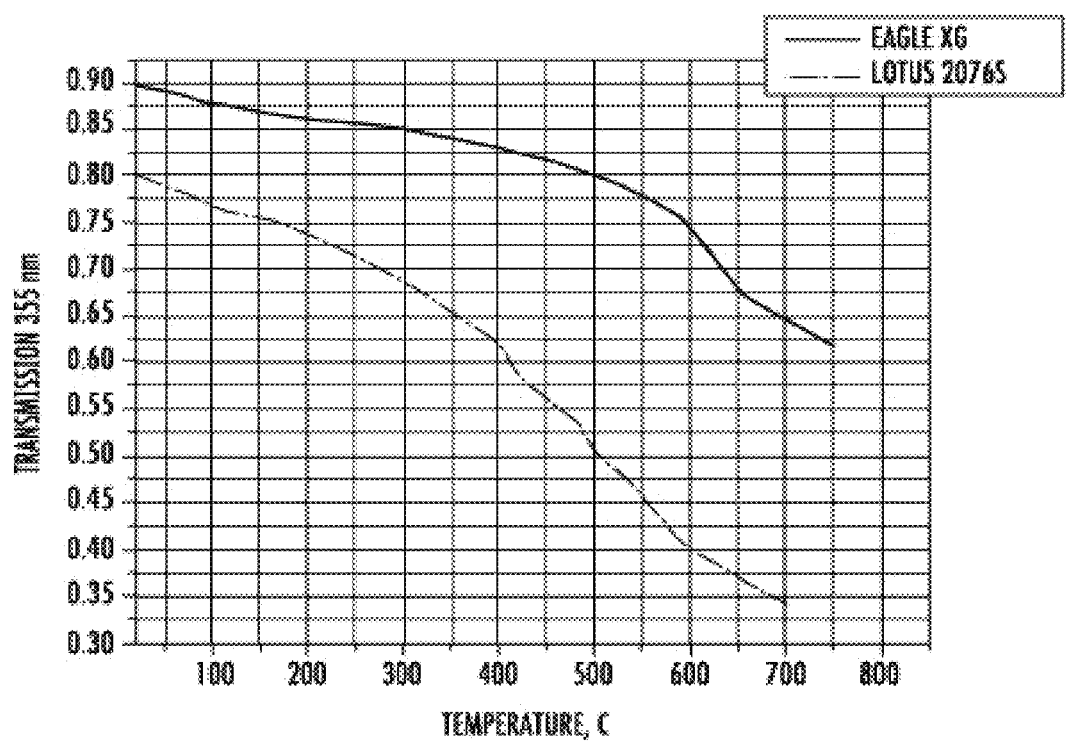
FIG. 16 is a plot of Eagle XG® and Lotus XT® glass transmission at 355 nm during heating with an IR radiation source.

FIG. 16 is a plot of Eagle XG® and Lotus XT® glass transmission at 355 nm during heating with an IR radiation source. With reference to FIG. 16, effects of temperature change on the absorption properties of the glass interface was determined through experimentation when Eagle XG® and Lotus XT® substrates were irradiated with an infrared $CO_2$ laser at 10.6 μm. It can be observed that the resulting transmission of these substrates at 355 nm changed significantly depending upon temperature generated by the $CO_2$ laser radiation. It follows that interface heating in some embodiments can lead to a more effective absorption at the interface in both the film as well as the glass substrate.

Figure 17:
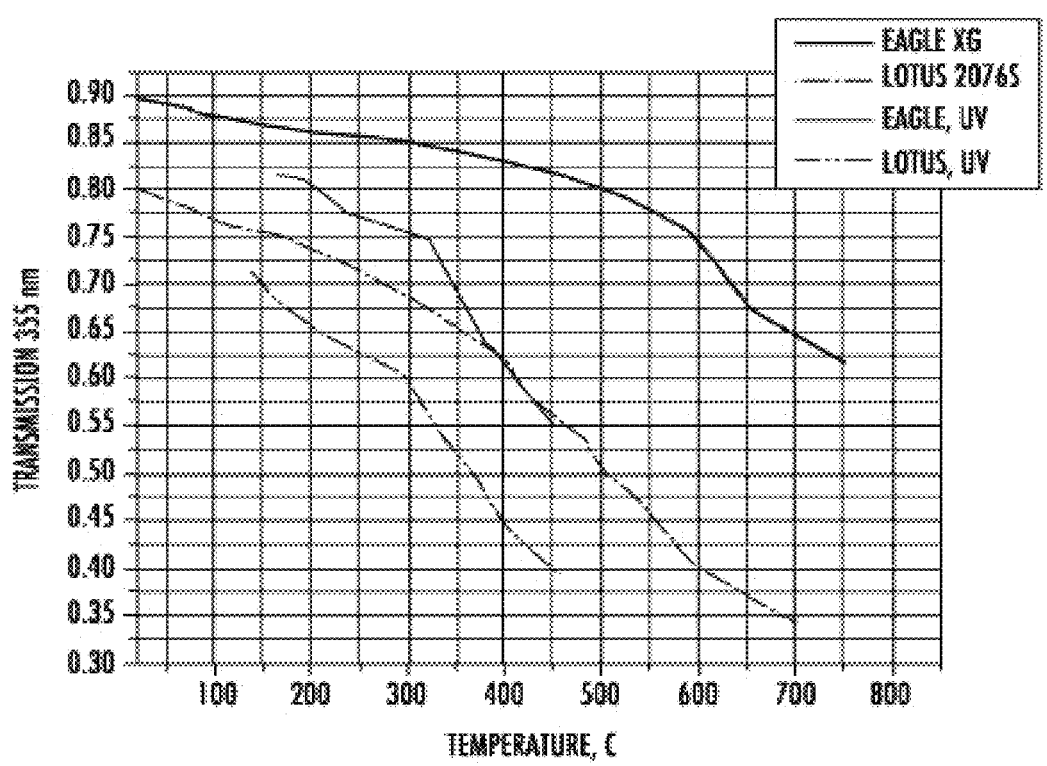
FIG. 17 is a plot of glass transmission at 355 nm during heating for some embodiments.

FIG. 17 is a plot of glass transmission at 355 nm during heating for some embodiments. With reference to FIG. 17, it was discovered that color center formation due to UV radiation can occur in both the film and glass substrate which can lead to additional absorption in the radiated area. The effect of 355 nm transmission on Eagle XG® and Lotus XT® glass substrates can be observed in FIG. 20 due to the resultant temperature increase. The temperature increase can be attributed to a combination of the effect of heating shown in FIG. 17 and color center formation.

Figure 18:
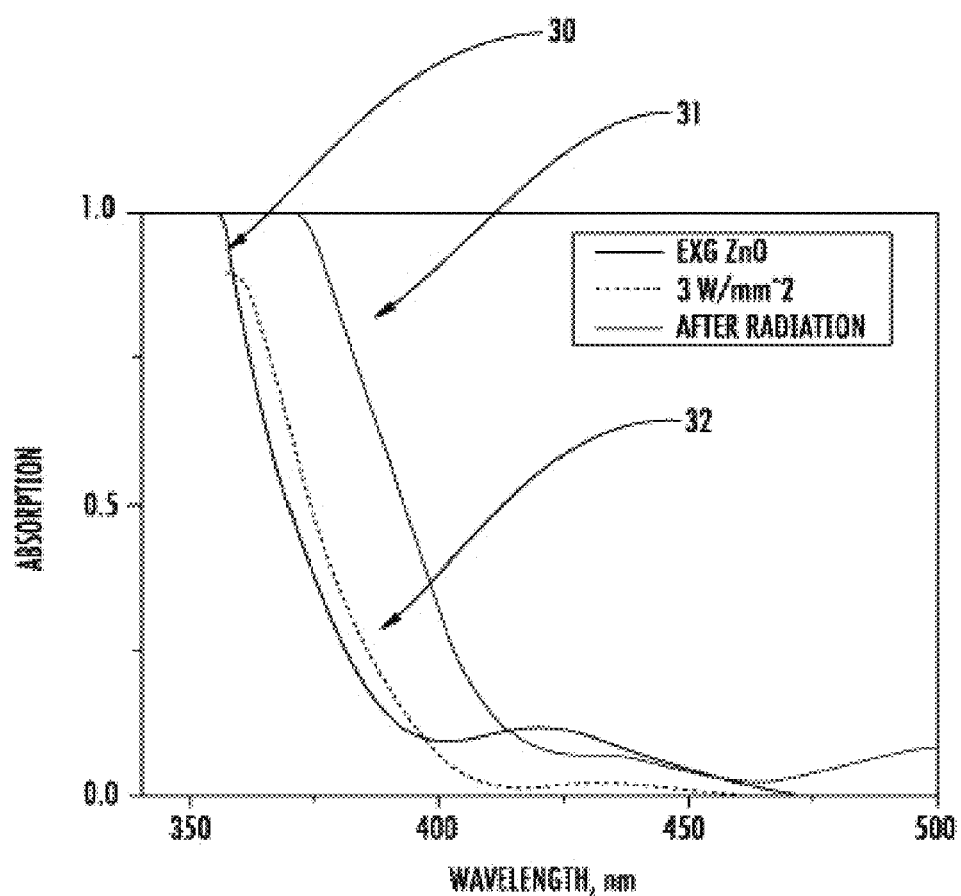
FIG. 18 is a plot of the effect on film and substrate transmission during and after UV radiation for some embodiments.

FIG. 18 is a plot of the effect on film and substrate transmission during and after UV radiation for some embodiments. With reference to FIG. 18, the first curve 30 represents the transmission of an Eagle XG® 0.6 mm substrate with a 200 nm ZnO film. A second curve 31 represents transient absorption due to 3 W/mm$^2$ radiation with a 355 nm laser source, 30 kHz repetition rate (i.e., absorption on top of existing absorption). This second curve 31 includes induced absorption due to color centers and temperature. A third curve 32 represents induced absorption after laser radiation is off, i.e., the temperature has recovered to ambient conditions, and color centers have partially vanished. It should be noted that there are some permanent absorption changes in these embodiments which have high transmissions at 420 nm and above. This effect is due to the film presence and is significantly amplified versus a bare substrate without film. Some changes in the film and substrate can be permanent as observed in the third curve 32, but this does not affect visible transmission. In addition to these UV-based radiation effects, it can be observed that a desired temperature rise and fusion can occur based on absorption of the film alone, and this effect can also be realized with IR absorbing films as will be discussed below. Thus, as illustrated in FIG. 18, some exemplary films can exhibit temperature and color center formation as a function of temperature and power density of UV radiation.

Figure 19:
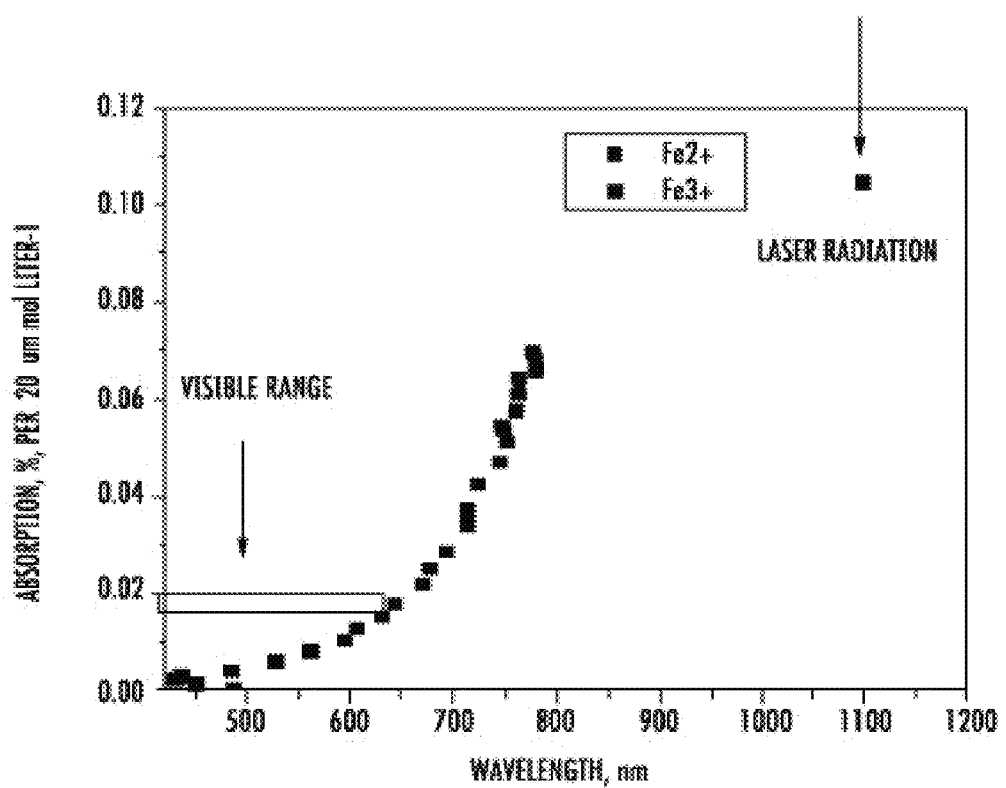
FIG. 19 is a plot of absorption versus wavelength for some embodiments.

FIG. 19 is a plot of absorption versus wavelength for some embodiments. With reference to FIG. 19, an embodiment included a film made with an FeO based glass, which can be in two different oxidation states 2+ and 3+ depending upon processing conditions. This exemplary, non-limiting silica based glass film has greater than about 10-15 wt. % FeO with an equal proportion thereof being FeO and $Fe_2O_3$. As illustrated in FIG. 19, it was discovered that the $Fe_2O_3$ exhibited strong absorption at NIR wavelengths and could also be irradiated with a YAG laser at a wavelength of 1064 nm. The visible transmission in this case is less than about 0.02 and does not compromise attenuation between about 420 nm to about 700 nm. Absorption at 1064 nm was found to be about 0.1 and the exemplary film could be heated with sufficient laser power above its melting point and laser welded. Of course, the claims appended herewith should not be so limited as other examples of IR absorption films and other IR lasers are envisioned.

Figure 20:
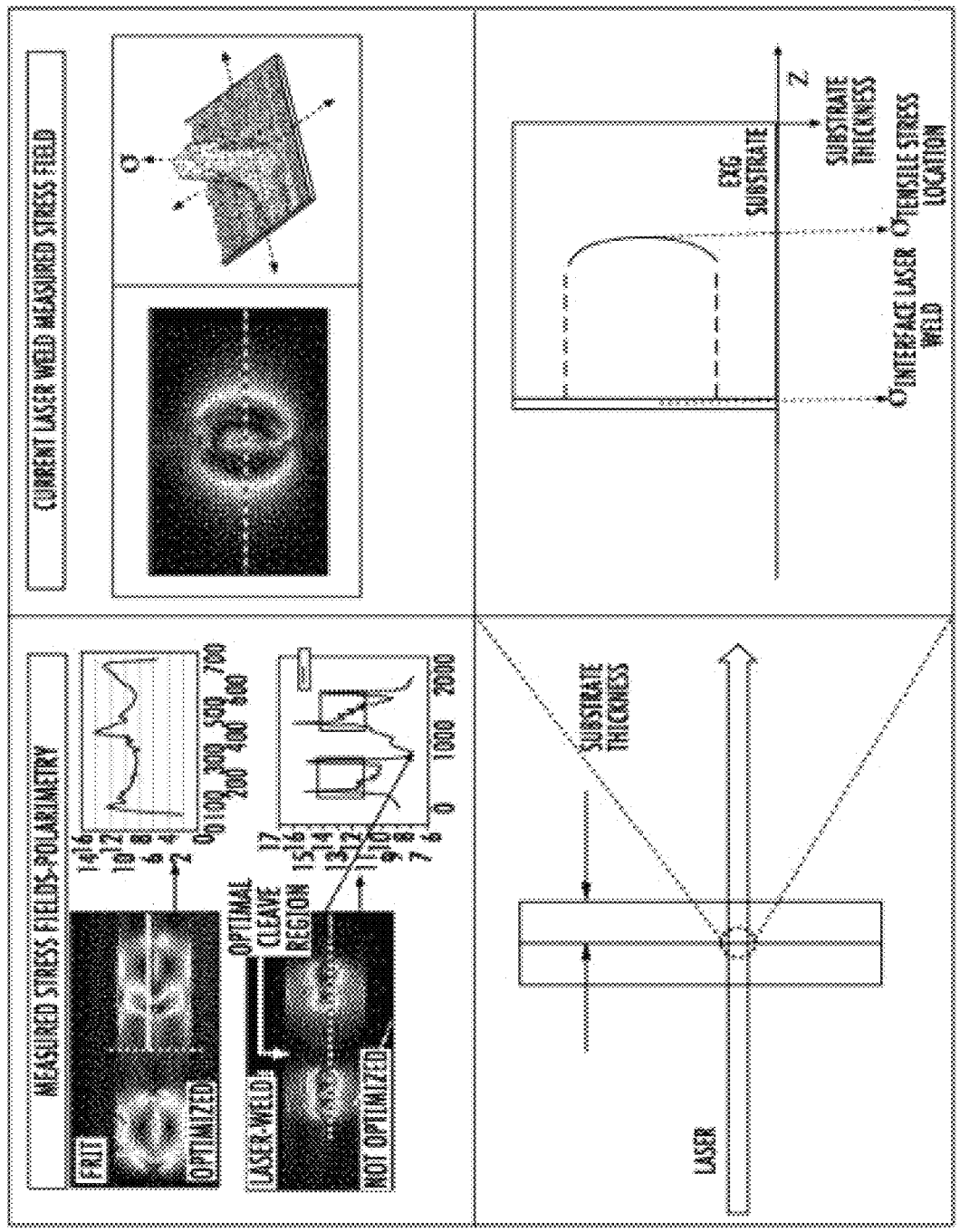
FIG. 20 is a schematic illustration of polarimetry measurements and images of some embodiments.

FIG. 20 is a schematic illustration of polarimetry measurements and images of some embodiments. With reference to FIG. 20, residual stress fields resulting from an exemplary laser welding process near the interfacial weld bond can be examined in comparison with frit sealed embodiments. For example, the top left panel of FIG. 20 illustrates polarimetry measurements of stress field from both a frit seal and also in the vicinity of a laser weld between two 0.7 mm Eagle XG® glass substrates, with one interior surface coated with a 1 μm thick low melting glass film. The top right panel of FIG. 20 illustrates a polarimetric image of a residual stress field from a laser weld obtained from sweeping a 355 nm UV laser under the following conditions: 20 mm/sec, 14 Watts, 200 .mu.m beam width, and 150 kHz repetition rate, and the upper right panel provides a three dimensional rendering of this residual stress field. In the bottom left panel of FIG. 20, a simplistic diagram is provided illustrating a non-limiting process of achieving laser welding with absorbing thin films where laser-thermal energy can be delivered into a substrate/substrate interface to obtain a cohesive diffusive bond relative contact area, as close to unity, in a predetermined time, while minimizing any collateral damage, e.g., spatial extent and magnitude of tensile stress residue. This process can be more pronounced for higher CTE substrates where the weld-interface formation rate is faster than the creation of the CTE-mismatch stress interface. Thus, in some embodiments, a focused beam can be used at the weld interface along with higher velocity sweep rates to achieve an exemplary weld without any crack formation. In the bottom right panel of FIG. 20, an illustration is provided showing a propagating stress field and the analytic dependence sought of its location from laser weld conditions. Influences on the location of the propagating stress field from a $\sigma_{interface\ laser\ weld}$ value under the prevailing laser weld conditions at a glass-glass or glass-film interface location to a $\sigma_{tensile\ stress\ location}$ in the bulk of a welded substrate can then be estimated. It has thus been experimentally determined that some exemplary embodiments provide a seal or optimized cohesive-diffusion glass weld if $$\left(\frac{\sigma_{tensile\ stress\ location}}{\sigma_{interface\ laser\ weld}}\right) \ll 1 \text{ and } \sigma_{interface\ laser\ weld} > 10 \text{ MPa.}$$

In other embodiments another exemplary cohesive diffusion laser glass weld can occur when $$\left(\frac{\sigma_{tensile\ stress\ location}}{\sigma_{interface\ laser\ weld}}\right) < 1 \text{ and } \sigma_{interface\ laser\ weld} > 1 \text{ MPa.}$$

Analytical models, however, tend to treat simple structures as a semi-infinite solid or slab. Equation (2) illustrates how complicated solutions can be for two-layer systems, which can rapidly become intractable with the introduction of a time dependent melt or stress front. One model of melting considered a slab connected to a heat sink with the incident laser radiation entirely absorbed at the surface. This model considered two time regimes: one regime where the melting time was less than the transit time (e.g., the time it took for the back end of the slab to increase from room temperature), and the second regime for melting times greater than the transit time. This model also envisioned a heat balance equation applied to a propagating interface between liquid and solid:

$$I_o \cdot A(1-R) + k\frac{dT}{dz} = \rho \cdot Q_L \frac{dZ}{dt} \quad (5)$$

where terms are identical with those used in Equation (2), except that Z represents the melt front location, $Q_L$ represents the latent heat of melting, and that heat flow is one dimensional, optical radiation is absorbed at the surface, and thermal material properties remain temperature independent. Quadratic equations can then be derived in both Z and dZ/dt having coefficients that are functions of thermophysical and laser parameters. To understand dependences of a propagating stress field, the propagating laser melt front analytic model may be modified by substituting the latent heat of melting (fusion) of Eagle XG® with the activation energy for creep flow from our previous Eagle XG® surrogate: the low strain point boro-silicate glass normalized with its effective molecular weight (160 kJ/mol)/(0.266 kg/mol). Considering the case where no heat is dissipated from the back of the slab substrate during the weld, the resulting expression exhibits interesting dependencies on laser and material properties:

$$Z = l - \frac{\sqrt{C_p l^2 I_o A(1-R) \cdot \rho^3 \cdot [C_p l \rho (l \cdot I_o A(1-R) + 6\lambda \cdot \Delta T_m) - 6\lambda \cdot I_o A(1-R) \cdot t]}}{\sqrt{3} \cdot I_o A(1-R) \cdot C_p \cdot l \cdot \rho^2} \quad (6)$$

where Z represents creep front location, l represents substrate thickness, Cp represents substrate heat capacity, A represents substrate absorbance, R represents substrate reflectance, $\Delta T_m$ represents propagating temperature increase, from ambient, required for maintaining creep flow (e.g., $\Delta T_m = T_{strain} - T_{ambient}$), $\rho$ represents substrate density, $\lambda$ represents substrate thermal conductivity, $I_0$ represents laser irradiance (W/m$^2$), and t represents time.

In some embodiments, laser welds can be achieved using a film that absorbs at an incident laser wavelength $\lambda$, preferably A %>about 20%. In other embodiments, both the substrate and film can exhibit color center formation at $\lambda$. In additional embodiments, a temperature effect can be employed to increase absorption for either or both the film and substrate at $\lambda$. Such an exemplary temperature effect can also contribute to the improvement of seal or weld speed and can lower the heat affected zone (HAZ) and can lower activation energy for creep flow, e.g., forms an eutectic system, an alloy, etc. In some embodiments, if transparency is required, then a band gap may be provided in UV, or high absorption in NIR, IR. Additional embodiments can provide a weld having an interfacial surface energy $\gamma_{weld-interface} \gg$ residual $\gamma_{stress\ field}$ and/or a total integrated bond strength $\iint \gamma_{weld-interface} \partial A \gg \iint \gamma_{stress-field} \partial A$. Further embodiments can include a low laser intensity requirement whereby the laser peak photon flux is less than about $10^{25}$ photons/sec/cm$^2$ and does not include multiphoton behavior, ablation, or plasma generation.

Figure 21:
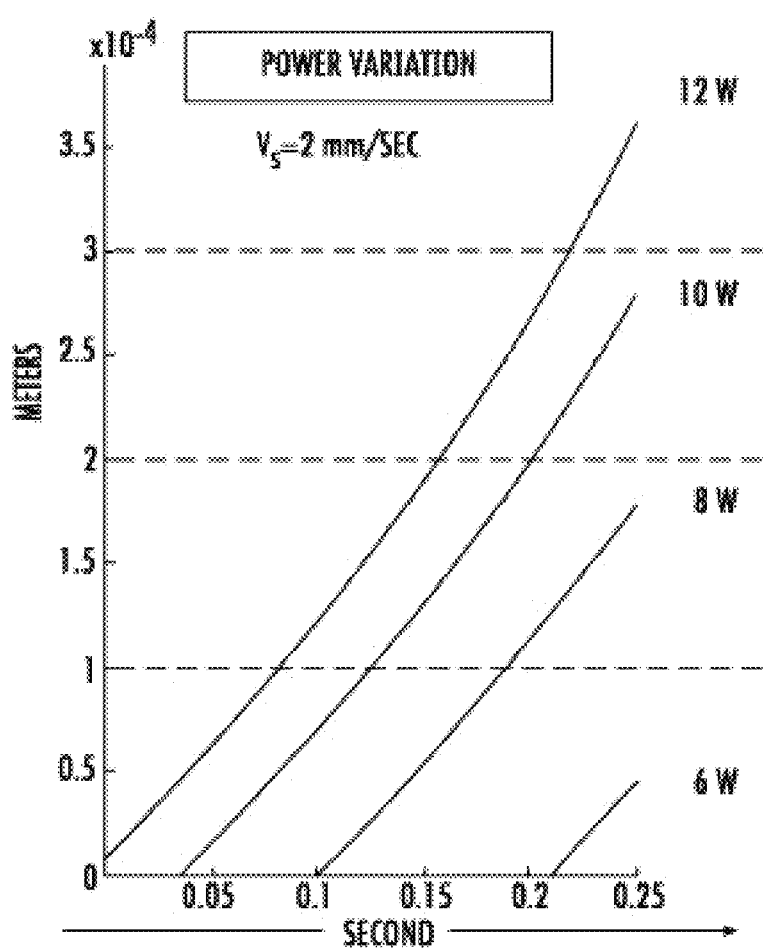
FIG. 21 is a plot providing stress location from an exemplary weld line.

Power dependence is illustrated in FIG. 21 whereby it can be observed that simply increasing laser power during welding can induce greater stress beyond the interface region with excess energy resulting in a larger stress. FIG. 21 is a plot providing stress location from an exemplary weld line. With reference to FIG. 21, stress location from an exemplary weld line can be determined using Equation (6) where the parameters employed were similar to those used previously: wavelength=355 nm, beam waist=500 repetition rate=30,000 Hz, pulse width=10 ns, $v_s$=2 mm/sec, dwell time=0.25 second, Eagle XG® thickness=0.7 mm, and Tstrain=669° C. FIG. 21 and Equation (6) also provide insight into why higher strain point glass substrates can result in higher stress profiles. For example, the stress profile location Z scales as the square root of the $\Delta T_m$ term which is linearly related to $T_{strain}$. Other attempts to predict experimental observations from these expressions can be limited not only by the assumptions used but also by the information that can be calculated, e.g., where higher CTE materials are laser welded. Here it was discovered that low CTE glass substrates (less than about 5 ppm/° C.) were more easily welded than higher CTE glasses such as soda-lime glasses. These low CTE substrates included quartz, fused silica, Eagle XG®, Willow, and Lotus glass substrates. After significant experimentation, suitable conditions were discovered making high quality welds in higher CTE glasses possible. For example, it was discovered that embodiments described herein can be used to weld soda lime glass (CTEs of about 9 ppm/° C. or greater) using 1 μm LMG films without any pre-heating requirement of the substrates, much less to the strain or annealing point.

As noted above, optimized glass welds can have $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

and can provide a strong, transparent, hermetic and air tight package. Such welds can be formed by a cohesive-diffusive process and exhibit tensile strength measurements of welds, requiring stress load greater than 10 MPa to induce cohesive failure. It was also observed that such welds also exhibit cohesive failure at tensile stress front locations in the glass substrate away from the glass-glass interface. Further, such welds can exhibit a tensile strength much less than the interfacial tensile strength. Melt puddle propagation does not occur during such laser welding and, in some embodiments can use laser photon flux less than about $10^{25}$ photons/cm$^2$/second (peak power) or about 15 kW/cm$^2$ (average power). In other exemplary embodiments other cohesive diffusion laser glass welds can exhibit $$\left(\frac{\sigma_{tensile\ stress\ location}}{\sigma_{interface\ laser\ weld}}\right) < 1 \text{ and } \sigma_{interface\ laser\ weld} > 1 \text{ MPa}.$$

These types of glass welds can also provide a strong, transparent, hermetic and air tight package. Such welds can be formed by a cohesive-diffusive process and exhibit tensile strength measurements of welds, requiring stress load greater than 1 MPa to induce failure. Such welds also exhibit cohesive failure at tensile stress front locations in the glass substrate away from the glass-glass interface. Further, such welds can exhibit a tensile strength less than the interfacial tensile strength. Melt puddle propagation does not occur during such laser welding and, in some embodiments can use laser photon flux less than about $10^{25}$ photons/cm$^2$/second (peak power) or about 15 kW/cm$^2$ (average power).

Exemplary welds and properties thereof according to exemplary embodiments can be examined and characterized through stress, fictive temperature, refractive index, modulus, and glass density distribution in the laser-weld cross-section and vicinity thereof. Characterization techniques can include, but are not limited to, Polscope stress distribution, infrared reflection (Tomozawa method), Brillouin microscopy, and micro-Raman spectroscopy, to name a few. For example, microscopic cross-section images can reveal the unique distributions providing a telltale signature of these high quality films. While annealing can erase the stress, laser-induced fictive-temperature and density changes will remain and can be detected. These measurements can allow one to distinguish exemplary glass welds according to the present disclosure. In some embodiments, stress distribution can be characterized by the Polscope technique, the results of which are illustrated in FIG. 20. As illustrated, laser welding can leave a unique stress pattern, distinguishable from, e.g., anodic bonding, whereby the relatively large tensile stress field, away from the weld interface, can be readily observed in the polarimetric microscopic image shown in the top right panel of FIG. 20. As discussed above, laser heating raises glass temperatures above softening, allowing the glasses on the interface to diffuse into each other. This increases the fictive temperature in the irradiated volumes whereby fictive temperature distribution can be measured by a spectroscopic method proposed by Tomozawa (J Non-Cryst. Sol., v. 185, p. 191 (1995)), the entirety of which is incorporated herein by reference. In such a spectroscopic method it was found that band shifts in the Si—O—Si bond angle can reveal thermal history in a substrate. By way of further example, Micro-Raman spectroscopy can be used to characterize glass density change. High-frequency Raman peak position can depend, in part, on glass density. For example, it has been observed that the shift of the 1060 cm$^{-1}$ ($\omega_4$) band can be linearly proportional to density, and similarly, Brillouin scattering spectroscopy (and related microscopic implementation) can reveal the modulus and strain distribution signatures of exemplary laser-induced welds according to some embodiments.

Figure 23:
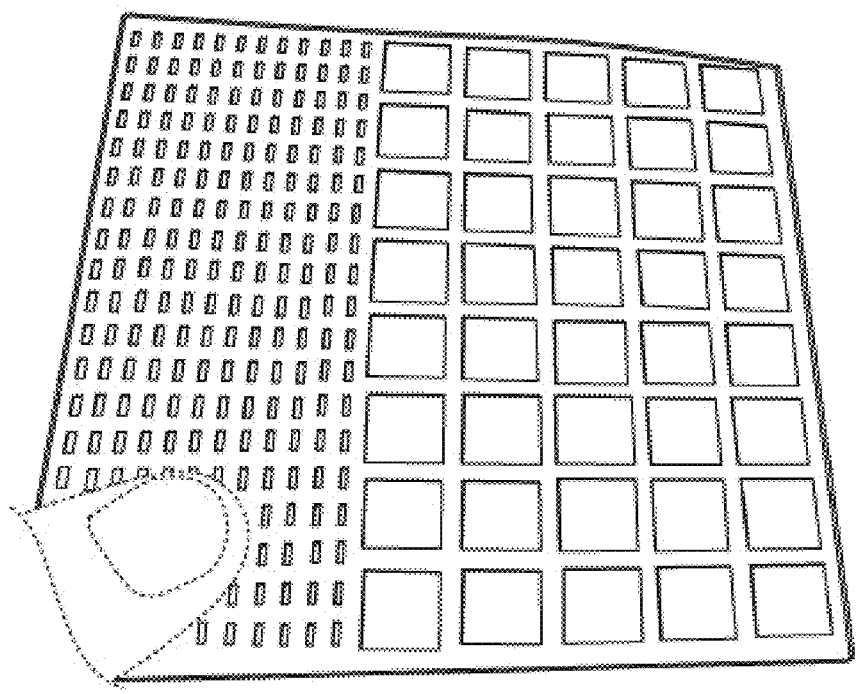
FIG. 23 is an illustration of a mold pressed embodiment.

In additional embodiments, similar advantages can also be derived from the observation that laser absorption occurs with graphite particles in a glass substrate skin of hot embossed samples (see FIG. 23). With reference to FIG. 23, an exemplary structure was formed from pressing graphite molds on a glass substrate, e.g., Eagle XG®, covered with graphite powder as a release agent for a respective film. The particle can be prepared from different glass materials absorbing at wavelengths better suited to the incident laser inducing the weld. This can be performed locally on the area of the seal or on the full surface of the glass. In some embodiments, the mold does not have to leave a surface impression but rather impregnate the surface glass with proper absorption characteristics described above.

In further embodiments, an exemplary film can include a suitable amount of metal by standard film deposition techniques producing small thin islands that absorb incident laser energy, or by ion exchange techniques, followed by a reducing environment, if necessary. This ultrathin and island-like spatial distribution of an exemplary film can yield an interface that is transparent or translucent and suitability absorbent at an incident laser wavelength.

In yet further embodiments, Applicant has demonstrated that inorganic or organic fluids can be sealed in filled glass packages without compromising seal properties. The discussed effect is based on the fact that the fluid can be heated and expanded, moving temporarily away from the seal area. Additionally, one can exploit the interfacial heating phenomena where more absorption-induced heating occurs in the substrate during steady state illumination due to the UV edge of the glass substrate moving to a longer wavelength. The final sealed product may therefore not need an absorbing film since the absorbing fluid initiates heating locally and then into the substrate to create the final seal. Thus, while the final package does not have an absorbing film it can contain fluid. In a similar process and in another embodiment, an IR laser can first heat an interfacial IR absorbing film to temperatures below the glass welding temperature effectively shifting the UV edge of the glass substrate. A UV laser can then illuminate the area, heating both substrates and the interface and resulting in a strong weld.

Figure 24:
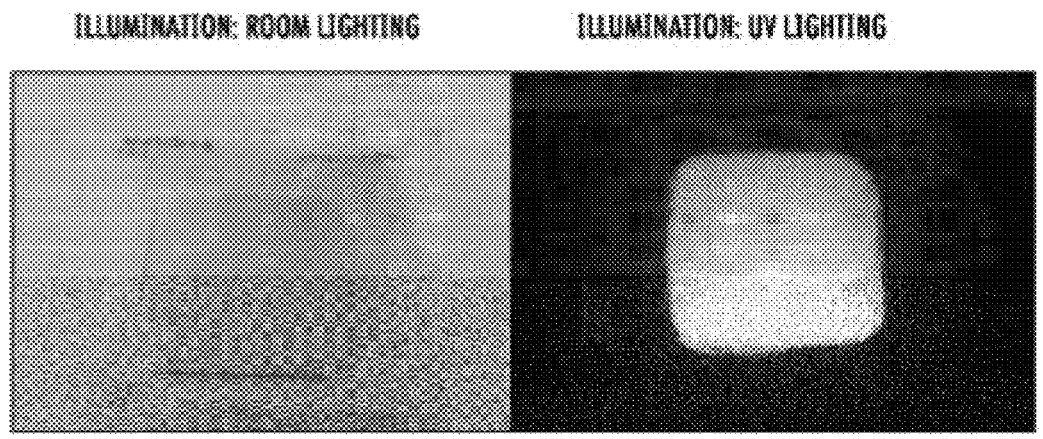
FIG. 24 are images of an exemplary embodiment containing quantum dots.

Methods described above can be employed in a myriad of applications. By way of a non-limiting example, laser welding can be used for forming a quantum dot glasskette described in co-pending application Ser. No. 13/777,584, the entirety of which is incorporated herein by reference. FIG. 24 is an illustration of some embodiments of the present subject matter. With reference to FIG. 24, a laser welded, hermetic, all-glass package containing cadmium-free quantum dots is illustrated. The UV illumination in the right panel illustrates the typical green output of an exemplary quantum dot package when stimulated by 365 nm light. These exemplary packages are robust to thermal cycling due to the high tensile bond strength associated with welds described herein. Such devices also derive advantages from the high photo-stability of laser welded glass packages containing quantum dots, for high temperature cycling associated with high intensity operation.

Figure 25:
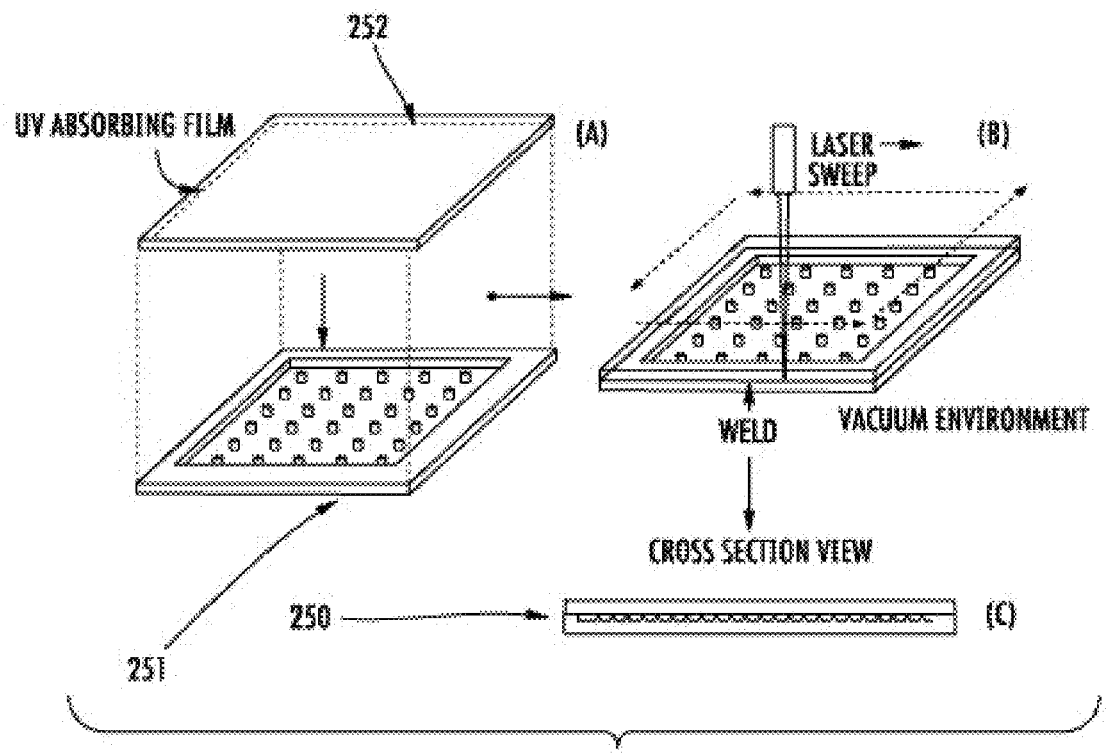
FIGS. 25 and 26 are graphical illustrations for exemplary laser welding methods for vacuum insulated glazings.
Figure 26:
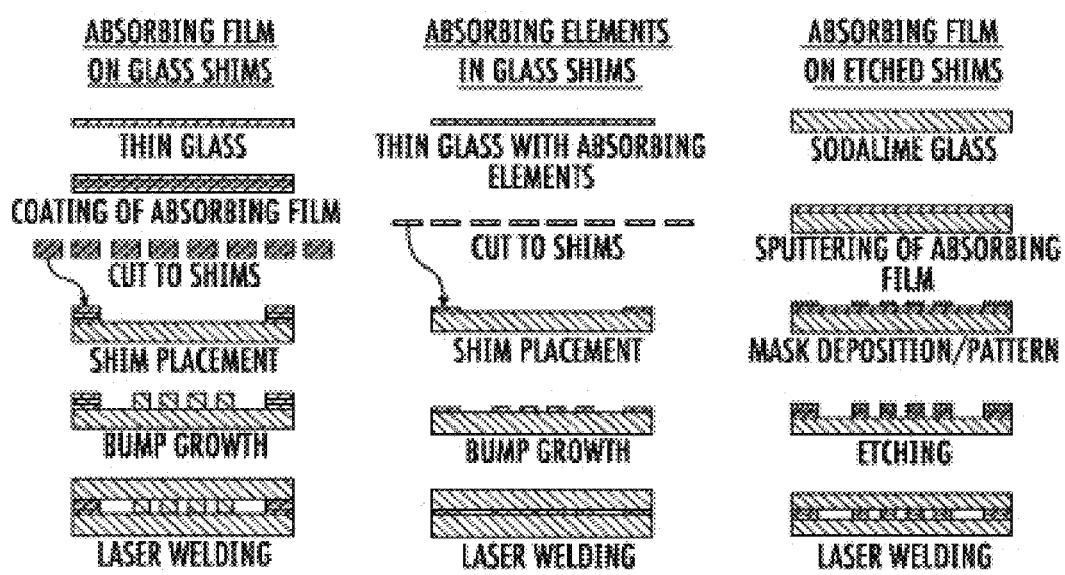

In another non-limiting application, laser welding can be used in conjunction with an acid-etched glass package or used in an insulated structure. For example and with reference to FIG. 25, an exemplary vacuum-insulated glass window or glazing 250 can be formed by (A) bringing into contact a 3D-featured substrate with spacers (bottom substrate 251) with a UVA-coated cover glass (top substrate 252), and then (B) laser welding the UVA-coated glass sheet 252 to the 3D formed glass substrate 251, in a vacuum environment, resulting in a (C) vacuum-insulated glass window or glazing 250. The cross sectional view in pane (C) illustrates the role of the supporting spacers. These spacers may be conventional pick and place spacers or may be laser induced bumps described in co-pending application Ser. No. 14/221,851 the entirety of which is incorporated herein by reference. FIG. 26 illustrates additional embodiments for fabricating vacuum insulated glass structures using laser welding methods. With reference to FIG. 26, large monolithic glass substrates may sometimes require methods to weld sub-structures in a modular manner. For example, in the left column of FIG. 26, thin glass shims can be coated with absorbing film on both sides and then cut into shims. These can then be laser welded along the perimeter of a substrate in a manner that will support a vacuum. In some embodiments, laser-induced bumps can be formed to create spacers inhibiting potential collapse due to outside pressure on the vacuum structure. A cover plate can then be laser welded to the bumps. With reference to the middle column of FIG. 26, a thin film with absorbing elements can be cut into shims and laser welded along the perimeter of a substrate in a manner that will support a vacuum. Laser-induced bumps can then be formed to create spacers inhibiting potential collapse due to outside pressure on the vacuum structure whereby a cover plate can then be welded to the bumps. With reference to the right column of FIG. 26, an exemplary soda lime glass substrate can be masked with a sputtered and ME-patterned absorbing film that is acid etched to desired pattern and depth. A cover plate can then be laser welded to the etched pattern. Of course, these methods are exemplary only and should not limit the scope of the claims appended herewith.

Figure 27:
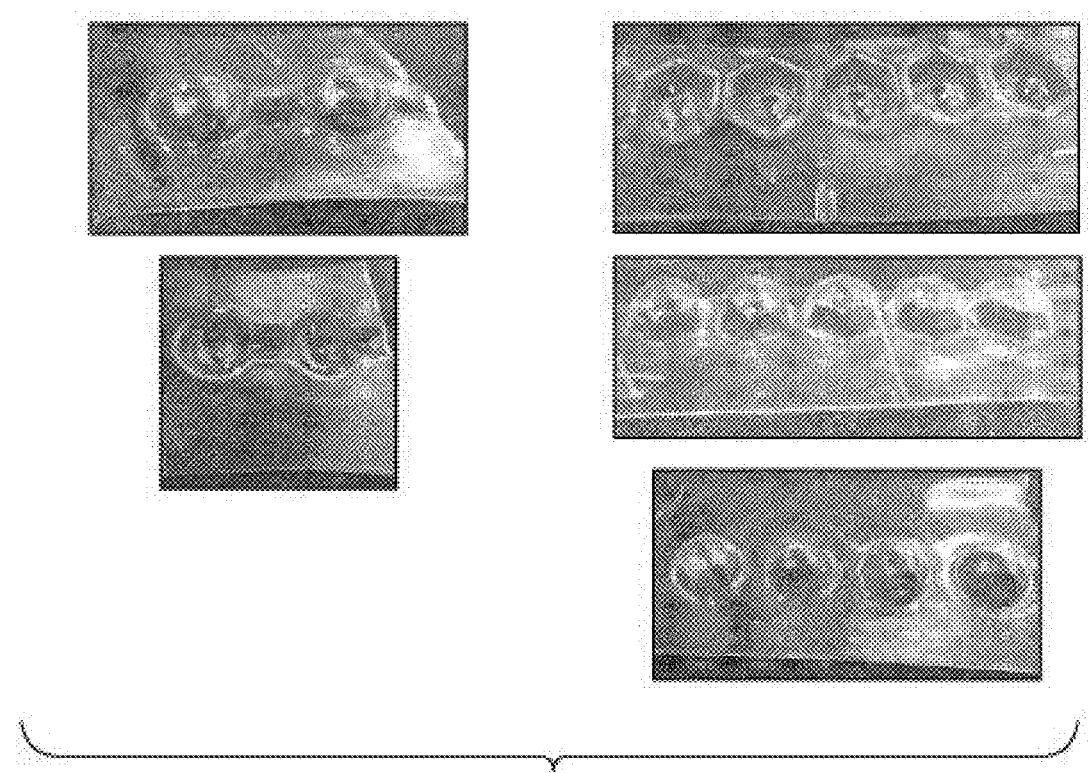
FIGS. 27, 28, 29, 30 and 31 are simplified illustrations of three dimensional and complex formed devices using laser welding.
Figure 28:
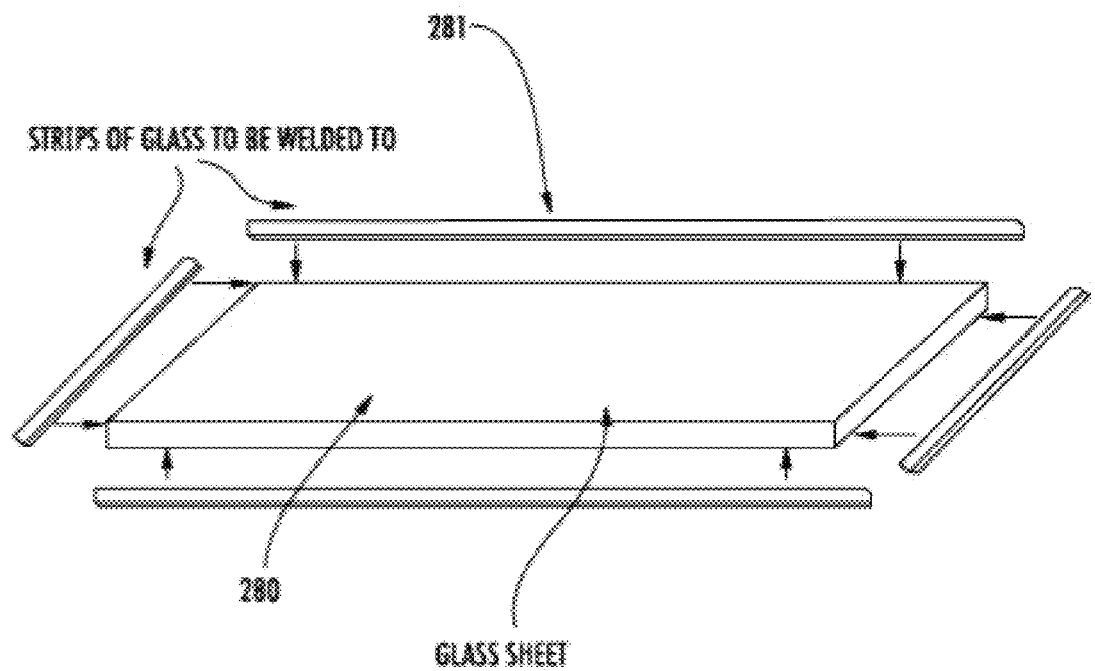
Figure 29:
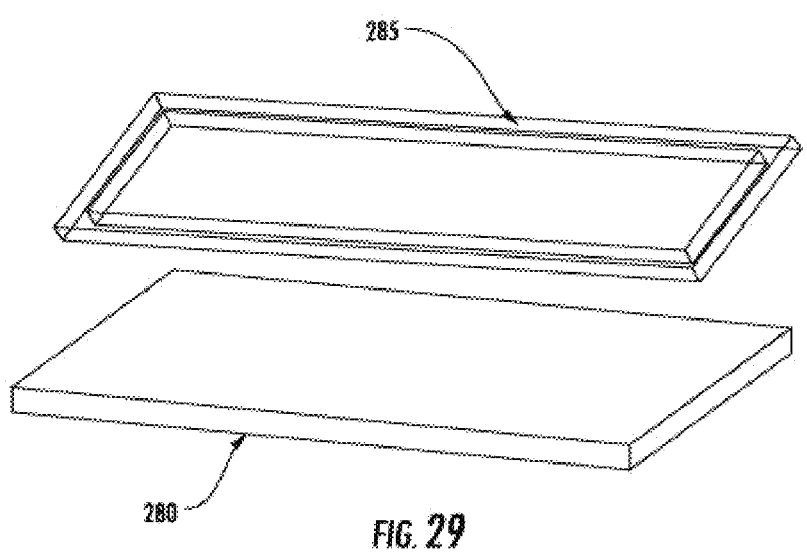
Figure 30:
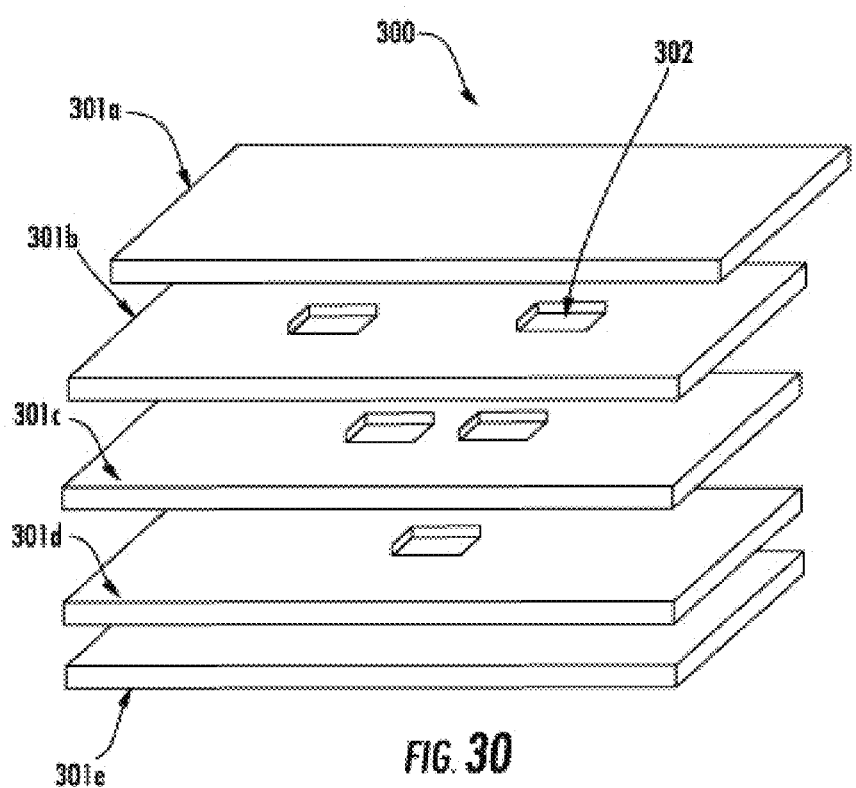
Figure 31:
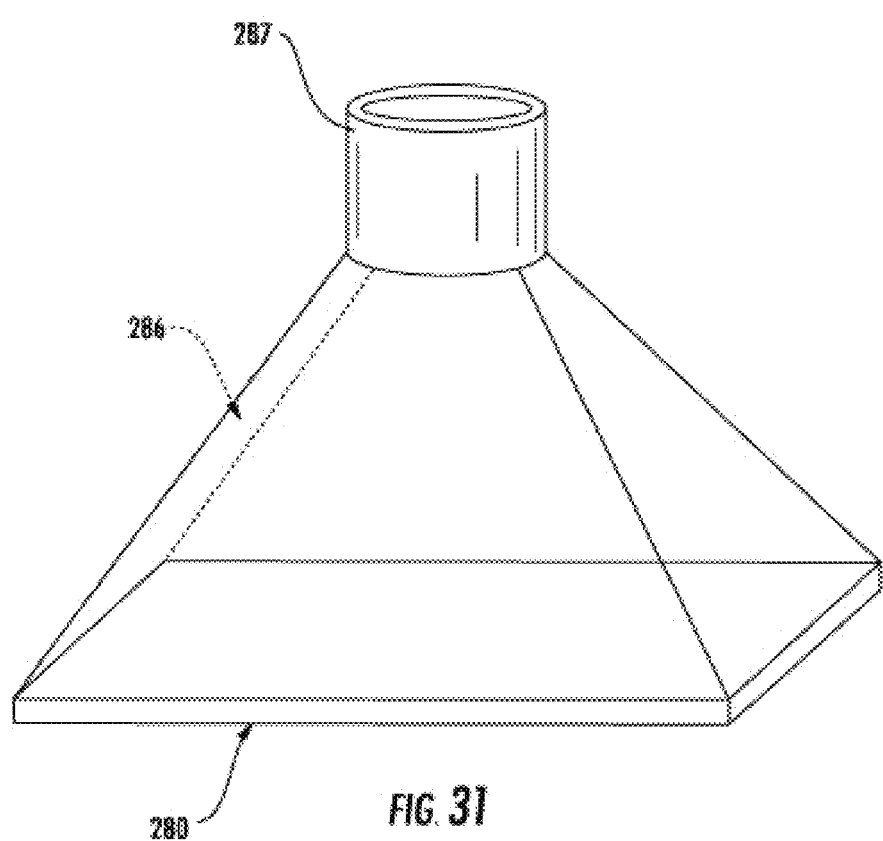

In yet a further non-limiting application, laser welding processes can be employed in three dimensional (3D)-forming processes and with 3D substrates. For example, substrates having 3D features can be used for laser welding to a second substrate (planar or also 3D). FIG. 27 illustrates some exemplary, non-limiting 3D formed glass substrates that used laser welding. FIGS. 28, 29, 30 and 31 also illustrate additional embodiments using alternative 3D formed substrates. For example, FIG. 28 provides an illustration of glass strips 281 that can be laser welded to adjacent substrate(s) 280 for edge protection of a device (not shown), FIG. 29 illustrates a glass wall 285 or perimeter that can be laser welded to adjacent substrate(s) 280, FIG. 30 illustrates a multilayer structure 300 having features 302 therein, any number of the layers 301a-e configured to be welded to create a complex device, and FIG. 31 illustrates a complex, non-moldable and non-planar shape created by welding three formed parts, e.g., a sheet 280, a pyramid 286, and a cylinder 287. Laser welding methods can thus be used to efficiently add walls to base structures, to create deep-depth structures that cannot be formed by sagging, to create complex structures layer by layer by stacking and welding processed sheets, to create complex structures by welding multiple sagged and/or pressed glass components, and can eliminate the need for expensive grinding and/or polishing for edge protection.

While some embodiments have been described as utilizing low melting glass or inorganic films, the claims appended herewith should not be so limited as embodiments can use UV absorbing films, IRA films, and/or other inorganic films situated between two substrates. As noted above, in some embodiments, color center formation in an exemplary substrate glass is not necessary and is a function of the UV absorption of the film, e.g., less than about 20%. It follows that, in other embodiments, if the UV absorption of the film is greater than about 20%, alternative substrates such as quartz, low CTE substrates, and the like, can readily form welds. Furthermore, when high CTE substrates are used, these substrates can be readily welded with exemplary high repetition rate lasers (e.g., greater than about 300 kHz to about 5 MHz) and/or a low peak power. Furthermore, in embodiments where absorption of the film is a contributing factor, IR absorbing (visible transparent films) can be welded with the use of an exemplary IR laser system.

In various embodiments of the present disclosure, the glass sealing materials and resulting layers can be transparent and/or translucent, thin, impermeable, "green," and configured to form hermetic seals at low temperatures and with sufficient seal strength to accommodate large differences in CTE between the sealing material and the adjacent substrates. In some embodiments, the sealing layers can be free of fillers and/or binders. The inorganic materials used to form the sealing layer(s) can be non-frit-based or powders formed from ground glasses in some embodiments (e.g., UVA, LMG, etc.). In other embodiments, the sealing layer material is a low Tg glass that has a substantial optical absorption cross-section at a predetermined wavelength which matches or substantially matches the operating wavelength of a laser used in the sealing process. In additional embodiments, absorption at room temperature of a processing laser wavelength by the low Tg glass layer is at least 10% at a predetermined laser wavelength and preferably at least 15%.

In general, suitable sealant materials include low Tg glasses and suitably reactive oxides of copper or tin. The glass sealing material can be formed from low Tg materials such as phosphate glasses, borate glasses, tellurite glasses and chalcogenide glasses. As defined herein, a low Tg glass material has a glass transition temperature of less than 400° C., e.g., less than 350, 300, 250 or 200° C. Exemplary borate and phosphate glasses include tin phosphates, tin fluorophosphates and tin fluoroborates. Sputtering targets can include such glass materials or, alternatively, precursors thereof. Exemplary copper and tin oxides are CuO and SnO, which can be formed from sputtering targets comprising pressed powders of these materials. Optionally, the glass sealing compositions can include one or more dopants, including but not limited to tungsten, cerium and niobium. Such dopants, if included, can affect, for example, the optical properties of the glass layer, and can be used to control the absorption by the glass layer of laser radiation. For instance, doping with ceria can increase the absorption by a low Tg glass barrier at laser processing wavelengths. Additional suitable sealant materials include laser absorbing low liquidus temperature (LLT) materials with a liquidus temperature less than or equal to about 1000° C., less than or equal to about 600° C., or less than or equal to about 400° C. In other embodiments, the composition of the inorganic film can be selected to lower the activation energy for inducing creep flow of the first substrate, the second substrate, or both the first and second substrates as described above.

Exemplary tin fluorophosphate glass compositions can be expressed in terms of the respective compositions of SnO, $SnF_2$ and $P_2O_5$ in a corresponding ternary phase diagram. Suitable UVA glass films can include $SnO_2$, ZnO, $TiO_2$, ITO, and other low melting glass compositions. Suitable tin fluorophosphates glasses include 20-100 mol % SnO, 0-50 mol % $SnF_2$ and 0-30 mol % $P_2O_5$. These tin fluorophosphates glass compositions can optionally include 0-10 mol % $WO_3$, 0-10 mol % $CeO_2$ and/or 0-5 mol % $Nb_2O_5$. For example, a composition of a doped tin fluorophosphate starting material suitable for forming a glass sealing layer comprises 35 to 50 mole percent SnO, 30 to 40 mole percent $SnF_2$, 15 to 25 mole percent $P_2O_5$, and 1.5 to 3 mole percent of a dopant oxide such as $WO_3$, $CeO_2$ and/or $Nb_2O_5$. A tin fluorophosphate glass composition according to one particular embodiment can be a niobium-doped tin oxide/tin fluorophosphate/phosphorus pentoxide glass comprising about 38.7 mol % SnO, 39.6 mol % $SnF_2$, 19.9 mol % $P_2O_5$ and 1.8 mol % $Nb_2O_5$. Sputtering targets that can be used to form such a glass layer may include, expressed in terms of atomic mole percent, 23.04% Sn, 15.36% F, 12.16% P, 48.38% 0 and 1.06% Nb.

A tin phosphate glass composition according to another embodiment comprises about 27% Sn, 13% P and 60% 0, which can be derived from a sputtering target comprising, in atomic mole percent, about 27% Sn, 13% P and 60% 0. As will be appreciated, the various glass compositions disclosed herein may refer to the composition of the deposited layer or to the composition of the source sputtering target. As with the tin fluorophosphates glass compositions, example tin fluoroborate glass compositions can be expressed in terms of the respective ternary phase diagram compositions of SnO, $SnF_2$ and $B_2O_3$. Suitable tin fluoroborate glass compositions include 20-100 mol % SnO, 0-50 mol % $SnF_2$ and 0-30 mol % $B_2O_3$. These tin fluoroborate glass compositions can optionally include 0-10 mol % $WO_3$, 0-10 mol % $CeO_2$ and/or 0-5 mol % $Nb_2O_5$. Additional aspects of suitable low Tg glass compositions and methods used to form glass sealing layers from these materials are disclosed in commonly-assigned U.S. Pat. No. 5,089,446 and U.S. patent application Ser. Nos. 11/207,691, 11/544,262, 11/820,855, 12/072,784, 12/362,063, 12/763,541, 12/879,578, and 13/841,391 the entire contents of which are incorporated by reference herein. For example, additional suitable compositions can also include aluminosilicates, borosilicates, boroaluminosilicates, borates (e.g., bismuth zinc borates & and vanadium borates), and phosphates (e.g., zinc tin phosphates, vanadium phosphates, etc.). Further suitable low melting glass compositions can also include $B_2O_3$-silicates, $Bi_4O_3$—$B_2O_3$—ZnO±(BaO, MgO, CuO, $MnO_2$, $Fe_2O_3$), $B_2O_3$—$Al_2O_3$—$SiO_2$±(CuO, $Fe_2O_3$, $V_2O_5$, $TiO_2$, $Li_2O$, $Nb_2O$, ZnO), ZnO—$SnO_2$—$P_2O_5$±($WO_3$, $MoO_3$, $Bi_2O_3$), $V_2O_5$—$Sb_2O_3$-phosphates, $V_2O_5$—ZnO—$Fe_2O_3$-phosphates, CuO, ZnO borosilicates, $V_2O_5$-borates, and the like. Suitable films can be formed or deposited from any suitable methods including non-vacuum techniques, screen printing, doctor blading, spray coating, ink jet printing, etc. For example, a suitable screen printed method can use an ultra-low melting temperature glass frit prepared in an isopropanol slurry through a screen mesh which readily accommodates an average 1 micron frit particle size, on 2 1/2 inch square substrates. After air-drying, an exemplary laser welding process can be employed.

Exemplary substrates (glass or otherwise) can have any suitable dimensions. Substrates can have areal (length and width) dimensions that independently range from 1 cm to 5 m (e.g., 0.1, 1, 2, 3, 4 or 5 m) and a thickness dimension that can range from about 0.5 mm to 2 mm (e.g., 0.5, 0.6, 0.7, 0.8, 0.9, 1.0, 1.2, 1.5 or 2 mm). In further embodiments, a substrate thickness can range from about 0.05 mm to 0.5 mm (e.g., 0.05, 0.1, 0.2, 0.3, 0.4 or 0.5 mm). In still further embodiments, a glass substrate thickness can range from about 2 mm to 10 mm (e.g., 2, 3, 4, 5, 6, 7, 8, 9 or 10 mm). A total thickness of an exemplary glass sealing layer can range from about 100 nm to 10 microns. In various embodiments, a thickness of the layer can be less than 10 microns, e.g., less than 10, 5, 2, 1, 0.5 or 0.2 microns. Exemplary glass sealing layer thicknesses include 0.1, 0.2, 0.5, 1, 2, 5 or 10 microns. The width of the sealed region, which can be proportional to the laser spot size, can be about 0.05 to 2 mm, e.g., 0.05, 0.1, 0.2, 0.5, 1, 1.5 or 2 mm. A translation rate of the laser (i.e., sealing rate) can range from about 1 mm/sec to 1000 mm/sec, such as 1, 2, 5, 10, 20, 50, 100, 200, 400, or 1000 mm/sec. The laser spot size (diameter) can be about 0.02 to 1 mm. It should be noted, however, that suitable laser welds are not limited to linear welds; for example, embodiments described herein can be used to spot weld substrates together.

Thus, it has been discovered that suitable laser welding glass substrate interfaces can occur in embodiments of the present disclosure when the local glass temperature exceeds its strain or annealing temperature (e.g., 669° C. and 772° C. respectively for EXG) within a spatial extent, e.g., the "welding volume". This volume can be dependent upon the incident laser power, the composition of the UVA or LMG melt, and color center formation (as a result of impurities in the respective substrates). Once attained, the volume can be swept over the interfacial regions to result in a rapid and strong seal between two substrates (glass or otherwise). Sealing speeds in excess of 5-1000 mm/s can be attained. Exemplary laser welds can experience an abrupt transition to relatively cold ambient temperatures from the high temperatures associated with the melt volume as it is swept away over the substrate regions of interest. The integrity of the hermetic seal and its respective strength can be maintained by slow cooling (self-annealing) of the hot base glass color center (relaxation) regions and the thinness of the UVA or LMG or NIR thin film region (typically ½-1 μm) thereby nullifying any impact of CTE mismatching between the two respective substrates (glass or otherwise).

According to embodiments, the choice of the sealing layer material and the processing conditions for forming a sealing layer over a glass substrate are sufficiently flexible that the substrate is not adversely affected by formation of the glass layer. Low melting temperature glasses can be used to seal or bond different types of substrates. Sealable and/or bondable substrates include glasses, glass-glass laminates, glass-polymer laminates, glass-ceramics or ceramics, including gallium nitride, quartz, silica, calcium fluoride, magnesium fluoride, spinel or sapphire substrates. Additional substrates can be, but are not limited to, metal substrates including tungsten, molybdenum, copper, or other types of suitable metal substrates. In some embodiments, one substrate can be a phosphor-containing glass plate, which can be used, for example, in the assembly of a light emitting device. A phosphor-containing glass plate, for example, comprising one or more of a metal sulfide, metal silicate, metal aluminate or other suitable phosphor, can be used as a wavelength-conversion plate in white LED lamps. White LED lamps typically include a blue LED chip that is formed using a group III nitride-based compound semiconductor for emitting blue light. White LED lamps can be used in lighting systems, or as backlights for liquid crystal displays, for example. The low melting temperature glasses and associate sealing method disclosed herein can be used to seal or encapsulate the LED chip.

Exemplary processes according to embodiments of the present disclosure can be made possible because of the base substrate (glass or otherwise) properties due to the ability of the substrate to form color centers with the prevailing laser illumination conditions and resulting temperature enhancement. In some embodiments, the color center formation can be reversible if transparent seals are desired. If the substrates have dissimilar thicknesses, then thermally conductive substrates can be employed in some embodiments to restore weld integrity.

Exemplary embodiments can thus utilize low melting temperature materials to laser-weld glass or other material substrates together with a low laser pulse peak-power to minimize creation of shock waves and to ensure no micro cracks appear which could compromise the tensile fracture strength. Exemplary embodiments can also provide diffusion welding without melt puddle propagation allowing an adequate lower temperature sealing process. Due to the thinness of the film region, embodiments of the present disclosure can nullify any impact of CTE mismatching between the two respective substrates and can be utilized to provide welding of similarly or dissimilarly dimensioned substrates. Further, in embodiments of the present disclosure no patterning of film is required for sealing as occurs in the case of frit or staining materials, and manufacturers therefore do not have to reveal their proprietary designs.

The present disclosure also teaches how low melting temperature materials can be used to laser weld glass packages together enabling long lived hermetic operation of passive and active devices sensitive to degradation by attack of oxygen and moisture. As noted above, embodiments described herein provide UVA, LMG or other seals that can be thermally activated after assembly of the bonding surfaces using laser absorption and can enjoy a higher manufacturing efficiency since the rate of sealing each working device can be determined by thermal activation and bond formation, rather than the rate one encapsulates a device by inline thin film deposition in a vacuum or inert gas assembly line. This can enable large sheet multiple device sealing with subsequent scoring into individual devices (singulation), and due to high mechanical integrity the yield from singulation can be high.

Embodiments of the present disclosure also provide a laser sealing process, e.g., laser welding, diffusing welding, etc., that relies upon color center formation within the glass substrates due to extrinsic color centers, e.g., impurities or dopants, or intrinsic color centers inherent to the glass, at an incident laser wavelength, combined with exemplary laser absorbing films. Some non-limiting examples of films include $SnO_2$, $ZnO$, $TiO_2$, ITO, and low melting glass films which can be employed at the interface of the glass substrates. Welds using these materials can provide visible transmission with sufficient UV absorption to initiate steady state gentle diffusion welding. These materials can also provide transparent laser welds having localized sealing temperatures suitable for diffusion welding. Such diffusion welding results in low power and temperature laser welding of the respective glass substrates and can produce superior transparent welds with efficient and fast welding speeds. Exemplary laser welding processes according to embodiments of the present disclosure can also rely upon photo-induced absorption properties of glass beyond color center formation to include temperature induced absorption.

Hermetic encapsulation of a workpiece using the disclosed materials and methods can facilitate long-lived operation of devices otherwise sensitive to degradation by oxygen and/or moisture attack. Example workpieces, devices or applications include flexible, rigid or semi-rigid organic LEDs, OLED lighting, OLED televisions, photovoltaics, MEMs displays, electrochromic windows, fluorophores, alkali metal electrodes, transparent conducting oxides, quantum dots, etc.

As used herein, a hermetic layer is a layer which, for practical purposes, is considered substantially airtight and substantially impervious to moisture and/or oxygen. By way of example, the hermetic seal can be configured to limit the transpiration (diffusion) of oxygen to less than about $10^{-2}$ cm$^3$/m$^2$/day (e.g., less than about $10^{-3}$ cm$^3$/m$^2$/day), and limit the transpiration (diffusion) of water to about $10^{-2}$ g/m$^2$/day (e.g., less than about $10^{-3}$, $10^{-4}$, $10^{-5}$ or $10^{-6}$ g/m$^2$/day). In embodiments, the hermetic seal substantially inhibits air and water from contacting a protected workpiece.

In some embodiments, a method of bonding two substrates comprises forming a first glass layer on a sealing surface of a first substrate, forming a second glass layer on a sealing surface of a second substrate, placing at least a portion of the first glass layer in physical contact with at least a portion of the second glass layer, and heating the glass layers to locally melt the glass layers and the sealing surfaces to form a glass-to-glass weld between the first and second substrates. In each of the sealing architectures disclosed herein, sealing using a low melting temperature glass layer can be accomplished by the local heating, melting and then cooling of both the glass layer and the glass substrate material located proximate to the sealing interface.

It is thus an aspect of embodiments of the present disclosure to combine the ease of forming hermetic seals associated with laser welding to also form hermetic packages of active OLED or other devices to enable their widespread fabrication. Such fabrication would require welding over interfacial conductive films. Unlike the methods disclosed herein, conventional methods of laser sealing can sever such interfacial conducting leads would sever them especially if the interface temperature gets too high or there is deleterious laser radiation interaction with the conducting lead material. Embodiments of the present disclosure, however, provide an enabling disclosure of device structures requiring electrical biasing for hermetic device operation using interfacial low melting temperature glass material film. Embodiments of the present subject matter may thus provide a successful laser-welding of glass sheets or other substrates having an interfacial conductive film without destruction thereto or loss in performance.

In some embodiments an apparatus is provided comprising a first substrate having a first surface, a second substrate adjacent the first substrate, and a weld formed between an interface of the first substrate and the adjacent second substrate. The weld can be characterized by $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface.

In other embodiments an apparatus is provided comprising a first substrate having a first surface, a second substrate adjacent the first substrate, and a weld formed between an interface of the first substrate and the adjacent second substrate. The weld can be characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface.

In additional embodiments, a method of forming a vacuum insulated glass window is provided comprising the steps of providing a first glass substrate having a first surface and a first edge, providing a first plurality of spacers on the first surface, providing a second plurality of shims along a the first edge of the first glass substrate, bringing a second glass substrate having a second surface and a second edge in contact with the first plurality of spacers and the second plurality of shims so that the first and second glass substrates are spaced apart by a first distance between the first and second surfaces, laser sealing the first glass substrate to the second glass substrate along the first and second edges to define an interior region between the first and second glass substrates, and forming a vacuum pressure of less than one atmosphere in the interior region.

In further embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface. In additional embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface. These embodiments may further comprise an inorganic film formed over the first surface of the first substrate, and a device protected between the first substrate and the second substrate wherein the inorganic film is in contact with the second substrate.

In other embodiments, each of the inorganic film, first substrate and second substrate are transmissive at approximately 420 nm to approximately 750 nm wavelength. In further embodiments, laser absorption by the inorganic film is more than 10% at a predetermined laser wavelength. The composition of the inorganic film can be selected from the group consisting of Al, Ag, Ce, Cr, Cu, Fe, Ge, ITO, Mg, Mn, Mo, Pb, SnF$_2$, SnO$_2$, Ti, TiO$_2$, V, Zn, ZnO, ZnF$_2$, and combinations thereof.

In some embodiments, the composition of the inorganic film is selected to lower the activation energy for inducing creep flow of the first substrate, the second substrate, or both the first and second substrates. In other embodiments, the composition of the inorganic film is a laser absorbing low liquidus temperature material with a liquidus temperature less than or equal to about 1000° C. In further embodiments, the composition of the inorganic film comprises: 20-100 mol % SnO, 0-50 mol % SnF$_2$, and 0-30 mol % P$_2$O$_5$ or B$_2$O$_3$. In some embodiments, the inorganic film and the first and second substrates have a combined internal transmission of more than 80% at approximately 420 nm to approximately 750 nm wavelength. In other embodiments, impurities in the first or second substrates are selected from the group consisting of As, Fe, Ga, K, Mn, Na, P, Sb, Ti, Zn, Sn and combinations thereof. In further embodiments, the first and second substrates can have different lateral dimensions, different CTEs, different thicknesses, or combinations thereof. Of course, one of the first and second substrates can be glass or glass-ceramic and the other of the first and second substrates can be glass-ceramic, ceramic or metal. In additional embodiments, the first, second or first and second substrates comprise an alkaline earth boro-aluminosilicate glass, an alkali-aluminosilicate glass, a soda-lime glass, thermally strengthened glass, chemically strengthened glass, boro-silicate glass and combinations thereof. Exemplary devices include a light emitting diode, an organic light emitting diode, quantum dot material, phosphor, a conductive lead, a semiconductor chip, an ITO lead, a patterned electrode, a continuous electrode, and combinations thereof.

In additional embodiments, a method of forming a vacuum insulated glass window is provided comprising the steps of providing a first glass substrate having a first surface and a first edge, providing a first plurality of spacers on the first surface, providing a second plurality of shims along a the first edge of the first glass substrate, bringing a second glass substrate having a second surface and a second edge in contact with the first plurality of spacers and the second plurality of shims so that the first and second glass substrates are spaced apart by a first distance between the first and second surfaces, laser sealing the first glass substrate to the second glass substrate along the first and second edges to define an interior region between the first and second glass substrates, and forming a vacuum pressure of less than one atmosphere in the interior region. In some embodiments, the step of providing a second plurality of shims further comprises providing a second plurality of shims having an inorganic film over a first surface, second surface or both first and second surfaces thereof. In further embodiments, the step of providing a first plurality of spacers further comprises irradiating the first glass substrate at a location with a focused laser beam, and terminating the irradiating to fix the spacer and repeating the step of irradiating a plurality of times for different locations to form the first plurality of spacers. In additional embodiments, the step of providing a first plurality of spacers and providing a second plurality of shims further comprise depositing a film of material on the first surface of the first glass substrate and patterning the deposited film by masking and etching.

In some embodiments, the composition of the film is selected from the group consisting of Al, Ag, Ce, Cr, Cu, Fe, Ge, ITO, Mg, Mn, Mo, Pb, SnF$_2$, SnO$_2$, Ti, TiO$_2$, V, Zn, ZnO, ZnF$_2$, and combinations thereof. In other embodiments, the composition of the film is selected to lower the activation energy for inducing creep flow of the first substrate, the second substrate, or both the first and second substrates. In further embodiments, the composition of the film is a laser absorbing low liquidus temperature material with a liquidus temperature less than or equal to about 1000° C. In further embodiments, the composition of the inorganic film comprises: 20-100 mol % SnO, 0-50 mol % SnF$_2$, and 0-30 mol % P$_2$O$_5$ or B$_2$O$_3$. In other embodiments, impurities in the first or second substrates and/or shims are selected from the group consisting of As, Fe, Ga, K, Mn, Na, P, Sb, Ti, Zn, Sn and combinations thereof. In further embodiments, the first and second substrates can have different lateral dimensions, different CTEs, different thicknesses, or combinations thereof. In additional embodiments, the first, second or first and second substrates comprise an alkaline earth boro-aluminosilicate glass, an alkali-aluminosilicate glass, a soda-lime glass, thermally strengthened glass, chemically strengthened glass, boro-silicate glass and combinations thereof. In some embodiments, the laser radiation comprises UV radiation at a predetermined wavelength between approximately 193 nm to approximately 420 nm. In other embodiments, the laser radiation comprises NIR radiation at a predetermined wavelength between approximately 780 nm to approximately 5000 nm. In additional embodiments, the step of laser sealing creates a weld characterized by $$\left(\frac{\sigma_{tensile\ stress\ location}}{\sigma_{interface\ laser\ weld}}\right) << 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface. In further embodiments, the step of laser sealing creates a weld characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface.

In further embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) \ll 1 \text{ and } \sigma_{interface\ laser\ weld} > 10 \text{ MPa}$$

wherein $\sigma_{tensile\ stress\ location}$ is the stress present in the first substrate and $\sigma_{interface\ laser\ weld}$ is the stress present at the interface.

In additional embodiments, a method of forming a sealed device is provided comprising the steps of providing a first substrate having a first surface, providing a second substrate adjacent the first substrate, and forming a weld between an interface of the first substrate and the adjacent second substrate. The weld can be characterized by $$\left(\frac{\sigma_{tensile\ stress\ location}}{\sigma_{interface\ laser\ weld}}\right) < 1 \text{ and } \sigma_{interface\ laser\ weld} > 1 \text{ MPa}$$

wherein $\sigma_{tensile\ stress\ location}$ is the stress present in the first substrate and $\sigma_{interface\ laser\ weld}$ is the stress present at the interface.

Figure 32:
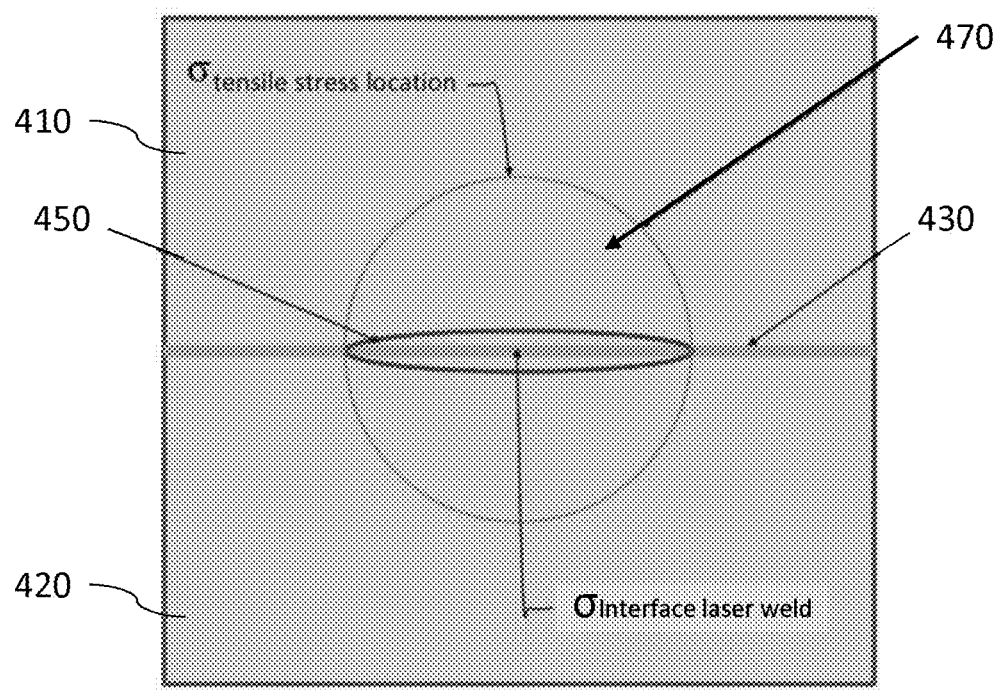
FIG. 32 is a schematic illustration of a cross-sectional view through a laser welded bond between two substrates showing the anatomy of a laser welded bond defined by the residual stress fields.

FIG. 32 shows a schematic illustration of a cross-sectional view taken through a laser weld bonded region between two substrates: the first substrate 410 and the second substrate 420 showing the anatomy of the laser weld bonded region defined by the stress fields. The inorganic absorptive film 430 is provided at the interface between the two substrates 410 and 420 to enable the laser welding. The laser weld thus created is identified as a laser welded zone 450. The heat affected zone (HAZ) 470 is defined by the tensile stress boundary region that delineates the HAZ 470 from the rest (i.e., the bulk portions) of the two substrates 410 and 420. $\sigma_{tensile\ stress\ location}$ denotes the tensile stress that exists at the tensile stress boundary region. Within the HAZ 470, the inventors have determined that compressive stress exists with the peak of the compressive stress in the laser welded zone 450 being $\sigma_{interface\ laser\ weld}$ found at the interface between the two substrates within the laser welded zone 450. $\sigma_{interface\ laser\ weld}$ represents the stress, or load, that must be applied to crack the weld, i.e. initiate crack propagation along the interface in the laser welded zone 450. In the bulk portions of the first and second substrates, there would be zero or a nominal residual stress.

Inventors have discovered an improved parameter that characterizes a laser weld having a desired bond strength that was created with the laser welding method described herein. According to some embodiments of the present disclosure, an apparatus incorporating such laser weld is disclosed. As discussed above, such apparatus can be electronic packages containing active chips or devices provided between two pieces of substrates that are hermetically sealed by the laser weld thus providing hermetic protective sealed environment for the active chips or devices in the electronic packages. Such apparatus can comprise a first substrate 410, a second substrate 420, and an inorganic absorptive film 430 provided between the first substrate and the second substrate and in contact with both the first substrate and the second substrate. A laser welded zone 450 is formed between the first and second substrate by the inorganic absorptive film 430, where the laser welded zone is surrounded by a HAZ 470.

HAZ is defined as a region in which $\sigma_{HAZ}$ is at least 1 MPa higher than the average stress in the first substrate and the second substrate, wherein $\sigma_{HAZ}$ is the compressive stress in the HAZ, and where the laser welded zone 450 is characterized by $\sigma_{interface\ laser\ weld} > \sigma_{HAZ}$, where $\sigma_{interface\ laser\ weld}$ is the peak value of compressive stress in the laser welded zone 450. In some embodiments $\sigma_{interface\ laser\ weld}$ is $\geq 5$ MPa. In some preferred embodiments, $\sigma_{interface\ laser\ weld}$ is $\geq 10$ MPa. In more preferred embodiments $\sigma_{interface\ laser\ weld}$ is $\geq 20$ MPa. These desired lower limits for the $\sigma_{interface\ laser\ weld}$ were determined from the stress field analysis of laser weld bonds formed between two glass substrates using LMG, MMG, and ZnO films as the inorganic absorptive film.

The inventors have discovered through stress field analysis of laser weld bonds that the compressive stresses in the HAZ counteract $\sigma_{tensile\ stress\ location}$ the tensile stress that exists at the tensile stress boundary region. As cracks that initiate at the perimeter regions of the bonded substrates propagate along the interface between the two substrates and encroach the laser welded zone 450, the $\sigma_{tensile\ stress\ location}$ at the HAZ boundary region can promote the propagation of the crack tip (the leading edge of a propagating crack) through the HAZ and eventually the laser welded zone 450 thus compromising the integrity of the laser weld. Inventors have discovered that when $\sigma_{HAZ}$ is compressive and has a peak value >1 MPa and preferably >10 MPa, the $\sigma_{HAZ}$ will sufficiently blunt or block the propagation of the cracks into the laser welded zone 350. Also, inventors have determined that $\sigma_{HAZ}$ can be reproducibly measured.

In some embodiments of the apparatus, at least one of the first and second substrates comprises a glass, glass-ceramic, ceramic, polymer, or metal. In some embodiments, each of the inorganic absorptive film 430, the first substrate 410, and the second substrate 420 are transmissive at approximately 420 nm to approximately 750 nm wavelength.

In some embodiments of the apparatus, the laser absorption by the inorganic absorptive film 430 is at least 10% at a predetermined laser wavelength. Preferably, the laser absorption by the inorganic absorptive film 430 is at least 15% at a predetermined laser wavelength. The composition of the inorganic absorptive film 430 can be selected from the group consisting of Al, Ag, Ce, Cr, Cu, Fe, Ge, ITO, Mg, Mn, Mo, Pb, $SnF_2$, $SnO_2$, Ti, $TiO_2$, V, Zn, ZnO, $ZnF_2$, and combinations thereof.

In some embodiments, the composition of the inorganic absorptive film 430 is selected to lower the activation energy for inducing creep flow of the first substrate, the second substrate, or both the first and second substrates. The composition of the inorganic absorptive film 430 can be a laser absorbing low liquidus temperature material with a liquidus temperature less than or equal to about 1000° C.

In some embodiments, the composition of the inorganic absorptive film 430 comprises: 20-100 mol % SnO, 0-50 mol % $SnF_2$, and 0-30 mol % $P_2O_5$ or $B_2O_3$. In some embodiments, the inorganic absorptive film 430, the first substrate 410, and the second substrate 420 have a combined internal transmission of more than 80% at approximately 420 nm to approximately 750 nm wavelength.

According to some other embodiments of the present disclosure, an electronic package incorporating the laser welded zone in forming a hermetic seal in an electronic packaging device is disclosed. Such electronic package comprises a first substrate, a second substrate, wherein one or both of the substrates comprise a recessed portion that forms an interior space for accommodating an active electronic device once the two substrates are bonded and sealed together. An inorganic film is provided between the first substrate and the second substrate along a sealing region circumscribing the recessed portion and in contact with both the first substrate and the second substrate. A laser welded zone is formed between the first and second substrate by the inorganic film, wherein the laser welded zone is surrounded by a heat affected zone (HAZ), where the HAZ is defined as a region in which $\sigma_{HAZ}$ is at least 1 MPa higher than average stress in the first substrate and the second substrate, wherein $\sigma_{HAZ}$ is compressive stress in the HAZ, where the laser welded zone is characterized by its $\sigma_{interface\ laser\ weld} > \sigma_{HAZ}$, where $\sigma_{interface\ laser\ weld}$ is peak value of compressive stress in the laser welded zone; and wherein the laser welded zone extends along the sealing region establishing a hermetic seal between the first substrate and the second substrate such that the recessed portion forms a hermetic environment for the active electronic device. An example of this electronic package structure is exemplified in FIG. 2. As mentioned above, examples of the active electronic device are OLEDs, micro-processors, and other semiconductor devices.

EXPERIMENTAL

Figure 35:
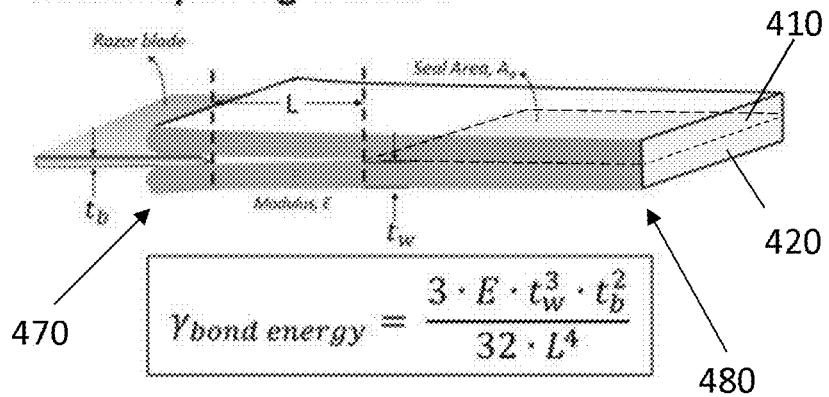
FIG. 35 is a schematic illustration of a basic layout for the crack opening technique for measuring the weld bond energy.

Laser Weld Bond Energy per Unit Area Measurement—An outline of the procedures used to measure the bond energy per unit laser-welded bond region will now be described. FIG. 35 shows a schematic illustration of crack opening technique for measuring the bond strength of a laser weld bonding two glass substrates 410 and 420. A razor blade is inserted into the interface between the two glass substrates 410 and 420 from the edge 480 separating the two substrates and forming a crack of length L without breaking the bond between the two substrates at the Seal Area $A_0$, where the two substrates are not laser welded.

The Seal Area $A_0$ represents the laser welded area that contains the laser welded zone 350 (shown in FIG. 32). Under this equilibrium condition, the energy per unit seal area, $\gamma_{bond\ energy}$, was derived as $$\gamma_{bond\ energy} = \frac{3 \cdot E \cdot t_w^3 \cdot t_b^2}{32 \cdot L^4},$$

where E corresponds to the modulus of the two substrates 410 and 420; $t_w$ is the thickness of the substrates, $t_b$ is the thickness of the razor blade, and L is the equilibrium crack length.

The inventors achieved this condition by inserting a razor blade until the energy balance is attained. Operationally, this entails pushing the blade just beyond the point where the seal cracks open, and the equilibrium length L begins to propagate in concert with further blade insertion. This condition, where L is effectively constant upon further blade insertion, is the equilibrium energetic condition. It balances the force generated by the blade-substrate cantilever against total seal area cohesive force.

Figure 36:
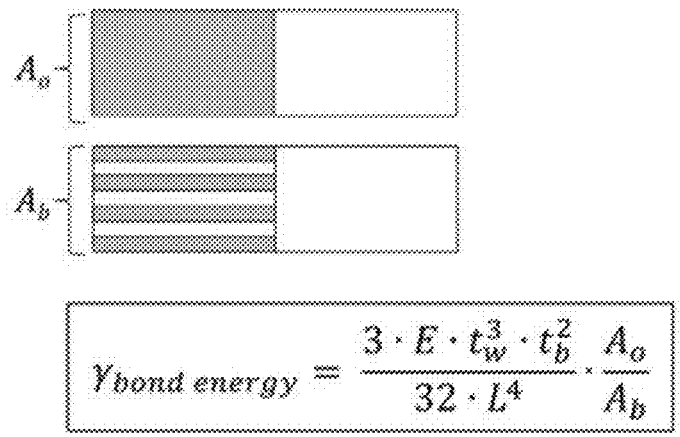
FIG. 36 is a schematic illustration of an experimental sample for measuring laser weld bond energy using a well-defined array of laser welds with predefined characteristic widths and lengths formed on a sandwiched pair of glass slides.

Shown in FIG. 36 is the standard arrangement for laser welds by utilizing a well-defined array of laser welds with characteristic widths and lengths, due to difficulty in ensuring complete and uniform laser weld areal coverage. It is based on equilibrium of elastic forces between the cantilevered end 470 of the laser-welded pair of identical glass slides 410 (the first substrate) and 420 (the second substrate), balanced against an opposing end 480 having a well-defined seal area, $A_0$. For use with laser welds however, the standard arrangement had to be adapted by creating a well-defined array of laser welds with characteristic widths and lengths due to difficulty in ensuring complete and uniform laser weld area coverage. This reduced area is referred to as $A_b$, and the $\gamma_{bond\ energy}$ expression is modified by scaling the original expression with the factor, $A_0/A_b$. This is shown in the expression below:

$$\gamma_{bond\ energy} = \frac{3 \cdot E \cdot t_w^3 \cdot t_b^2}{32 \cdot L^4} \cdot \frac{A_o}{A_b}$$

To extract the proper $\gamma_{bond\ energy}$ value, one must extrapolate the scaled expression to the limit: $A_0/A_b \to 1$, where the effective scaled $\gamma_{bond\ energy}$ does indeed become the $\gamma_{bond\ energy}$ proper value.

Figure 37:
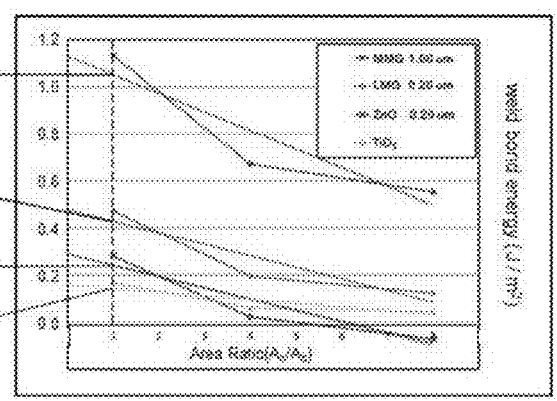
FIG. 37 shows a plot of laser weld bond energy of UV absorbing films: MMG (1.0 µm thick), LMG (0.2 µm), ZnO (0.2 µm), and $TiO_2$.
Figure 38:
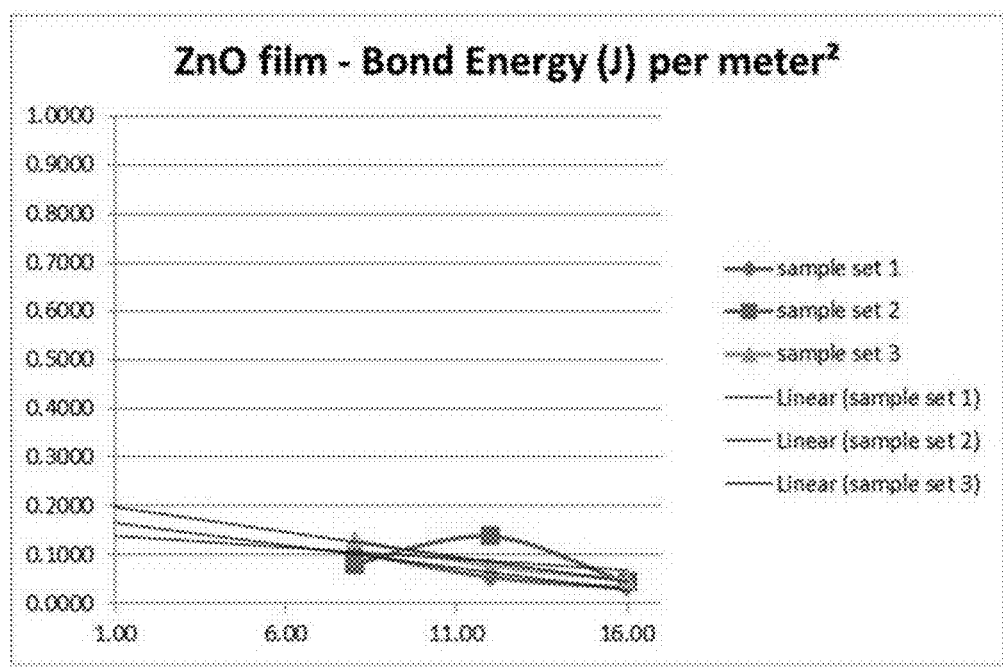
FIG. 38 is a plot of bond energy of laser welded Eagle XG® sheets using 200 nm of ZnO film with 355 nm UV excitation using standard conditions.

The plot in FIG. 37 represents an early survey of the measured bond energy per unit laser-weld area of laser-welded Eagle XG® glass microscope slides using different UV-absorbing films. The procedure to measure the $\gamma_{bond\ energy}$ can be visualized in the plot, and the extrapolation to $A_0/A_b \to 1$. Those extrapolated values are listed in the table adjoining the plot in FIG. 37. By refining the measurement procedures, optimizing the laser beam widths and array spacing, inventors were able to increase the reproducibility, reduce scatter, and attain good statistics of the laser weld bond energies measured. FIG. 38 shows bond energy of laser welded Eagle XG® sheets using 200 nm of ZnO film with 355 nm UV excitation using standard conditions (laser spot 200 um, average power 4.0 W and 50 mm/s translation speed). The x-axis represents the ratio $A_0/A_b$ and the y-axis represents Bond energy J/m². Three sets of samples were measured.

Stress Field Analyses: Equipment and Calibration—Quantitative stress field measurements were made with a Hinds Instrument's Exicor Birefringence Microimager (Exicor Microimager: Hinds Instruments, Portland, Oreg.). It is based on an imaging technique using two matched photoelastic modulators to track the rate of transmitted polarized LED light through a sample. Two basic 2D maps are generated during an Exicor Microimager analytic run: (1) Retardance map—the spatial distribution of the birefringence magnitude is generated. However, no information is provided indicating whether the stress was tensile or compressive. (2) Fast-Axis map—this is another spatial distribution of the angle of the transmitted polarized LED light through the sample specimen, relative to a laboratory reference (microscope's x-axis). One may deduce whether the stress is compressive or tensile by calibration.

Figure 39:
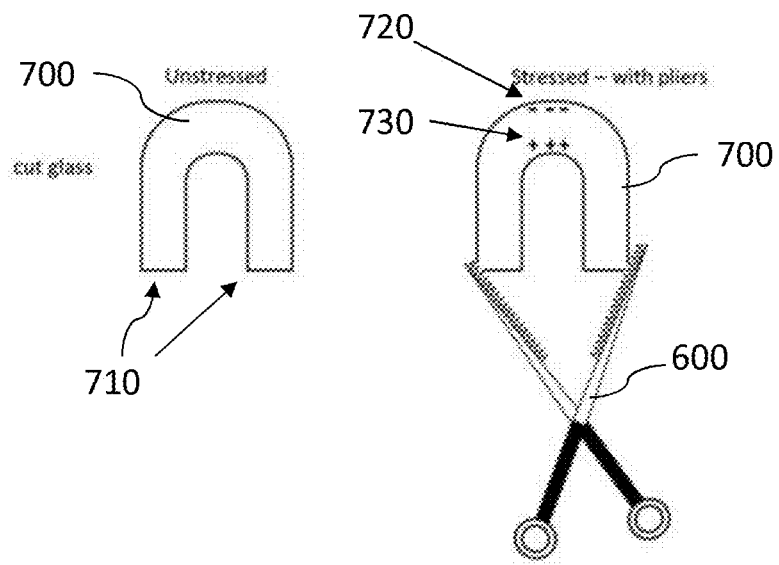
FIG. 39 is a schematic illustration of the U-shaped glass samples used for stress measurement calibration.

Both qualitative and quantitative calibration methods were used to correlate our 2D fast axis angular readings with tension and compression stress field quantification. FIG. 39 is a schematic illustration of the horseshoe-shaped glass square bar 700 which was used to segment the 2D fast axis map into tensile and compressive stress regions. Squeezing the truncated ends 710 of the glass horseshoe with plastic pliers 600 induced tensile stress along the apex portion 720 of the horseshoe while compressive stress manifested along the interior portion 730. This is visualized with the schematic illustration of FIG. 39 where the tensile stress region is indicated with negative signs "- - -", and the compressive stress region is indicated with positive signs "+++".

Figure 40:
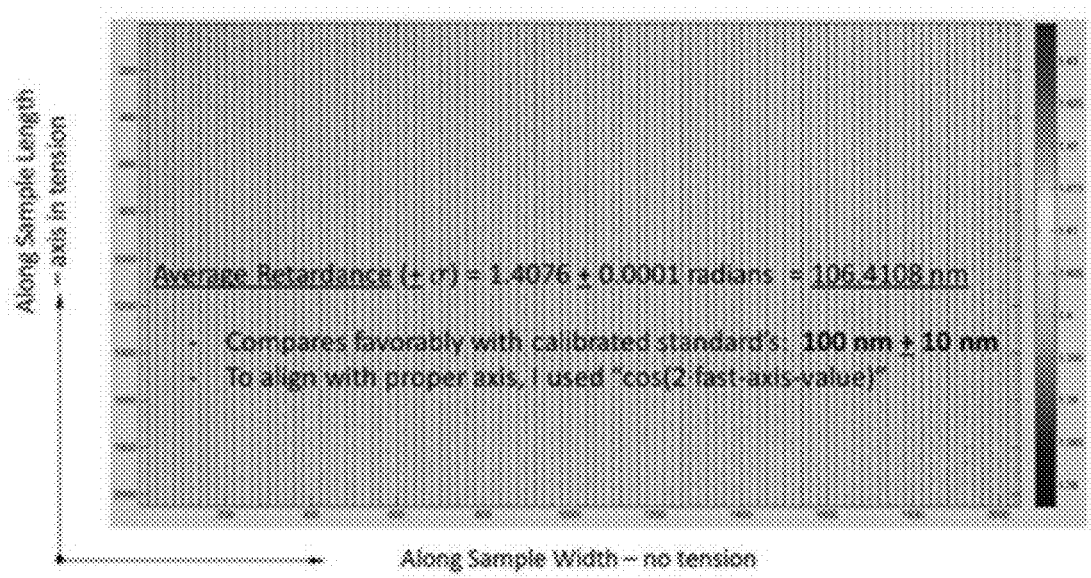
FIG. 40 is a flat retardance field calibration standard used to confirm the Exicor Microimager 2D map readings.

The 2D fast axis map of the stressed glass horseshoe naturally segmented into positive valued compressive region and negative valued tensile regions for the configuration used. The other calibration method used was more quantitative relying on use of a retardance calibration standard (Calgage-S, Strainoptics Inc., New Wales, Pa.). It consists of a rectangular birefringent membrane stretched in a uniform tension large flat retardance field, oriented along the samples' long axis, and calibrated to retard polarized 570 nm light to within 100 nm±10 nm when inserted into a polarimeter (between two crossed sheet polarizers). FIG. 40 shows the retardance map generated by the Exicor Birefringence Microimager when using 630 nm LED polarized illumination. The entire 2D retardance map average measured was 1.4076±0.0001 radiance (±σ), corresponding to 106.411 nm, and falling well within the calibration standard's acceptance range of 100 nm±10 nm. Superimposed on that retardance map is a "quiver plot", with lines instead of arrows, aligning in the tensile direction. The concordance with the calibration standard validated our quantitative use of the 2D retardance and fast-axis maps for the subsequent stress field sample measurements, and quantification.

Figure 41:
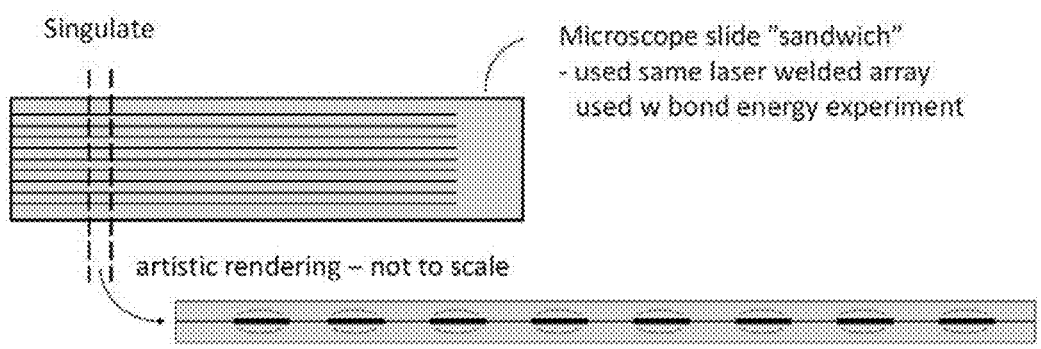
FIG. 41 is a schematic illustration showing the sample specimen used to perform stress field analyses of laser welds.

Sample Preparation for Stress Field Analyses—the same laser weld array Eagle XG® microscope slide pair sandwich used for the bond strength/energy measurements were used for the stress field analyses. Specimen were sliced thin into 1 mm or 2 mm slivers from the sandwich using a 265 µm thick dicing saw (Disco Corp., CA) with cooling water at a feed rate of 0.5 mm/sec. The slow feed rate, thinness, and cooling conditions were conducive to keeping the stress fields undisturbed. 1 mm specimen were used to ensure that no "phase-wrapping" events measured, since the Hinds rendered invisible by using index matching fluid on our specimen that was positioned between a microscope slide and a coverslip, and placed in the optical light path of the Exicor Microimager. The specimen was oriented such that the optical light path looked down at the specimen, as shown in the bottom of FIG. 41.

Stress Field Analyses of Samples Welded with Different UV-Absorbing Films—Quantitative stress field analyses were performed on two samples using low melting temperature UV-absorbing films (LMG and MMG), and one sample using a refractory UV-absorbing film (ZnO). These were all prepared in the same manner described above.

Figure 42:
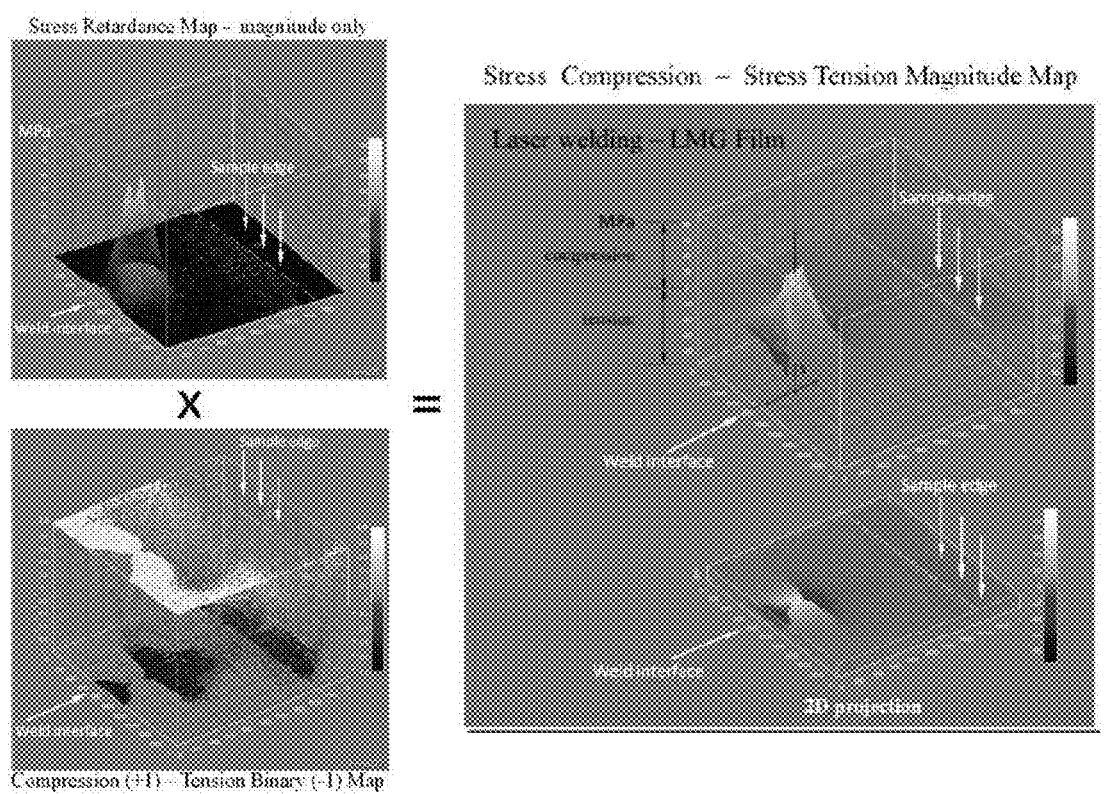
FIG. 42 shows 2D stress fields of LMG film laser welded samples in which two surface plots of the retardance and processed-fast-axis Exicor Microimager images are shown on the left side. A stress magnitude surface plot with full quantitative compression and tension segmentation is shown on the right side. All plots are shown in grayscale.
Figure 43:
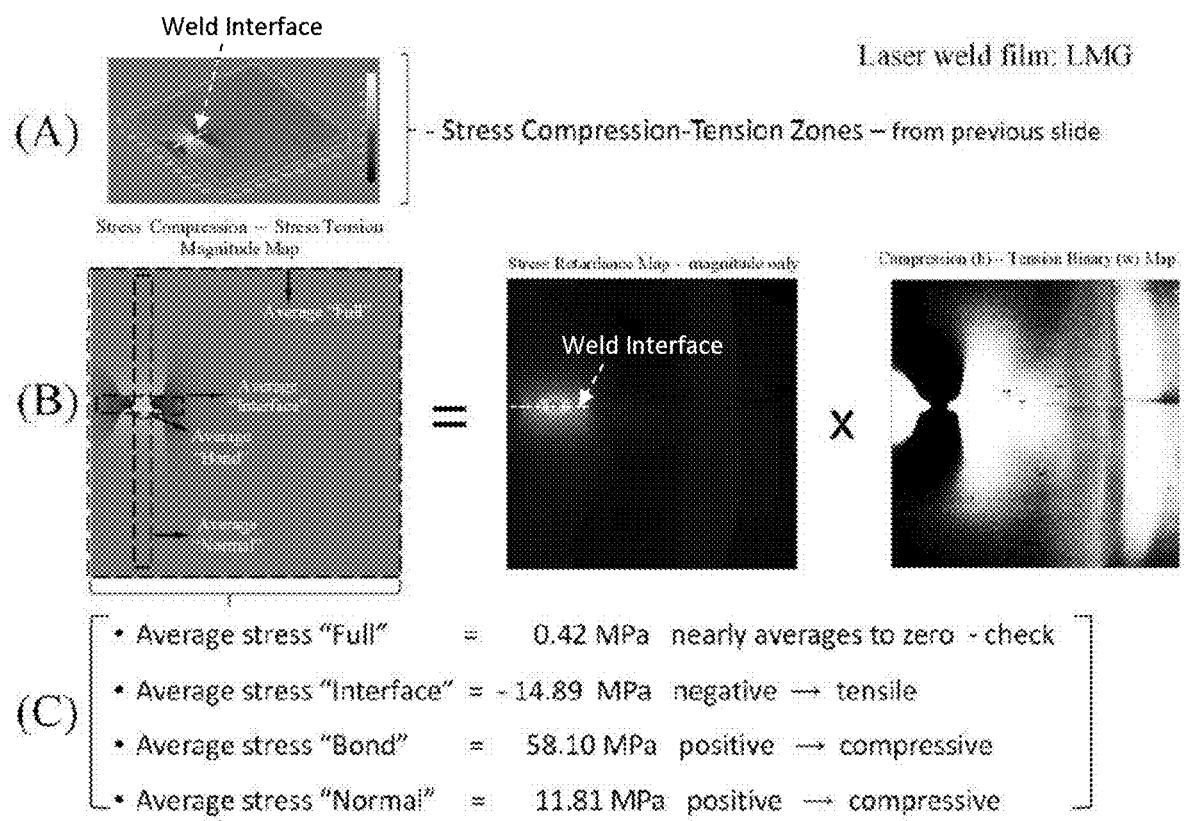
FIG. 43 shows the stress field distribution statistics for a laser weld bond formed with an LMG film. Row (A) is a 2D surface plot of the stress compression-tension. Row (B) is a grayscale plot of (A) with dashed regions defining the regions-of-interest from which image statistics were performed. Row (C) lists the image statistics of different regions-of-interest labeled as "Full," "Interface," "Bond," and "Normal". All plots are shown in grayscale.

Stress Analyses of Laser-welded Eagle XG® LMG-film Samples—Two surface plots of the retardance and processed-fast axis Exicor-images are shown on the left side of FIG. 42. The quantitative stress magnitude distribution is revealed with the top left plot, and the compression and tensile zones are readily segmented and visualized on the bottom left plot by performing a binary masking operation (ImageJ; NIH, Bethesda, Md.) on the fast axis data. The binary masking operation operates on the fast axis data by assigning all compressive regions the value of 1, and all regions of tension the value of −1. This not only makes the compression/tension segmentation visually clear, but makes the following mathematical operation possible. To view the compression and tension stress magnitude in a useful surface plot, the stress magnitude-only 2D map is multiplied with the 2D binary [1, −1] map, pixel-by-pixel. The result is shown at the top of the right side in FIG. 42. This scaling operation clearly distinguishes and segments the compression/tension region quantitatively. Note how the positive compression regions lie above the 0 MPa plane, while the negative tensile regions lie below the plane. The statistical distribution of these stress regions was studied for optimum distributions that lead to high bond strength laser welds. That surface plot was rendered as a 2D surface plot, and shown at the bottom of the right side in FIG. 42. A grayscale rendering of that plot is shown on the left side of row (B) in FIG. 43 defining the regions-of-interest, with dashed lines, from which image statistics were performed. The region-of-interest denoted as "Full" is the full surface area of the sample as noted in the first surface plot image in row (B). The region-of-interest denoted as "Interface" is the narrow rectangular area along the interface of the two bonded substrates that includes the laser welded zone 450 shown in FIG. 32. The region-of-interest denoted as "Bond" is the immediate local area of the laser welded bond and corresponds to the laser welded zone 450 shown in FIG. 32. The region-of-interest denoted as "Normal" is the long rectangular area oriented normal to the weld interface between the two substrates and includes the laser welded zone 450. Image statistics of different regions-of-interest are listed in row (C) of FIG. 43.

Figure 44:
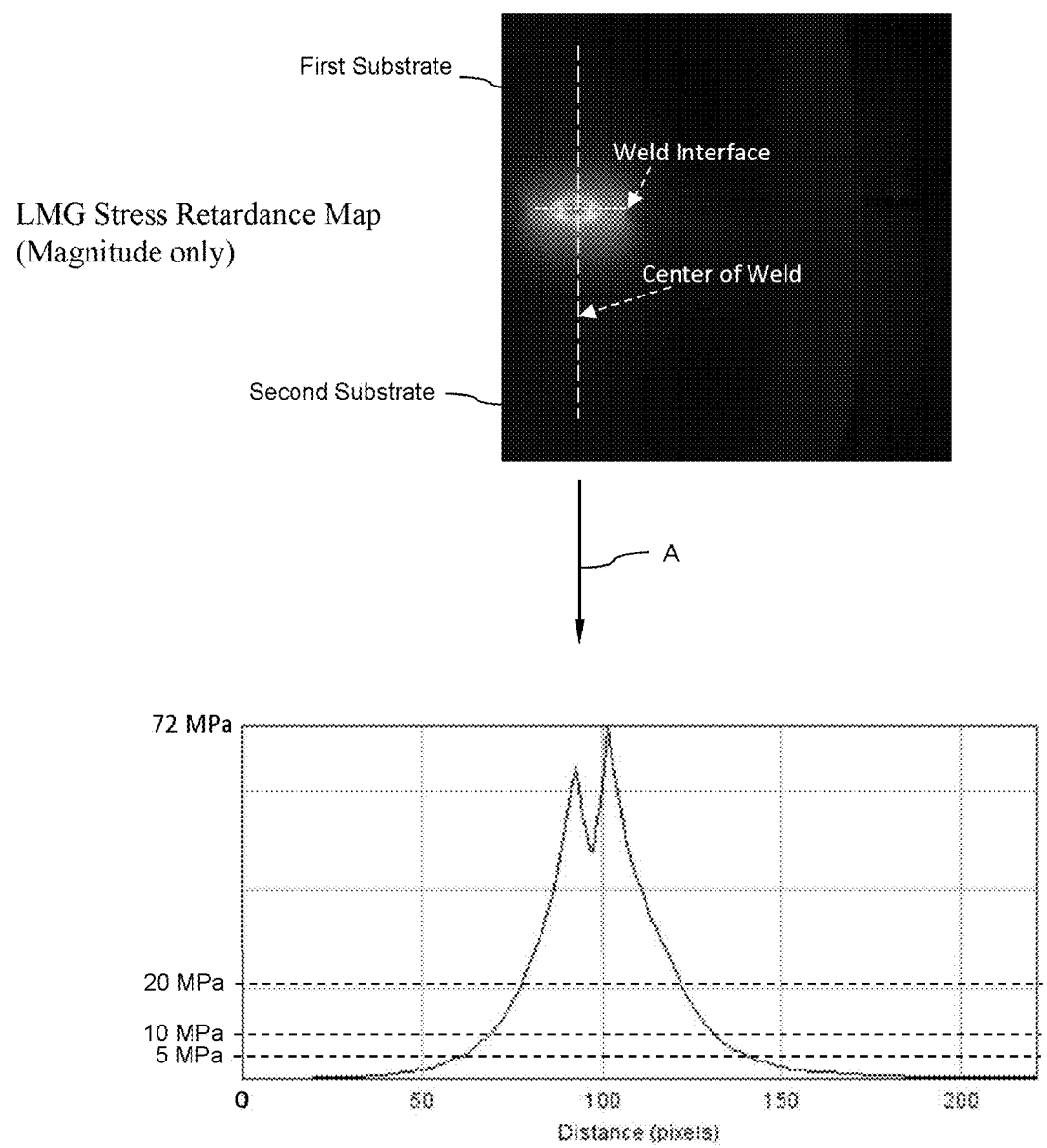
FIG. 44 shows a grayscale stress retardance map of an LMG film laser weld on the top side paired with a stress distribution plot along the weld interface.

On the top portion of FIG. 44 is shown a grayscale stress retardance map of an LMG film laser weld sample. Paired with that plot is a stress distribution plot along the weld interface shown on the bottom portion of FIG. 44. The center of the laser welded zone 450 is noted on the stress retardance map and the arrow A shows its alignment with the stress distribution plot shown on the bottom portion of FIG. 44. The stress distribution plot shows that the peak compressive stress in the laser welded zone 450 is found near the center of the welded zone and diminishes as you move away from the center. The plot shows that the desired lower limits 5 MPa, 10 MPa, and 20 MPa are easily met by the LMG film laser weld.

Figure 46:
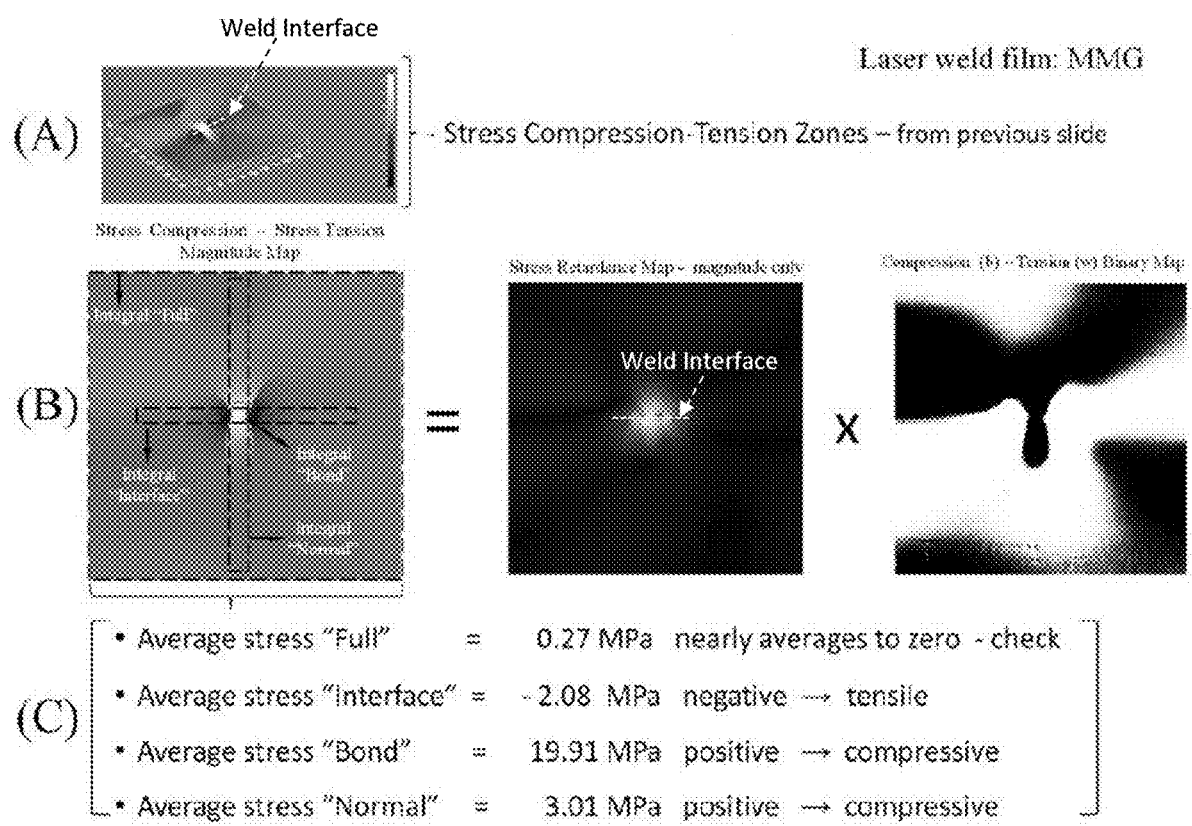
FIG. 46 shows the stress field distribution statistics for a laser weld bond formed with an MMG film. Row (A) is a 2D surface plot of the stress compression-tension. Row (B) is a grayscale plot of (A) with dashed regions defining the regions-of-interest from which image statistics were performed. Row (C) lists the image statistics of different regions-of-interest labeled as "Full," "Interface," "Bond," and "Normal". All plots are shown in grayscale.
Figure 47:
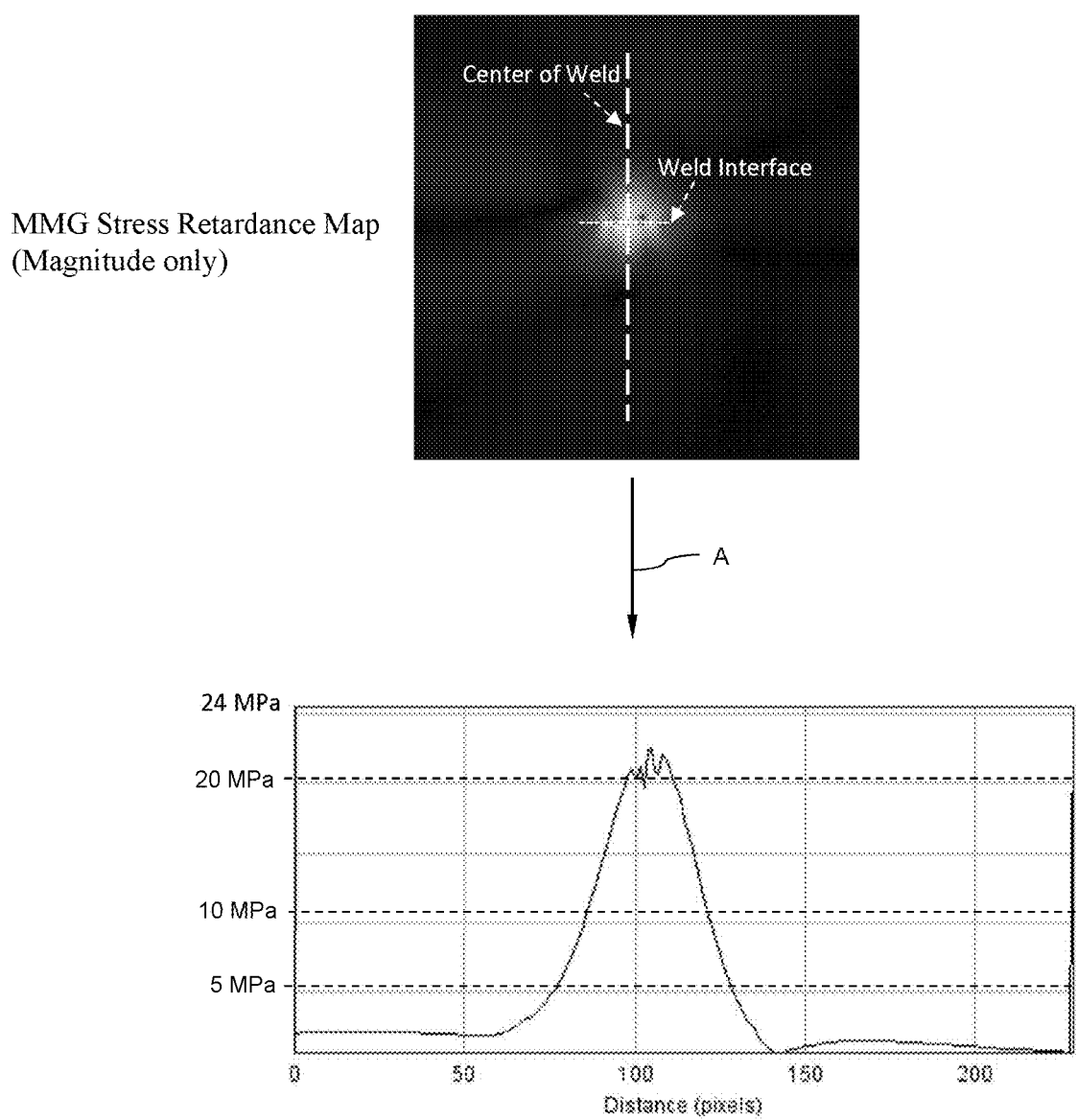
FIG. 47 shows a grayscale stress retardance map of an MMG film laser weld on the top side paired with a stress distribution plot along the weld interface.

Stress Analysis of Laser-Welded Eagle XG® MMG film Samples—All data acquisition procedures, and mathematical operations were replicated identically with MMG samples as those performed on LMG samples. FIGS. 45 to 47 show those data.

On the top portion of FIG. 47 is shown a grayscale stress retardance map of an MMG film laser weld sample. Paired with that plot is a stress distribution plot along the weld interface shown on the bottom portion of FIG. 47. The center of the laser welded zone 450 is noted on the stress retardance map and the arrow A shows its alignment with the stress distribution plot shown on the bottom portion of FIG. 47. The stress distribution plot shows that the peak compressive stress in the laser welded zone 450 is found near the center of the welded zone and diminishes as you move away from the center. The plot shows that the desired lower limits 5 MPa, 10 MPa, and 20 MPa are easily met by the MMG film laser weld.

Figure 49:
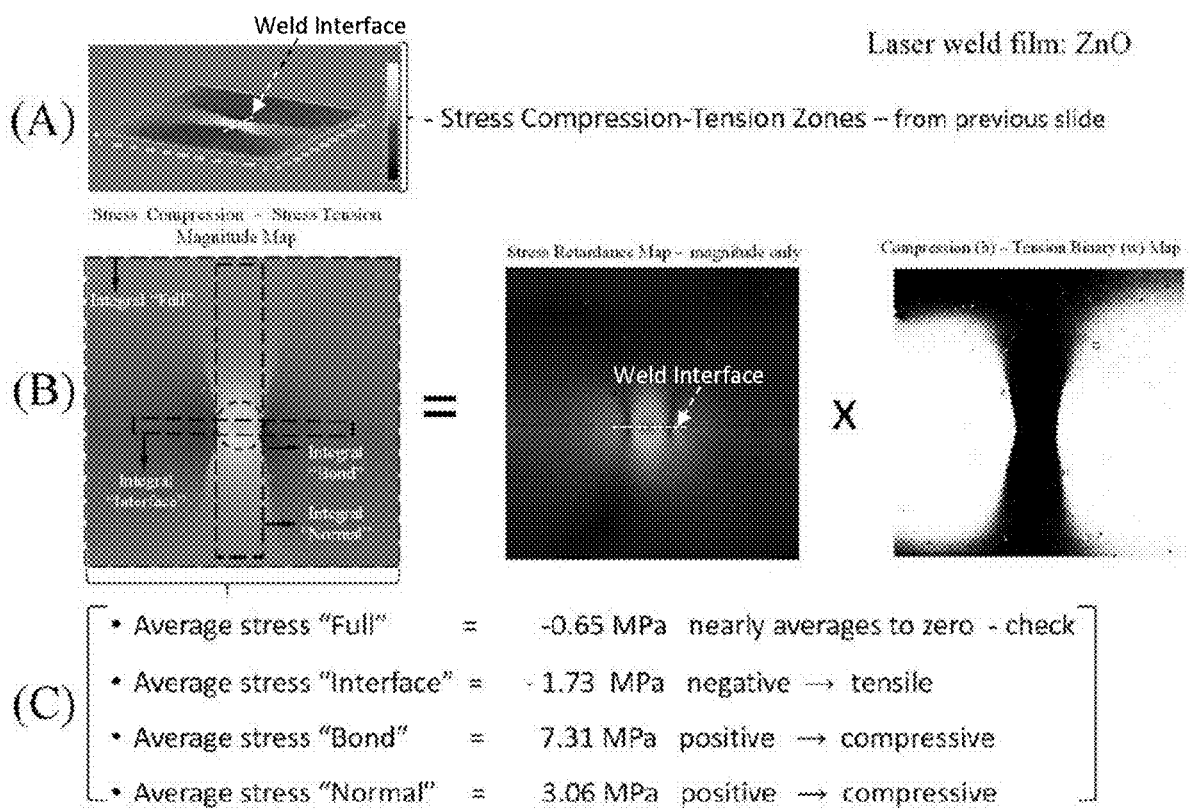
FIG. 49 shows the stress field distribution statistics for a laser weld bond formed with a ZnO film. Row (A) is a 2D surface plot of the stress compression-tension. Row (B) is a grayscale plot of (A) with dashed regions defining the regions-of-interest from which image statistics were performed. Row (C) lists the image statistics of different regions-of-interest labeled as "Full," "Interface," "Bond," and "Normal". All plots are shown in grayscale.
Figure 50:
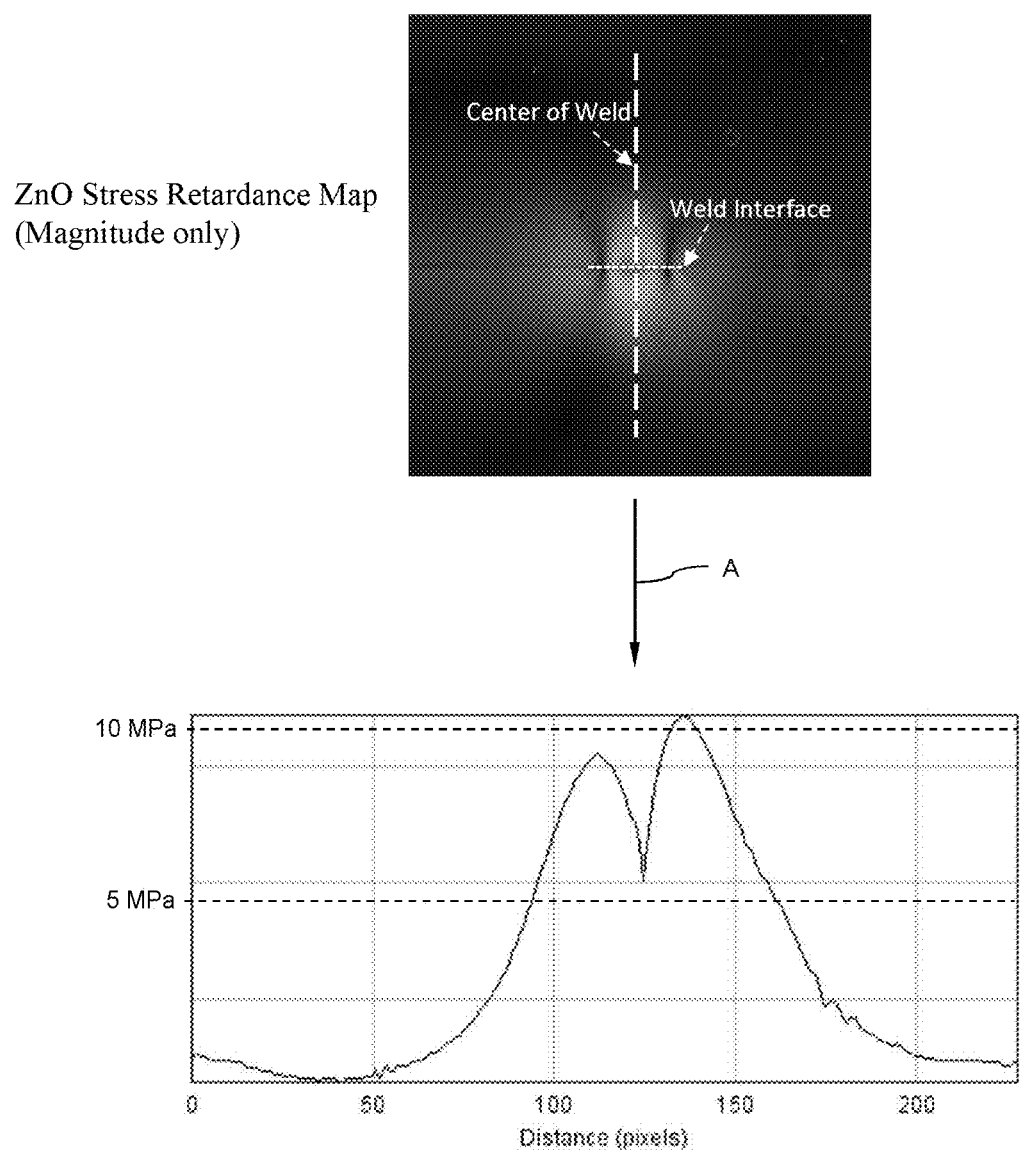
FIG. 50 shows a grayscale stress retardance map of a ZnO film laser weld on the top side paired with a stress distribution plot along the weld interface

Stress Analysis of Laser-Welded Eagle XG ZnO film Samples—All data acquisition procedures, and mathematical operations were replicated identically with ZnO samples as those performed on LMG samples. FIGS. 48 to 50 show those data.

On the top portion of FIG. 50 is shown a grayscale stress retardance map of a ZnO film laser weld sample. Paired with that plot is a stress distribution plot along the weld interface shown on the bottom portion of FIG. 50. The center of the laser welded zone 450 is noted on the stress retardance map and the arrow A shows its alignment with the stress distribution plot shown on the bottom portion of FIG. 50. The stress distribution plot shows that the peak compressive stress in the laser welded zone 450 is found near the center of the welded zone and diminishes as you move away from the center. The plot shows that the desired lower limits 5 MPa and 10 MPa are easily met by the ZnO film laser weld.

All statistical data from all three film sample sets were collated and presented in Table 1.

TABLE 1

| | Segmentation and Averaging Results | | |
|---|---|---|---|
| | LMG | MMG | ZnO |
| "Full" Average Stress Region | 0.42 MPa (close enough) | 0.27 MPa (close enough) | −0.65 MPa (close enough) |
| "Bond" Average Stress Region | 58.10 MPa (compressive) | 19.91 MPa (compressive) | 7.31 MPa (compressive) |
| "Normal" Average Stress Region | 11.81 MPa (compressive) | 3.01 MPa (compressive) | 3.06 MPa (compressive) |
| "Interface" Average Stress Region | −14.89 MPa (tensile) | −2.08 MPa (tensile) | −1.73 MPa (tensile) |
| * Bond Energy (mJ/m$^2$) (razor blade tech.) | 1022 mJ/m$^2$ | 970 mJ/m$^2$ | 265 mJ/m$^2$ |

Figure 33:
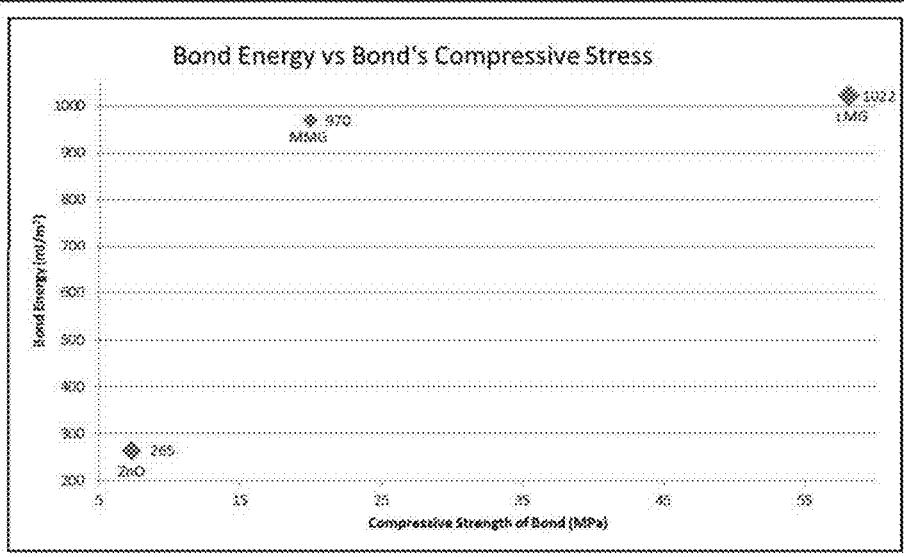
FIG. 33 is a plot of laser weld bond strength versus average compressive stress of HAZ region.
Figure 34:
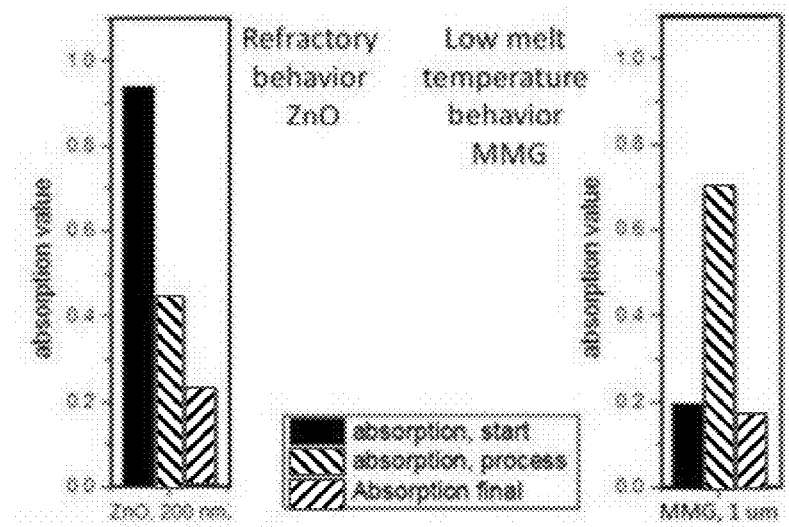
FIG. 34 is a plot illustrating two dynamic laser absorption mechanisms exhibited by ZnO film and MMG film manifesting as evolving different absorption time profiles during a laser welding event.

Table 1 is a tabular compilation of laser weld stress field statistics-properties and measured bond strength. FIG. 33 is a plot of the laser weld bond strength versus average compressive stress in the HAZ region around the laser weld. The meanings of "Full," "Bond," "Normal," and "Interface" referred to in Table 1 are same as defined above in the discussions referring to the stress field map of FIG. 43. The bond strength of the laser weld using LMG and MMG films were 1022 mJ/m$^2$ and 970 mJ/m$^2$, respectively. The bond strength of the laser weld using ZnO film was 265 mJ/m$^2$ substantially less than the bond strength of the laser weld using LMG and MMG films. The "Bond" average stress region FIG. 34 shows dynamic laser absorption mechanisms manifest as evolving different absorption time-profiles during a laser welding event. On the left side of the plot in FIG. 34 is a refractory film case (ZnO film) epitomized by monotonic absorption decay throughout the laser welding event, and on the right side of the plot in FIG. 34 is a MMG case exhibiting absorption increasing during the laser welding process and then returning to the initial value during the welding process.

The stress values tabulated in Table 1 are compressive stresses and the stress values given for each of the regions-of-interest is the integrated average value over that region. The compressive stress diminishes mostly monotonically away from the interface and normal to it.

According to some embodiments, a laser weld having a desired bond strength can be defined as that exhibiting $\sigma_{tensile\ stress\ location}$ at the periphery of HAZ that is <90% of the integrated average compressive stress of the HAZ 470, more preferably <50% of the integrated average compressive stress of the HAZ 470, and more preferably <25% of the integrated average compressive stress of the HAZ 470.

Dynamic Absorption Properties of the Film Materials—Inventors have discovered that during the laser welding process, materials of the inorganic absorptive film and substrate may change their absorption properties. This substantially changes the amount of light absorbed in the weld region and changes temperature and important parameters of the welding process. We tested multiple materials and found two general categories: one where absorption decreases during or after the laser welding, and another one where absorption increases during or after the laser welding.

Figure 51:
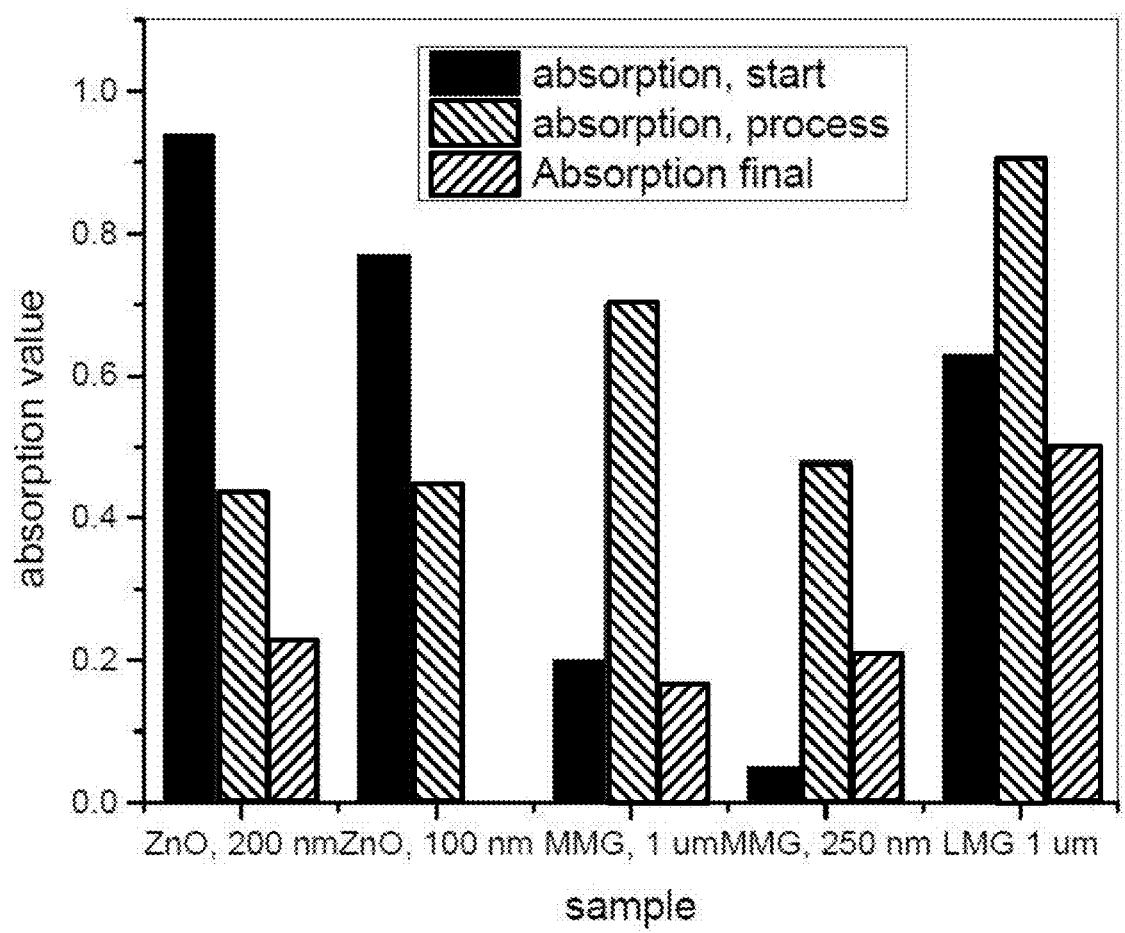
FIG. 51 is a plot of absorption exhibited by the several UV-absorbing films through a laser welding process.

FIG. 51 shows a plot of the absorption value at the start of the laser welding process (denoted as "start"), during the laser welding process (denoted as "process"), and at the end of the laser welding process (denoted as "final"). In order to measure this absorption value, a power meter was placed under the laser radiation spot, and monitored the transmission value of the laser light as a function of time, input power, sample translation speed, power density, etc. The reference value was measured without sample. The film samples measured were: 200 nm thick ZnO, 100 nm thick ZnO, 1 μm thick MMG (medium melting glass), 250 nm thick MM, and 1 μm thick LMG (low melting glass).

Inventors discovered that LMG and MMG films exhibited increased absorption during the laser welding process, and then recovered close to its initial value. Inventors believe that this observed increase in absorption may be the result of color centers or defect formations or band gap glass shift caused by the heat where the defects may not be stable. For ZnO film, absorption decreased during welding process by a factor of 2-3. The final value did not recover to its initial value. Inventors believe that this behavior can be explained by changing of the material's band gap and being dissolved into the glass substrates.

Inventors believe that this observed difference in the absorption behavior between ZnO and the LMG and MMG films account for the observed higher bond energy for the laser welds formed with LMG and MMG films as shown in the data presented in Table 1. Thus, inventors have discovered the following: (1) Refractory films like ZnO exhibit non-monotonic absorption decay during laser welding event, resulting in (a) exhibiting weaker bond energy (□ 150-300 mJ/m2) under similar laser welding conditions, and (b) lower average compressive strength, and magnitude, prevails in interfacial laser welded zone; (2) Low melting glass films (LMG and MMG) exhibited absorption enhancement during the laser welding event, then returning close to the initial value, resulting in (a) exhibiting higher bond energies (~1 J/m2) under similar laser welding conditions, and (b) higher average compressive strength, and magnitude, prevails in interfacial laser weld zone.

Inventors also observed that lower CTE substrates exhibited higher bond strength, everything else being equal, and generated high quality yields than when higher CTE substrates were used. This was particularly true for those substrates with CTE>7-8 ppm/° K. Those higher CTE substrates were more susceptible to crack formation during the welding event, or shortly thereafter, unless mitigating circumstances were taken such as welding on hot plate, preheating the substrates, and stringent laser properties.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombinations.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated herein, various embodiments for laser welded glass packages and methods of making the same have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. An apparatus comprising:
    a first substrate;
    a second substrate;
    an inorganic film between the first substrate and the second substrate and in contact with both the first substrate and the second substrate;
    a laser welded zone formed between the first substrate and the second substrate by the inorganic film,
    the laser welded zone surrounded by a heat affected zone (HAZ)
    defined as a region in which $\sigma_{HAZ}$ is at least 1 MPa greater than an average stress in the first substrate and the second substrate, and $\sigma_{HAZ}$ is compressive stress in the HAZ, and
    the laser welded zone characterized by $\sigma_{interface\ laser\ weld} > \sigma_{HAZ}$, wherein $\sigma_{interface\ laser\ weld}$ is a peak value of compressive stress in the laser welded zone, the laser welded zone and the HAZ forming a laser weld requiring a stress load of greater than 1 MPa to induce cohesive failure of the laser weld, and each of the inorganic film, the first substrate, and the second substrate have a combined internal transmission of more than 80% at a wavelength in a range from about 420 nm to about 750 nm.

2. The apparatus of claim 1, wherein $\sigma_{interface\ laser\ weld} \geq 5$ MPa.

3. The apparatus of claim 1, wherein $\sigma_{interface\ laser\ weld} \geq 10$ MPa.

4. The apparatus of claim 1, wherein $\sigma_{interface\ laser\ weld} \geq 20$ MPa.

5. The apparatus of claim 1, wherein at least one of the first or second substrates comprises a glass, glass-ceramic, ceramic, polymer, or metal.

6. The apparatus of claim 1, wherein laser absorption by the inorganic film is at least 10% at a predetermined laser wavelength.

7. The apparatus of claim 1, wherein laser absorption by the inorganic film is at least 15% at a predetermined laser wavelength.

8. The apparatus of claim 1, wherein a composition of the inorganic film is selected from the group consisting of Al, Ag, Ce, Cr, Cu, Fe, Ge, ITO, Mg, Mn, Mo, Pb, $SnF_2$, $SnO_2$, Ti, $TiO_2$, Va, Zn, ZnO, $ZnF_2$, and combinations thereof.

9. The apparatus of claim 1, wherein a composition of the inorganic film is selected to lower an activation energy for inducing creep flow of the first substrate, the second substrate, or both the first and second substrates.

10. The apparatus of claim 1, wherein a composition of the inorganic film is a laser absorbing low liquidus temperature material with a liquidus temperature less than or equal to about 1000° C.

11. The apparatus of claim 1, wherein the inorganic film comprises:
    20-100 mol % SnO, 0-50 mol % $SnF_2$, and 0-30 mol % $P_2O_5$ or $B_2O_3$.

12. An electronic package comprising:
    a first substrate;
    a second substrate, wherein one or both of the first or second substrate comprise a recessed portion for accommodating an active electronic device;
    an inorganic film between the first substrate and the second substrate along a sealing region circumscribing the recessed portion and in contact with both the first substrate and the second substrate;
    a laser welded zone formed between the first and second substrates by the inorganic film,
    the laser welded zone surrounded by a heat affected zone (HAZ)
    defined as a region in which $\sigma_{HAZ}$ is at least 1 MPa greater than an average stress in the first substrate and the second substrate, and $\sigma_{HAZ}$ is compressive stress in the HAZ,
    the laser welded zone characterized by $\sigma_{interface\ laser\ weld} > \sigma_{HAZ}$, wherein $\sigma_{interface\ laser\ weld}$ is a peak value of compressive stress in the laser welded zone; and
    wherein the laser welded zone extends along the sealing region establishing a hermetic seal between the first substrate and the second substrate such that the recessed portion forms a hermetic environment for the active electronic device, the laser welded zone and the HAZ forming a laser weld requiring a stress load of greater than 1 MPa to induce cohesive failure of the laser weld, and each of the inorganic film, the first substrate, and the second substrate have a combined internal transmission of more than 80% at a wavelength in a range from about 420 nm to about 750 nm.

13. The electronic package of claim 12, wherein $\sigma_{interface\ laser\ weld} \geq 5$ MPa.

14. The electronic package of claim 12, wherein $\sigma_{interface\ laser\ weld} \geq 10$ MPa.

15. The electronic package of claim 12, wherein $\sigma_{interface\ laser\ weld} \geq 20$ MPa.

16. The electronic package of claim 12, wherein at least one of the first or second substrates comprises a glass, glass-ceramic, ceramic, polymer, or metal.

17. The electronic package of claim 12, wherein the active electronic device is one of an OLED or a micro-processor chip.

* * * * *